US008620043B2

(12) United States Patent
Kitamura et al.

(10) Patent No.: US 8,620,043 B2
(45) Date of Patent: Dec. 31, 2013

(54) IMAGE PROCESSING APPARATUS, IMAGE PROCESSING METHOD, AND COMPUTER-READABLE RECORDING MEDIUM

(75) Inventors: Makoto Kitamura, Hachioji (JP); Yamato Kanda, Hino (JP); Takehiro Matsuda, Hachioji (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 310 days.

(21) Appl. No.: 13/215,650

(22) Filed: Aug. 23, 2011

(65) Prior Publication Data
US 2012/0051612 A1    Mar. 1, 2012

(30) Foreign Application Priority Data
Aug. 24, 2010    (JP) .................. 2010-187680

(51) Int. Cl.
*G06K 9/00*    (2006.01)
(52) U.S. Cl.
USPC ............ 382/128; 382/103; 382/173; 382/199
(58) Field of Classification Search
USPC ......... 382/103, 128, 131, 132, 173, 199, 266, 382/282
See application file for complete search history.

(56) References Cited

U.S. PATENT DOCUMENTS

| 5,239,591 | A | * | 8/1993 | Ranganath .................... 382/128 |
| 5,487,116 | A | * | 1/1996 | Nakano et al. ................ 382/104 |
| 6,631,206 | B1 | * | 10/2003 | Cheng et al. .................. 382/164 |
| 6,678,416 | B1 | * | 1/2004 | Sun et al. ...................... 382/235 |
| 6,728,401 | B1 | * | 4/2004 | Hardeberg .................... 382/167 |
| 6,912,310 | B1 | * | 6/2005 | Park et al. ..................... 382/199 |

(Continued)

FOREIGN PATENT DOCUMENTS

| EP | 2 305 091 A1 | 4/2011 |
| JP | 2002-099896 A | 4/2002 |
| WO | WO 2009/154125 A1 | 12/2009 |

OTHER PUBLICATIONS

Liang, J., et al. "Interactive Medical Image Segmentation with United Snakes", Jan. 1, 2006, Medical Image Computing and Computer Assisted Intervention—MICCAI '99: Second International Conference, Cambridge, UK, Sep. 19-22, 1999, Lecture Notes in Computer Science; 1679, pp. 116-128.

(Continued)

*Primary Examiner* — Aaron W Carter
(74) *Attorney, Agent, or Firm* — Scully, Scott, Murphy & Presser, P.C.

(57) ABSTRACT

An image processing apparatus includes a gradient strength calculating unit that calculates a gradient strength of respective pixel values based on an intraluminal image; an extracting unit that extracts a closed region satisfying conditions that the pixel of which gradient strength is a predetermined value or more is not included in the region and a boundary of the region does not bend with a predetermined curvature or higher toward an inner side of the region; and a detecting unit that detects an abnormal portion inside the region. The extracting unit includes a setting unit that sets an initial shape of the region; an energy calculating unit that calculates values of types of energy including at least energies determined respectively by an outer shape of the region and the gradient strength; and an energy-weighted sum calculating unit that calculates a weighted sum of the types of energy.

24 Claims, 34 Drawing Sheets

(56) References Cited

U.S. PATENT DOCUMENTS

| | | | |
|---|---|---|---|
| 6,996,340 B2* | 2/2006 | Yamaguchi et al. | 396/263 |
| 7,536,041 B2* | 5/2009 | Pekar et al. | 382/128 |
| 7,646,902 B2* | 1/2010 | Chan et al. | 382/128 |
| 8,103,077 B2* | 1/2012 | Hong et al. | 382/132 |
| 2002/0062061 A1* | 5/2002 | Kaneko et al. | 600/118 |
| 2002/0063893 A1* | 5/2002 | Fujieda | 358/1.15 |
| 2002/0118875 A1* | 8/2002 | Wilensky | 382/173 |
| 2003/0036751 A1* | 2/2003 | Anderson et al. | 606/9 |
| 2003/0139650 A1* | 7/2003 | Homma | 600/181 |
| 2004/0218916 A1* | 11/2004 | Yamaguchi et al. | 396/263 |
| 2005/0129296 A1* | 6/2005 | Setala | 382/131 |
| 2006/0159341 A1* | 7/2006 | Pekar et al. | 382/173 |
| 2007/0230767 A1* | 10/2007 | Iwamatsu et al. | 382/133 |
| 2007/0260214 A1* | 11/2007 | Mikkaichi et al. | 604/500 |
| 2008/0040083 A1* | 2/2008 | Odry et al. | 703/2 |
| 2008/0181481 A1* | 7/2008 | Hong et al. | 382/132 |
| 2008/0240526 A1* | 10/2008 | Suri et al. | 382/128 |
| 2009/0196476 A1* | 8/2009 | Inoue | 382/128 |
| 2009/0202124 A1* | 8/2009 | Matsuda et al. | 382/128 |
| 2010/0067742 A1* | 3/2010 | Ogawa | 382/103 |
| 2010/0092055 A1* | 4/2010 | Matsuda | 382/128 |
| 2010/0104154 A1* | 4/2010 | Chan et al. | 382/128 |
| 2010/0134517 A1* | 6/2010 | Saikaly et al. | 345/619 |
| 2010/0166283 A1* | 7/2010 | Grosskopf | 382/131 |
| 2010/0177957 A1* | 7/2010 | Ogawa | 382/160 |
| 2011/0002522 A1* | 1/2011 | Goto et al. | 382/131 |
| 2011/0019886 A1* | 1/2011 | Mizuno | 382/128 |
| 2011/0158474 A1* | 6/2011 | Srikrishnan et al. | 382/103 |
| 2011/0176730 A1* | 7/2011 | Sasaki | 382/167 |
| 2011/0181614 A1* | 7/2011 | Chang et al. | 345/595 |
| 2011/0274321 A1* | 11/2011 | Kono et al. | 382/128 |
| 2012/0051612 A1* | 3/2012 | Kitamura et al. | 382/128 |
| 2012/0051654 A1* | 3/2012 | Kitamura et al. | 382/199 |
| 2012/0230572 A1* | 9/2012 | Kohlberger et al. | 382/131 |

OTHER PUBLICATIONS

European Search Report dated Dec. 20, 2011 from corresponding European Patent Application No. EP 11 00 6851.7.

Tin, H. and Kobatake, H., "Extraction of Microcalcifications on Mammogram Using Morphological Filter with Multiple Structuring Elements", The Transactions of the Institute of Electronics, Information and Communication Engineers, Jul. 1992, D-II, vol. J75-D-II, No. 7, pp. 1170-1176 together with English language abstract.

Kobatake, H. et al., "Basic Theory of Mathematical Morphology and Its Application to Mammogram Processing", Medical Imaging Technology, Jan. 1994, vol. 12, No. 1, pp. 59-66 together with English language abstract.

* cited by examiner

FIG.12
(a)
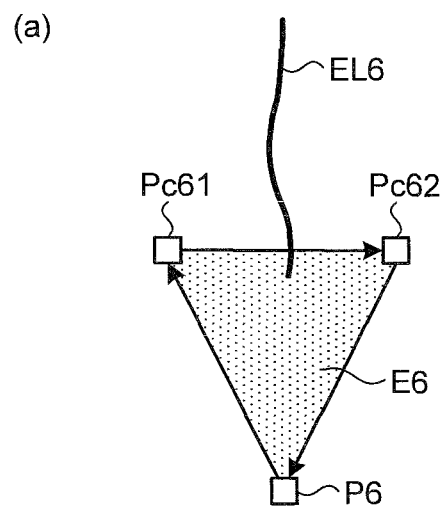
(b)
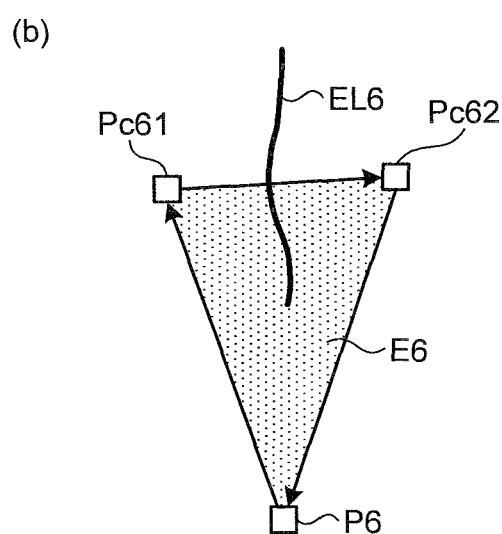

IMAGE PROCESSING APPARATUS, IMAGE PROCESSING METHOD, AND COMPUTER-READABLE RECORDING MEDIUM

CROSS-REFERENCE TO RELATED APPLICATIONS

This application is based upon and claims the benefit of priority from Japanese Patent Application No. 2010-187680, filed on Aug. 24, 2010, the entire contents of which are incorporated herein by reference.

BACKGROUND OF THE INVENTION

1. Field of the Invention

The present invention relates to an image processing apparatus, an image processing method, and a computer-readable storage medium for processing an intraluminal image that is a captured image of an intralumen.

2. Description of the Related Art

Conventionally, endoscopes are widely used as medical observation apparatuses inserted into a body of a subject such as a patient to observe the inside of an intralumen. In recent years, swallowable endoscopes (capsule endoscopes) provided with an imaging apparatus, a communication apparatus that transmits image data captured by the imaging apparatus wirelessly to the outside of a body, and the like in a capsule-shaped casing have been developed. Because observation and diagnosis of such an image of an intralumen (intraluminal image) captured by such medical observation apparatuses need a lot of experience, a medical diagnosis support function that assists diagnosis made by a doctor is required. As one of the image recognition technologies to realize the function, a technology in which an abnormal portion such as a lesion is detected automatically from an intraluminal image to be shown to a doctor, for example, has been developed.

For example, Japanese Laid-open Patent Publication No. 2002-099896 discloses a technology in which a shape-dependent filter is used to stably detect a candidate of a minute calcified shadow, which is one of the characteristics of a cancerous region in breast cancer, without being influenced by a rough structure and a linear structure. In Japanese Laid-open Patent Publication No. 2002-099896, based on an assumed shape of a minute calcified shadow, a second shape-dependent filter with filter characteristics optimized in accordance with imaging conditions, reading conditions, various conditions such as image contrast and the size of the minute calcified shadow, or a combination of these conditions is prepared in advance. Then, a linear structure in the image is eliminated using a first shape-dependent filter serving as a morphological filter (for example, refer to Kohata, et al., "Extraction of Microcalcifications Using Morphological Filter with Multiple Structuring Elements", Transactions of the Institute of Electronics, Information, and Communication Engineers of Japan, D-II, Vol. J75-D-II, No. 7, pp. 1170-1176, July 1992, and Kohata, et al., "Fundamentals of Morphology and Its Application to Mammogram Processing", Medical Imaging Technology, Vol. 12, No. 1, January 1994), whereby a minute structure image that indicates a minute structure portion is generated. Subsequently, by performing enhancement process on the minute structure image using the second shape-dependent filter thus prepared, an enhancement-processed image in which a minute calcified shadow candidate alone is enhanced relatively compared with the circumference (portions other than the minute calcified shadow candidate including rough structure portions and linear structure portions that cannot be eliminated by the first shape-dependent filter).

SUMMARY OF THE INVENTION

An image processing apparatus according to an aspect of the present invention includes a gradient strength calculating unit that calculates a gradient strength of a pixel value of each pixel based on an intraluminal image that is a captured image of an intralumen; a closed region extracting unit that extracts a closed region from the intraluminal image, the closed region satisfying conditions that the pixel of which gradient strength is a predetermined value or more is not included in the closed region and a boundary of the closed region does not bend with a predetermined curvature or higher toward an inner side of the closed region; and an abnormal portion detecting unit that detects an abnormal portion inside the closed region. The closed region extracting unit includes an initial closed region setting unit that sets an initial shape of the closed region; an energy calculating unit that calculates values of a plurality of types of energy including at least energy determined by an outer shape of the closed region and energy determined by the gradient strength in the closed region; an energy-weighted sum calculating unit that calculates a weighted sum of the plurality of types of energy; and a closed region updating unit that updates a shape of the closed region within an update range based on the weighted sum. The closed region updating unit includes an update range determining unit that determines the update range in which the shape of the closed region is updated based on any one of the values of the plurality of types of energy.

An image processing method according to another aspect of the present invention includes calculating a gradient strength of a pixel value of each pixel based on an intraluminal image that is a captured image of an intralumen; setting an initial shape of a closed region, the closed region satisfying conditions that the pixel of which gradient strength is a predetermined value or more is not included in the closed region and a boundary of the closed region does not bend with a predetermined curvature or higher toward an inner side of the closed region; extracting the closed region from the intraluminal image; and detecting an abnormal portion inside the closed region. The extracting includes calculating values of a plurality of types of energy including at least energy determined by an outer shape of the closed region and energy determined by the gradient strength in the closed region; calculating a weighted sum of the plurality of types of energy; determining an update range in which the shape of the closed region is updated based on any one of the values of the plurality of types of energy; and updating the shape of the closed region within the update range based on the weighted sum.

A non-transitory computer-readable storage medium according to still another aspect of the present invention has an executable program stored thereon. The program instructs a processor to perform: calculating a gradient strength of a pixel value of each pixel based on an intraluminal image that is a captured image of an intralumen; setting an initial shape of a closed region, the closed region satisfying conditions that the pixel of which gradient strength is a predetermined value or more is not included in the closed region and a boundary of the closed region does not bend with a predetermined curvature or higher toward an inner side of the closed region; extracting the closed region from the intraluminal image; and detecting an abnormal portion inside the closed region. The extracting includes calculating values of a plurality of types of energy including at least energy determined by an outer shape of the closed region and energy determined by the gradient strength in the closed region; calculating a weighted sum of the plurality of types of energy; determining an update range in which the shape of the closed region is updated based on any one of the values of the plurality of types of energy; and updating the shape of the closed region within the update range based on the weighted sum.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a view for explaining edge inclusion energy;

DETAILED DESCRIPTION OF THE PREFERRED EMBODIMENTS

Preferred embodiments according to the present invention will be described below with reference to the accompanying drawings. It is to be noted that the present invention is not limited to the embodiments. In the description of the drawings, like numerals are assigned to like components.

An image processing apparatus according to the embodiments processes an image (intraluminal image) obtained by capturing an intralumen such as a digestive tract in a body of a subject using a medical observation apparatus such as an endoscope and a capsule endoscope, and performs processes for detecting an abnormal portion, such as a lesion and a bleeding site, from the intraluminal image. As described above, in the intraluminal image, a shadow of a groove and a contour formed by a body tissue, such as a mucosal structure, are captured. In the embodiments, to prevent the groove position and the contour portion from being misdetected as an abnormal portion, a closed region is extracted such that no groove position and no contour portion is included in the inside and the boundary of the closed region in the intraluminal image, thereby detecting the abnormal portion in each closed region thus extracted. In the embodiments, the intraluminal image is a color image, for example, having pixel values for wavelength components of R (red), G (green), and B (blue) in each pixel.

First Embodiment

Figure 1:
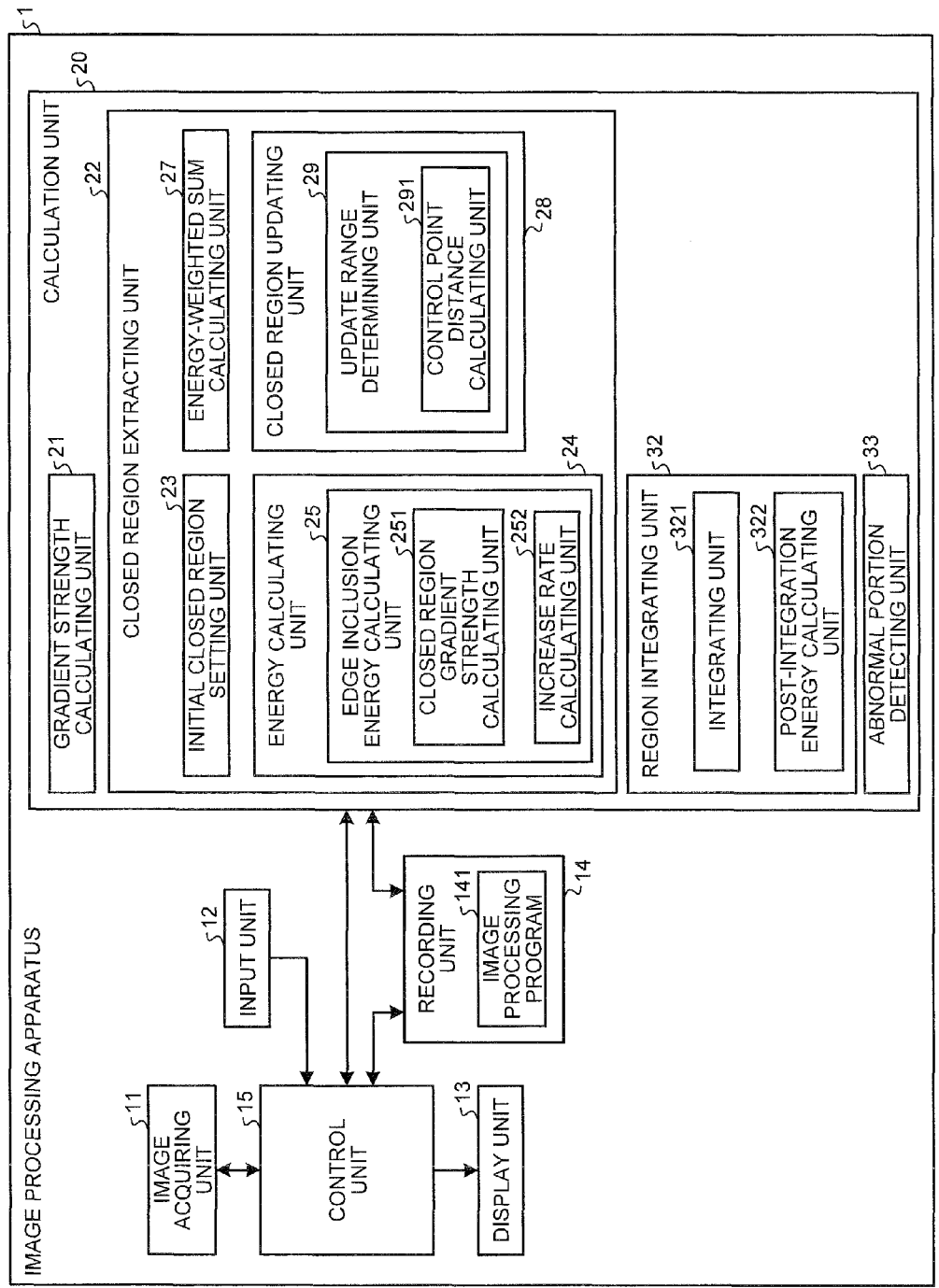
FIG. 1 is a block diagram for explaining a functional configuration of an image processing apparatus according to a first embodiment.

An image processing apparatus according to a first embodiment will now be described. FIG. 1 is a block diagram for explaining a functional configuration of an image processing apparatus 1 according to the first embodiment. As illustrated in FIG. 1, the image processing apparatus 1 according to the first embodiment includes an image acquiring unit 11, an input unit 12, a display unit 13, a recording unit 14, a calculation unit 20, and a control unit 15 that controls operations of the entire image processing apparatus 1.

The image acquiring unit 11 acquires image data of an intraluminal image captured by a medical observation apparatus. The image data of the intraluminal image acquired by the image acquiring unit 11 is recorded in the recording unit 14, processed by the calculation unit 20, and displayed on the display unit 13 arbitrarily as necessary. If a portable recording medium is used for transferring the image data from the medical observation apparatus, for example, the image acquiring unit 11 is formed of a reader device that reads the stored image data of the intraluminal image with the recording medium mounted thereon in a detachable manner. Furthermore, if a server that stores therein the image data of the intraluminal image captured by the medical observation apparatus is arranged in an appropriate position, and the image data is acquired therefrom, the image acquiring unit 11 is formed of a communication device or the like for connecting the image processing apparatus 1 to the server. The image processing apparatus 1 performs data communications with the server via the image acquiring unit 11 to acquire the image data of the intraluminal image. In addition, if the image data is acquired from the medical observation apparatus via a cable, the image acquiring unit 11 may be formed of an interface device or the like to which the image data is input.

The input unit 12 is realized by, for example, a keyboard, a mouse, a touch panel, and various types of switches, and supplies an input signal to the control unit 15. The display unit 13 is realized by a display device, such as a liquid crystal display (LCD) and an electroluminescent (EL) display, and displays various types of screens including the intraluminal image under the control performed by the control unit 15.

The recording unit 14 is realized by, for example, various types of integrated circuit (IC) memories including a read-only memory (ROM) and a random access memory (RAM) such as a rewritable flash memory, a hard disk embedded or connected with a data communication terminal, an information recording medium such as a compact disk read-only memory (CD-ROM), and a read device thereof. The recording unit 14 records therein computer programs for causing the image processing apparatus 1 to operate, and realizing various functions included in the image processing apparatus 1, data used during the execution of the computer programs, and the like in advance or in each process temporality. The recording unit 14 records therein the image data of the intraluminal image acquired by the image acquiring unit 11. Furthermore, the recording unit 14 records therein an image processing program 141 for realizing processes of the first embodiment and detecting an abnormal portion in the intraluminal image.

The calculation unit 20 is realized by hardware such as a central processing unit (CPU), and performs various types of calculating process for processing the intraluminal image to detect the abnormal portion. The calculation unit 20 includes a gradient strength calculating unit 21 serving as a gradient strength calculating unit, a closed region extracting unit 22 serving as a closed region extracting unit, a region integrating unit 32 serving as a region integrating unit, and an abnormal portion detecting unit 33 serving as an abnormal portion detecting unit.

The gradient strength calculating unit 21 calculates the gradient strength of the pixel value of each pixel based on the pixel value of each pixel of the intraluminal image.

Under the conditions that no pixel having a gradient strength equal to or higher than a predetermined value specified in advance is included in a region, and that the boundary of the region does not bend with a predetermined curvature or higher toward the inner side of the closed region, the closed region extracting unit 22 extracts a closed region satisfying the above conditions from the intraluminal image. The closed region extracting unit 22 includes an initial closed region setting unit 23 serving as an initial closed region setting unit, an energy calculating unit 24 serving as an energy calculating unit, an energy-weighted sum calculating unit 27 serving as an energy-weighted sum calculating unit, and a closed region updating unit 28 serving as a closed region updating unit. The closed region extracting unit 22 calculates the minimum value of the weighted sum of a plurality of types of energy, for example, four types of energy of edge inclusion energy, internal energy, image energy, and external energy, which will be described later, using the dynamic contour extraction method (refer to "Digital Image Processing", CG-ARTS Society, P 196 to P 200, *Area Dividing Process*), and thus extracts a closed region.

The initial closed region setting unit 23 sets an initial closed region that is an initial shape of the closed region.

The energy calculating unit 24 calculates values of a plurality of types of energy including at least energy determined by an outer shape of the closed region, and energy determined by the gradient strength of pixels in the closed region. The energy calculating unit 24 includes an edge inclusion energy calculating unit 25 serving as an edge inclusion energy calculating unit. The edge inclusion energy calculating unit 25 calculates the value of the edge inclusion energy corresponding to the energy determined by the gradient strength of the pixels in the closed region. The edge inclusion energy is energy that indicates a larger value as the gradient strength in the closed region becomes larger. The edge inclusion energy calculating unit 25 includes a closed region gradient strength calculating unit 251 serving as a closed region gradient strength calculating unit, and an increase rate calculating unit 252 serving as an increase rate calculating unit. The closed region gradient strength calculating unit 251 calculates the closed region gradient strength based on the gradient strength in the closed region. The increase rate calculating unit 252 calculates the increase rate of the gradient strength in the closed region before and after update of the shape.

Furthermore, the energy calculating unit 24 calculates the values of three types of energy of the internal energy and the external energy corresponding to the energy determined by the outer shape of the closed region, and of the image energy corresponding to the energy determined by the gradient strength of the pixels in the closed region in addition to the edge inclusion energy calculated by the edge inclusion energy calculating unit 25. The internal energy indicates smoothness of the boundary of the closed region, and is energy that indicates a smaller value as the closed region has a smoother shape. The image energy is energy that indicates a smaller value as the value of the gradient strength in the boundary of the closed region becomes larger. The external energy is energy that indicates a smaller value as the size of the closed region becomes larger.

The energy-weighted sum calculating unit 27 calculates the weighted sum of the plurality of types of energy calculated by the energy calculating unit 24. In the first embodiment, the energy-weighted sum calculating unit 27 calculates the weighted sum of four types of energy of the edge inclusion energy, the internal energy, the image energy, and the external energy. It is to be noted that the energy-weighted sum calculating unit 27 does not necessarily calculate the weighted sum of the four types of energy. Alternatively, the energy-weighted sum calculating unit 27 may select two or more types of energy from the four types to calculate the weighted sum thereof.

The closed region updating unit 28 updates the shape of the closed region so as to make the weighted sum of the four types of energy calculated by the energy-weighted sum calculating unit 27 smaller. The closed region updating unit 28 includes an update range determining unit 29 serving as an update range determining unit. The update range determining unit 29 is a functional unit that determines an update range in which the shape of the closed region is updated, and includes a control point distance calculating unit 291 serving as a control point distance calculating unit. As will be described later, the initial closed region is specified as a region obtained by connecting a plurality of control points, and transformed (updated in shape) by moving each of the control points. The control point used herein means a coordinate point positioned on the boundary of the closed region. The control point distance calculating unit 291 calculates a distance between each of the control points described above and a control point in which the value of the edge inclusion energy is equal to or higher than a predetermined threshold value as a result of the update in shape. Although the value of the edge inclusion energy is used in this case, a value of another type of energy may be used instead.

The region integrating unit 32 integrates the closed regions extracted by the closed region extracting unit 22. At this time, the region integrating unit 32 integrates the closed regions so as to satisfy the conditions that no pixel having a gradient strength equal to or higher than a predetermined value is included in the region, and that the boundary of the region does not bend with a predetermined curvature or higher toward an inner side of the closed region. The region integrating unit 32 includes an integrating unit 321 serving as an integrating unit, and a post-integration energy calculating unit 322 serving as a post-integration energy calculating unit. The integrating unit 321 selects closed regions to be integrated, and integrates the selected closed regions into one region. The post-integration energy calculating unit 322 calculates the weighted sum of the four types of energy of the edge inclusion energy, the internal energy, the image energy, and the external energy for the closed region thus integrated by the integrating unit 321.

The abnormal portion detecting unit 33 detects an abnormal portion inside (internal portion) of the boundary for each of the closed regions.

The control unit 15 is realized by hardware such as a CPU. The control unit 15 gives instructions and transfers data to each of the units that constitute the image processing apparatus 1 based on the image data acquired by the image acquiring unit 11, the input signal supplied from the input unit 12, the computer programs and data recorded in the recording unit 14, and the like. In this manner, the control unit 15 controls the operations of the entire image processing apparatus 1 collectively.

Figure 2:
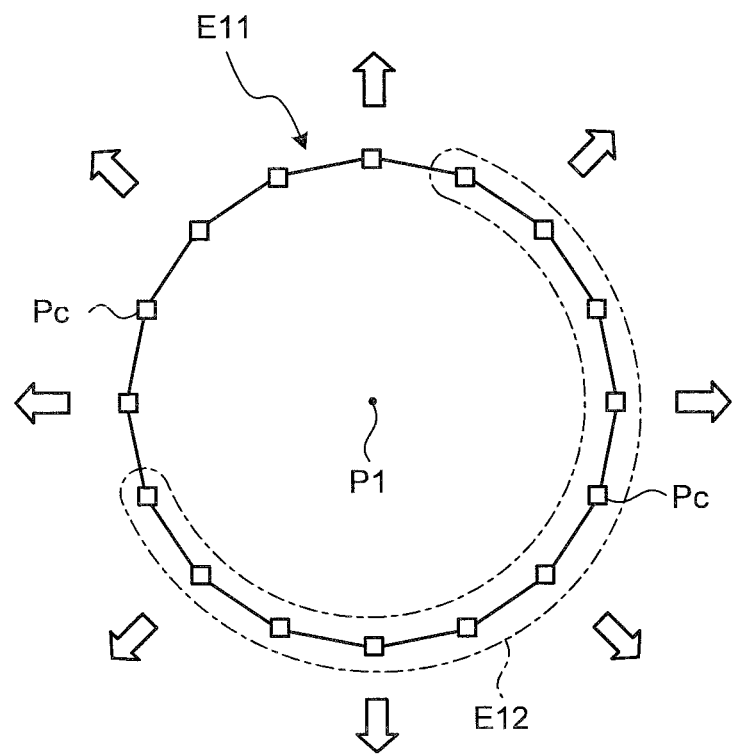
FIG. 2 is a view for explaining a principle of extraction of a closed region.

A principle of extraction of the closed region performed by the closed region extracting unit 22 in the first embodiment will now be described. FIG. 2 is a view for explaining the principle of extraction of the closed region, and schematically illustrates an initial closed region E11 set by the initial closed region setting unit 23 in the closed region extracting unit 22. As illustrated in FIG. 2, the initial closed region E11 has a plurality of control points Pc arranged in pixels on the boundary, and is set as a region obtained by connecting the control points Pc. While the initial closed region E11 is illustrated in a circular form in FIG. 2, it is not limited thereto. In addition, the size of the initial closed region E11 and the number of the control points Pc to be arranged can be set arbitrarily. For example, these elements are determined based on the size of the initial closed region. The edge inclusion energy, the internal energy, the image energy, and the external energy described above are calculated for each of the control points Pc based on the position of each of the control points Pc, the gradient strength in the position, a distance between a center of gravity (center) P1 and each of the control points Pc, the gradient strength of the pixel of the internal portion, and the like. By moving the control points Pc such that the weighted sum of the four types of energy becomes the minimum, the initial closed region E11 is transformed so as to expand the region, and thus the closed region is extracted.

After the closed region is extracted in this manner, the abnormal portion in the closed region is detected. In this example, as will be described later in detail, the abnormal portion is detected by performing morphological process, for example, three-dimensional morphological process (density morphology) using a spherical structural element. The morphological process includes opening process (refer to "Digital Image Processing", CG-ARTS Society, P 179 to P 180, Contraction and Expansion Process) and closing process (refer to "Digital Image Processing", CG-ARTS Society, P 179 to P 180, *Contraction and Expansion Process*). The opening process is a process for calculating a trajectory (plane) through which the maximum value of the outer periphery of a structural element passes when a reference figure (a sphere in this example), which is referred to as the structural element, is moved in a manner circumscribed on a target region from a side having a smaller pixel value (lower side) in a three-dimensional space whose pixel value is considered high. By contrast, the closing process is a process for calculating a trajectory (plane) through which the minimum value of the outer periphery of the structural element passes when the structural element is moved in a manner circumscribed on a target region from a side having a larger pixel value (upper side) in a similar three-dimensional space. When the opening process is performed, the value on the obtained trajectory is used as a reference value, thereby detecting a pixel having a large difference between the reference value and an actual pixel value as an abnormal portion. Similarly, when the closing process is performed, a pixel having a large difference between the reference value on the obtained trajectory and an actual pixel value is detected as an abnormal portion.

Figure 3:
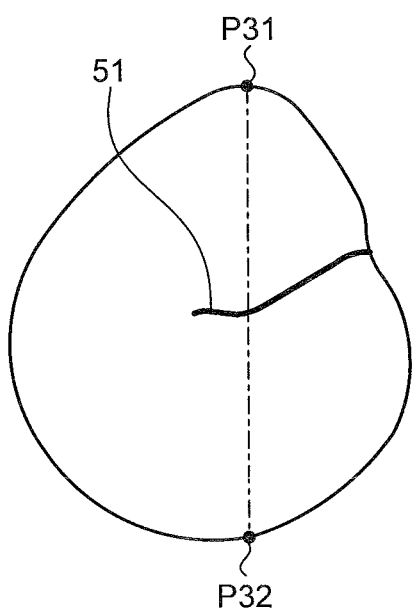
FIG. 3 is a view illustrating a closed region including an edge such as a groove position inside thereof.
Figure 4:
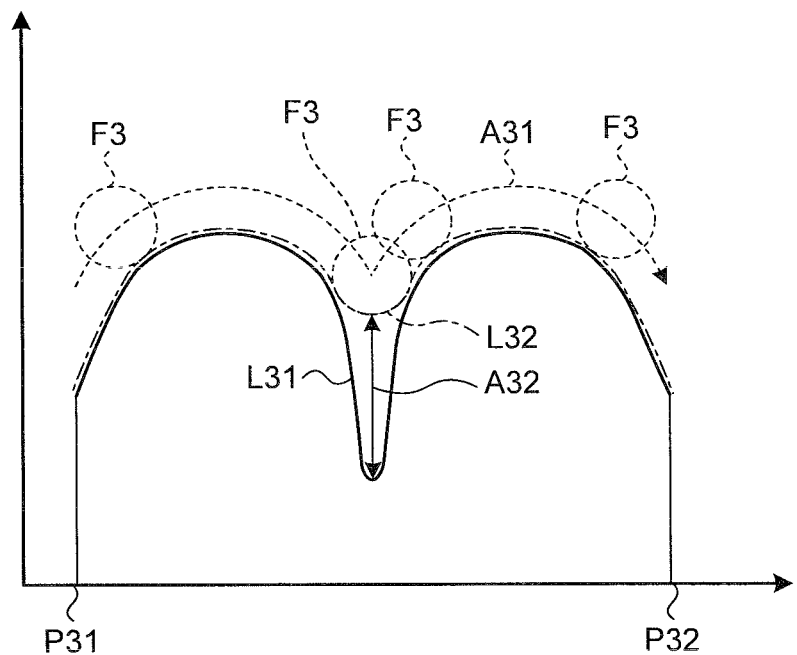
FIG. 4 is a view illustrating a change curve of the pixel value on a line indicated by a dashed-dotted line in FIG. 3.

In the case where the morphological process including the opening process and the closing process described above is performed to detect an abnormal portion for each of the closed regions, when a groove position is included inside of the closed region, the groove position may have been misdetected as an abnormal portion. FIG. 3 is a schematic view of an example of the closed region, and illustrates a closed region formed so as to include an edge 51, which is a groove position or the like, inside thereof. FIG. 4 illustrates a change curve L31 of the pixel value in which the horizontal axis represents a pixel position between boundary pixels P31 and P32 on a line (line crossing the edge 51) indicated by a dashed-dotted line in FIG. 3, and the vertical axis represents a pixel value of each corresponding pixel. On the line crossing the edge 51, as illustrated in FIG. 4, the change in the pixel value is depressed significantly in the edge position locally. Therefore, when the morphological process (closing process) is performed on the closed region including the edge 51 inside thereof, and a structural element F3 is moved in a manner circumscribed on the target region from the upper side (arrow A31), if the structural element F3 is larger than the width of the depressed portion described above, the structural element F3 cannot enter the portion, whereby a trajectory L32 (practically, a plane) indicated by a dashed-dotted line in FIG. 4 is obtained. In this manner, if the internal portion of the closed region includes the edge 51, which is a groove position or the like, the obtained reference value deviates significantly from an actual pixel value depending on the shape of the structural element F3. By contrast, as described above, in the detection of an abnormal portion, the value on the obtained trajectory L32 is used as a reference value to compare a pixel value of each pixel with the reference value, thereby detecting a pixel having a large difference therebetween as an abnormal portion. Therefore, if the closed region including the edge, which is a groove position or the like, inside thereof is formed, the portion of the edge 51 may be misdetected as an abnormal portion by the difference indicated by the arrow A32.

Figure 5:
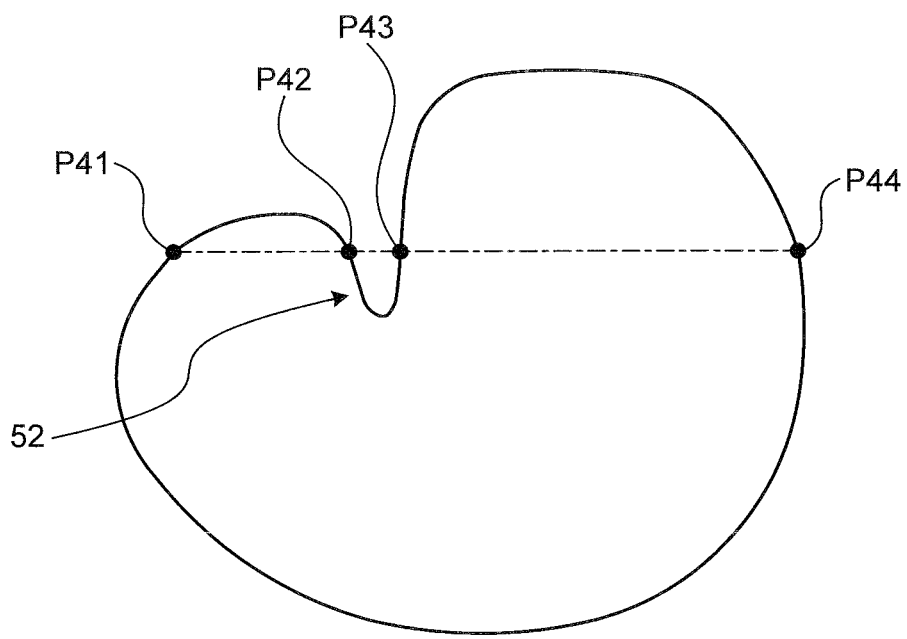
FIG. 5 is a view illustrating a closed region including an edge that bends significantly, such as a contour portion, on the boundary thereof.
Figure 6:
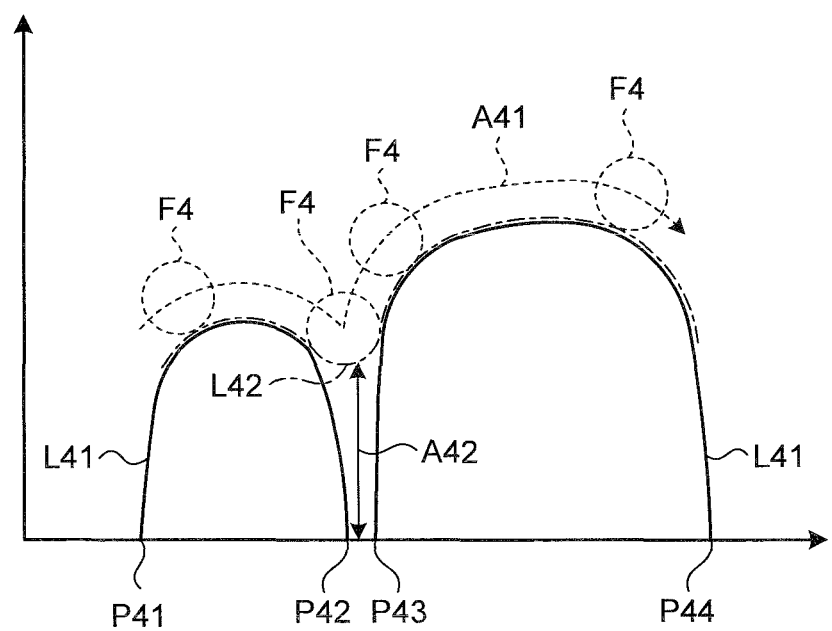
FIG. 6 is a view illustrating a change curve of the pixel value on a line indicated by a dashed-dotted line in FIG. 5.

Similarly, if the boundary of the closed region includes a contour portion bending with a predetermined curvature or higher toward an inner side of the closed region, the contour portion may have been misdetected as an abnormal portion. FIG. 5 is a schematic view of another example of a closed region, and illustrates the closed region formed so as to include an edge 52, which is a contour portion or the like, bending with a predetermined curvature or higher toward an inner side of the closed region on the boundary thereof. FIG. 6 illustrates a change curve L41 of the pixel value in which the horizontal axis represents a pixel position between boundary pixels P41 and P44 on a line (line crossing the bent portion of the edge 52) indicated by a dashed-dotted line in FIG. 5, and the vertical axis represents a pixel value of each pixel between the boundary pixels P41 and P42, and between the boundary pixels P43 and P44 inside of the closed region. On the line crossing the bent portion of the edge 52, as illustrated in FIG. 6, the change in the pixel value is interrupted in the bent portion. When the morphological process (closing process) is performed on the closed region including the edge 52 bending inward significantly on the boundary, and a structural element F4 is moved in a manner circumscribed on the target region from the upper side (arrow A41), if the structural element F4 is larger than the width of the interrupted portion described above, the structural element F4 cannot enter the portion, whereby a trajectory L42 (practically, a plane) indicated by a dashed-dotted line in FIG. 6 is obtained. In this manner, if the boundary of the closed region includes the edge, which is a contour portion or the like, bending inward significantly, in the same manner as in the case where the internal portion of the closed region includes the edge, which is a groove position or the like, the obtained reference value deviates significantly from an actual pixel value depending on the shape of the structural element. As a result, the contour portion may be misdetected as an abnormal portion by the difference indicated by the arrow A42.

To prevent such situations from occurring, in the first embodiment, the closed region extracting unit 22 extracts a closed region under the conditions that no pixel (no pixel on the edge portion) having a gradient strength equal to or higher than a predetermined value is included in a region, and that the boundary of the region does not bend with a predetermined curvature or higher toward the inner side of the closed region. This makes it possible to obtain a reference value properly in the detection of an abnormal portion in a latter stage by applying the morphological process.

Figure 7:
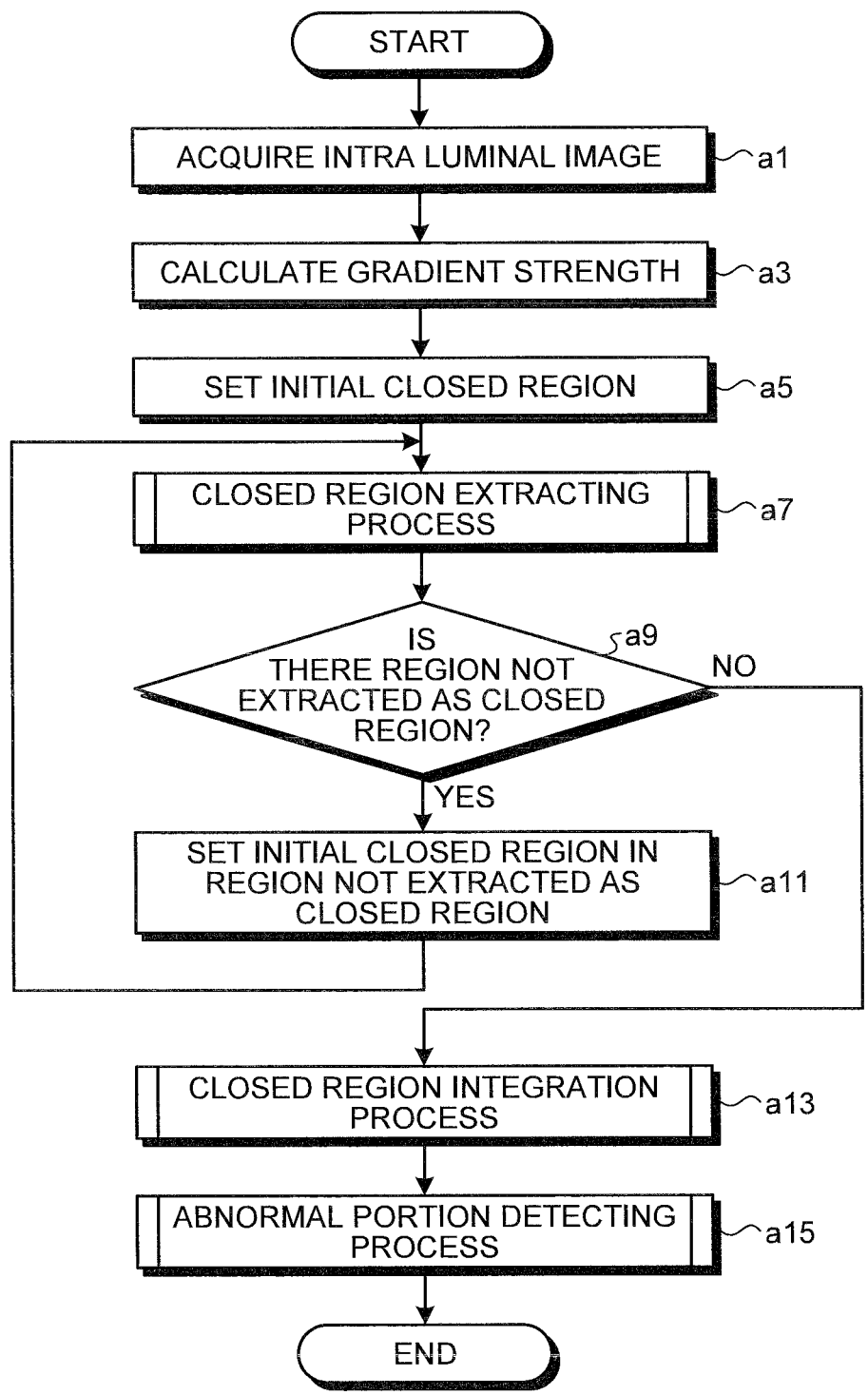
FIG. 7 is an entire flowchart indicating processes performed by the image processing apparatus according to the first embodiment.

A description will be made of a specific process performed by the image processing apparatus 1 according to the first embodiment. FIG. 7 is an entire flowchart indicating a process performed by the image processing apparatus 1 according to the first embodiment. The process described herein is realized by the calculation unit 20 executing the image processing program 141 recorded in the recording unit 14.

As illustrated in FIG. 7, the calculation unit 20 acquires an intraluminal image to be processed (Step a1). In this process, the calculation unit 20 reads and acquires the intraluminal image to be processed that is acquired by the image acquiring unit 11 and recorded in the recording unit 14.

The gradient strength calculating unit 21 then calculates the gradient strength for each pixel based on, for example, a G-value of each pixel of the intraluminal image (Step a3). This process can be realized by performing well-known edge extracting process (refer to "Digital Image Processing", CG-ARTS Society, P 114 to P 121, *Edge Extraction*) using a primary differential filter such as a Sobel filter, and a secondary differential filter such as a Laplacian filter, for example. The G-value is used so as to indicate the structure of the intraluminal image sufficiently because the G-value is close to the absorption wavelength range of hemoglobin, and offers excellent sensitivity. The gradient strength herein is calculated based on the G-value of each pixel. Alternatively, the brightness value of each pixel is calculated, and the gradient strength of each pixel may be calculated based on the brightness value.

The initial closed region setting unit 23 sets an initial shape (initial closed region) of the closed region (Step a5). For example, the initial closed region setting unit 23 determines a setting position at random, and sets the initial closed region at the determined setting position. In addition, at this time, the initial closed region setting unit 23 calculates a center of gravity (center) of the initial closed region thus set. The size and the shape of the initial closed region to be set, and the number of control points arranged thereon are fixed, for example, and specified in advance. Alternatively, these values can be set variably in accordance with a user operation. The method for setting the initial closed region is not particularly restricted, and the initial closed region may be set by selecting a portion having a small gradient strength based on the gradient strength of each pixel.

Figure 8:
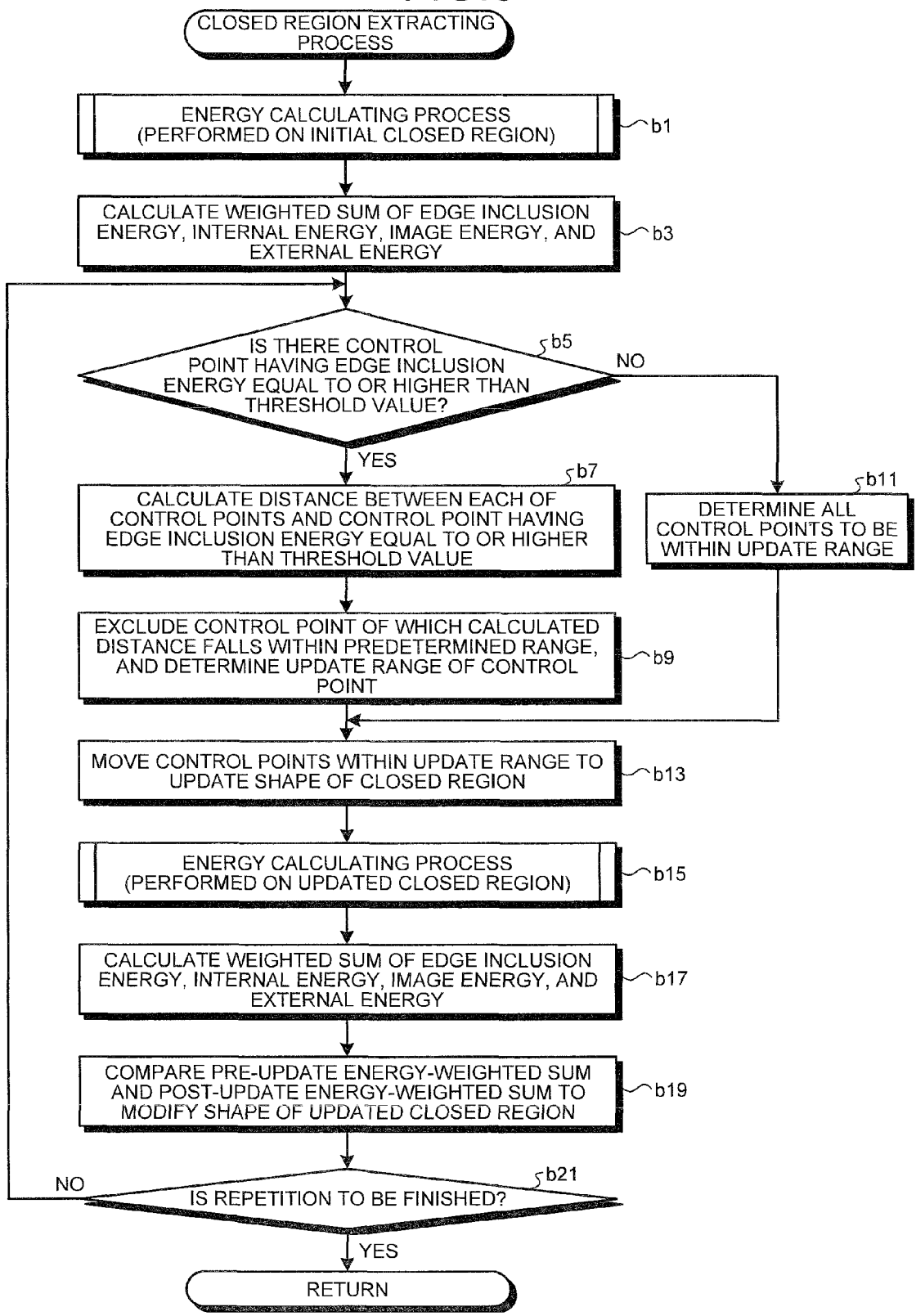
FIG. 8 is a flowchart indicating a detailed processing of closed region extracting process according to the first embodiment.

The closed region extracting unit 22 performs closed region extracting process (Step a7). FIG. 8 is a flowchart indicating a detailed processing of the closed region extracting process according to the first embodiment. As illustrated in FIG. 8, in the closed region extracting process according to the first embodiment, the energy calculating unit 24 performs energy calculating process first (Step b1). The energy calculating process is performed on the initial closed region by the same process as that of Step b15 in a latter stage, and the values of the four types of energy of the edge inclusion energy, the internal energy, the image energy, and the external energy are calculated for each of the control points. The detailed processing thereof will be described later in the description of Step b15.

The energy-weighted sum calculating unit 27 calculates the weighted sum of the four types of energy of the edge inclusion energy, the internal energy, the image energy, and the external energy calculated at Step b1 for the initial closed region (Step b3). Specifically, the weighted sum of the four types of energy is calculated as the sum of the weighted sum (weighted sum of the edge inclusion energy, the internal energy, the image energy, and the external energy) of the four types of energy of the edge inclusion energy, the internal energy, the image energy, and the external energy calculated for each of the control points at Step b1. Subsequently, by repeating the process of Step b5 to Step b19, the initial closed region (initial shape of the closed region) is updated, thereby extracting the closed region.

At Step b5, the update range determining unit 29 determines whether a control point having a value of the edge inclusion energy equal to or higher than a threshold value specified in advance is present. If a control point having a value of the edge inclusion energy equal to or higher than the predetermined threshold value is present (YES at Step b5), the update range determining unit 29 calculates a distance between each of the control points and the control point having the value of the edge inclusion energy equal to or higher than the predetermined threshold value (Step b7). The update range determining unit 29 then excludes the control point of which the distance thus calculated falls within a predetermined range specified in advance, and thus determines the update range of the control points (Step b9). In other words, the update range determining unit 29 excludes the control point of which the distance from the control point having the value of the edge inclusion energy equal to or higher than the predetermined threshold value falls within the predetermined range from the update range of the control points. At this time, the update range determining unit 29 also excludes the control point of which the distance from the control point already having the value of the edge inclusion energy equal to or higher than the predetermined threshold value by repeating the process of Step b5 to Step b19 falls within the predetermined range from the update range of the control points. If there is no control point having a value of the edge inclusion energy equal to or higher than the predetermined threshold value (NO at Step b5), the update range determining unit 29 determines all of the control points to be within the update range (Step b11).

Subsequently, the closed region updating unit 28 moves the control points within the update range determined at Step b9 or Step b11 to update the shape of the closed region (Step b13). For example, the closed region updating unit 28 moves the control points within the update range so as to give priority to the outward direction of the closed region among eight directions therearound, and thus updates the shape of the closed region in an expanding direction. For example, in the example of FIG. 2, the closed region updating unit 28 moves the position of each of the control points Pc toward the outside of the boundary of the initial closed region E11, and updates the shape thereof in the expanding direction as indicated by arrows in FIG. 2. The distance by which each of the control points is to be moved is determined by generating random numbers, for example. At this time, if the update range of the control points Pc is a range E12 indicated by being surrounded with a dashed-dotted line in FIG. 2, the closed region updating unit 28 does not move the control points Pc outside of the update range E12, and moves the control points Pc within the update range E12 alone to update the shape of the closed region.

Figure 9:
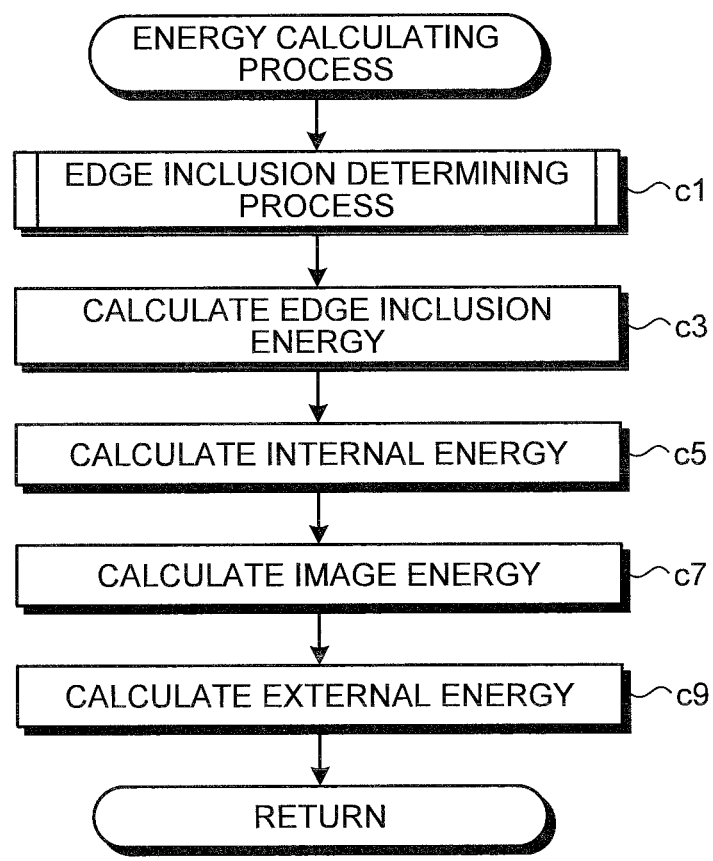
FIG. 9 is a flowchart indicating a detailed processing of energy calculating process according to the first embodiment.

The energy calculating unit 24 then performs energy calculating process (Step b15). At Step b15, the energy calculating unit 24 performs the energy calculating process on the closed region updated at Step b13. FIG. 9 is a flowchart indicating a detailed processing of the energy calculating process according to the first embodiment.

Figure 10:
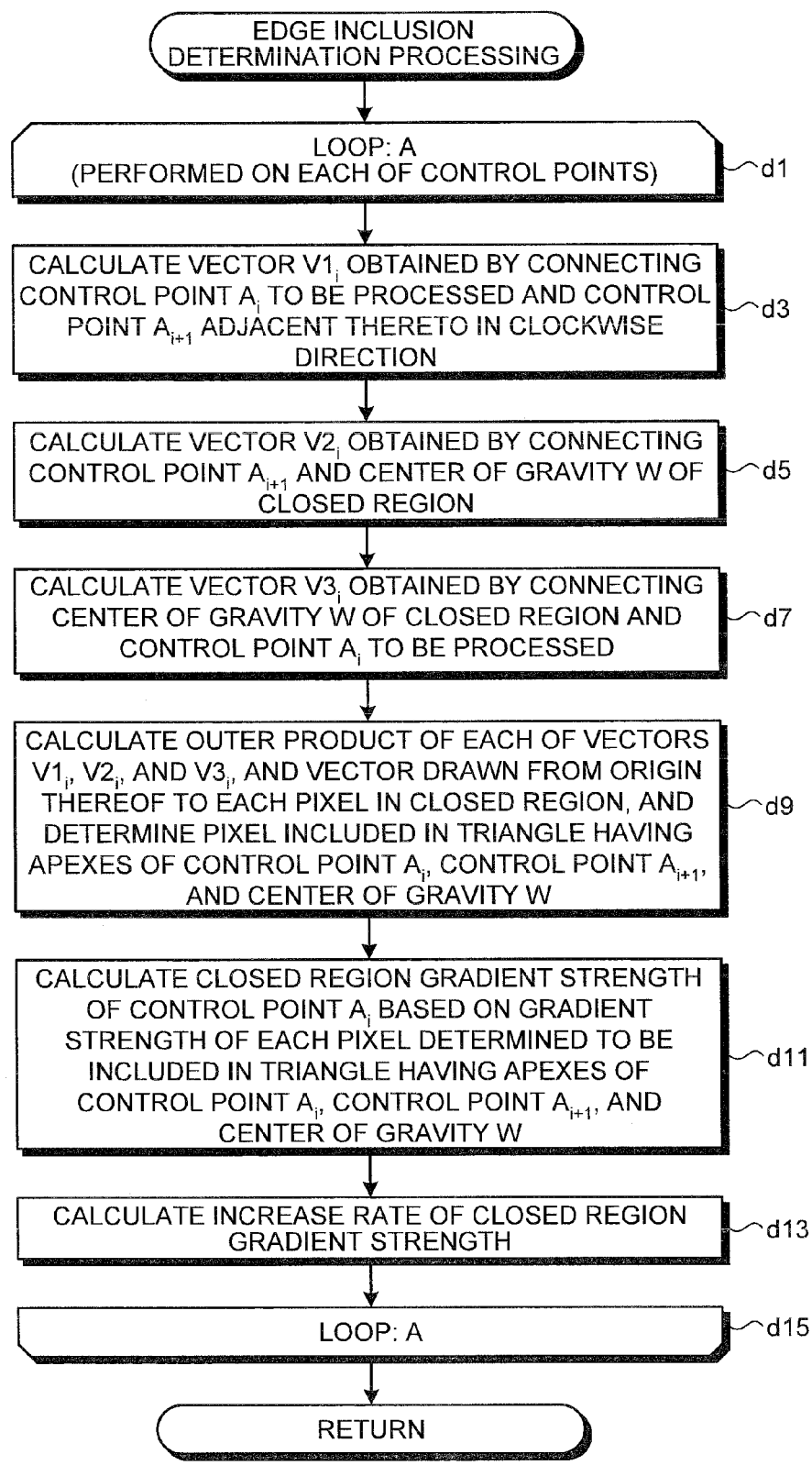
FIG. 10 is a flowchart indicating a detailed processing of edge inclusion determining process according to the first embodiment.
Figure 11:
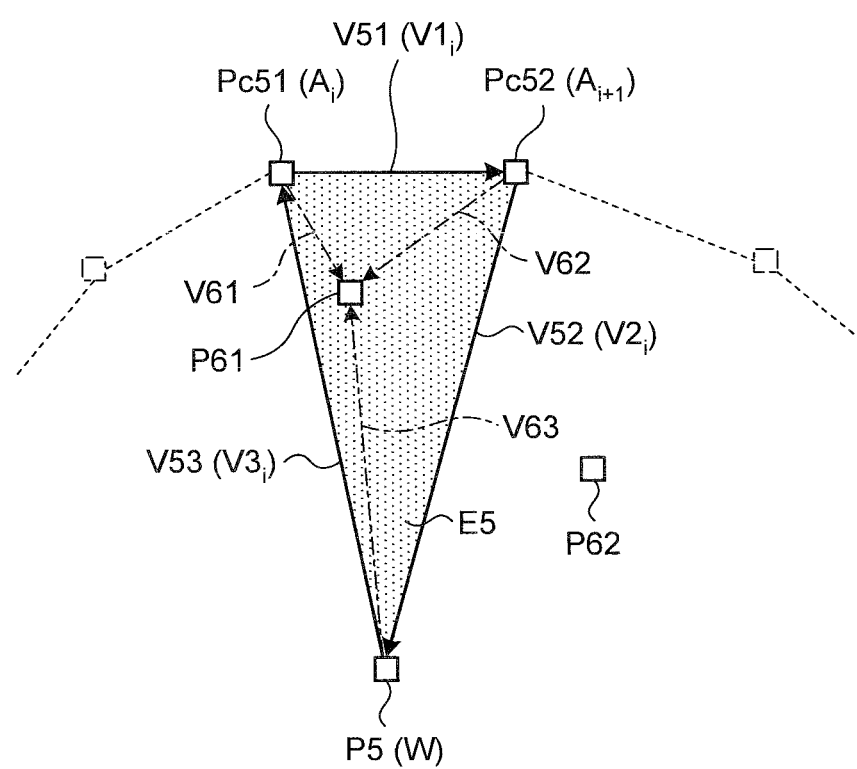
FIG. 11 is a view for explaining a principle of the edge inclusion determining process according to the first embodiment.

As illustrated in FIG. 9, in the energy calculating process according to the first embodiment, the edge inclusion energy calculating unit 25 performs edge inclusion determining process (Step c1). In the edge inclusion determining process, the control points are made to be processed sequentially, and the closed region gradient strength is calculated for the control point to be processed based on the gradient strength in the inclusion determination region. Specifically, a triangle having apexes of the control point to be processed, a control point adjacent to the control point to be processed in the clockwise direction, and the center of gravity of the closed region is determined to be the inclusion determination region, and the closed region gradient strength is calculated based on the gradient strength of pixels included in the inclusion determination region. The increase rate of the closed region gradient strength is then calculated before and after the update of the closed region. FIG. 10 is a flowchart indicating a detailed processing of the edge inclusion determining process according to the first embodiment. FIG. 11 is a view for explaining a principle of the edge inclusion determining process according to the first embodiment, and illustrates a center of gravity P5 of the closed region, and two control points Pc51 and Pc52 arranged on the boundary of the closed region.

As illustrated in FIG. 10, in the edge inclusion determining process according to the first embodiment, the process of a loop A is performed on each of the control points (Step d1 to Step d15). In the process of the loop A, the closed region gradient strength calculating unit 251 in the edge inclusion energy calculating unit 25 calculates a vector V1$_i$ obtained by connecting a control point A$_i$ (i=0, 1, 2, ..., n: n represents the number of the control points) serving as the control point to be processed, and a control point A$_{i+1}$ adjacent to the control point A$_i$ in the clockwise direction (Step d3). For example, as illustrated in FIG. 11, the closed region gradient strength calculating unit 251 calculates a vector V51 drawn from a control point Pc51 serving as the control point A$_i$ to a control point Pc52 serving as the control point A$_{i+1}$ adjacent to the control point Pc51 in the clockwise direction as the vector V1$_i$.

The closed region gradient strength calculating unit 251 then calculates a vector V2$_i$ obtained by connecting the control point A$_{i+1}$ adjacent to the control point A$_i$ in the clockwise direction and a center of gravity W of the closed region (which is the initial closed region when the energy calculating process is performed as the process at Step b1 in the former stage in FIG. 8, and is the same hereinafter in the description of the energy calculating process) (Step d5). For example, in the example of FIG. 11, the closed region gradient strength calculating unit 251 calculates a vector V52 drawn from the control point Pc52 to a center of gravity P5 serving as the center of gravity W of the closed region as the vector V2$_i$.

The closed region gradient strength calculating unit 251 then calculates a vector V3$_i$ obtained by connecting the center of gravity W of the closed region and the control point A$_i$ (Step d7). For example, in the example of FIG. 11, the closed region gradient strength calculating unit 251 calculates a vector V53 drawn from the center of gravity P5 to the control point Pc51 as the vector V3$_i$.

The closed region gradient strength calculating unit 251 then focuses on each pixel in the closed region sequentially, calculates the outer product of each of the calculated three vectors V1$_i$, V2$_i$, and V3$_i$, and a vector drawn from the origin thereof to the focused pixel, and thus determines the pixel included in the inclusion determination region of the control point to be processed, that is, the pixel included in the triangle having the apexes of the control point $A_i$, the control point $A_{i+1}$, and the center of gravity W (Step d9). If all the signs of the outer products thus calculated are the same, the closed region gradient strength calculating unit 251 determines the focused pixel to be a pixel in the inclusion determination region. If all the signs are not the same, the closed region gradient strength calculating unit 251 determines the focused pixel to be a pixel outside of the inclusion determination region.

For example, if a pixel P61 included in an inclusion determination region E5 of the control point Pc51 indicated by hatching in FIG. 11, that is, the pixel P61 in the triangle having the apexes of the control point Pc51, the control point Pc52, and the center of gravity P5 is focused, the closed region gradient strength calculating unit 251 calculates an outer product of the vector V51 and a vector V61 drawn from the control point Pc51 to the focused pixel P61 (V51×V61), an outer product of the vector V52 and a vector V62 drawn from the control point Pc52 to the focused pixel P61 (V52×V62), and an outer product of the vector V53 and a vector V63 drawn from the center of gravity P5 to the focused pixel P61 (V53×V63). Because the pixel included in the inclusion determination region E5, such as the focused pixel P61, is present on the right with respect to each of the vectors V51, V52, and V53, the signs of the obtained outer products are the same. By contrast, if the outer products are calculated for a pixel outside of the inclusion determination region E5, such as a pixel P62, the signs of the obtained outer products are not the same.

The closed region gradient strength calculating unit 251 then calculates the average value of the gradient strengths of the pixels determined to be included in the inclusion determination region as the closed region gradient strength of the control point $A_i$ serving as the control point to be processed (Step d11). Alternatively, the closed region gradient strength calculating unit 251 may select pixels (pixels on the edge portion) having the gradient strengths equal to or higher than a predetermined value among the pixels determined to be included in the inclusion determination region, and calculate the average value of the gradient strengths of the selected pixels as the closed region gradient strength. In this case, the edge inclusion energy calculated at step c3 in a latter stage in FIG. 9 is energy that indicates a larger value as more pixels having the gradient strengths equal to or higher than the predetermined value are present in the closed region (practically, in the inclusion determination region corresponding thereto).

Subsequently, the increase rate calculating unit 252 calculates an increase rate Xi (i=0, 1, 2, . . . , n: n represents the number of the control points) by Equation (1) based on the closed region gradient strength of the control point to be processed calculated at Step d11 (Step d13). The closed region is extracted by repeatedly performing the process for modifying the shape of the closed region (updated closed region) updated at Step b13 in the former stage in FIG. 8 at Step b19 in a latter stage such that the weighted sum of the four types of energy described above is made the minimum. In Equation (1), the closed region gradient strength before the update represents the closed region gradient strength of the closed region prior to being updated at Step b13, and the closed region gradient strength after the update represents the closed region gradient strength of the closed region updated at Step b13.

Increase Rate Xi=Closed Region Gradient Strength After Update/Closed Region Gradient Strength Before Update (1)

When the increase rate Xi is calculated in this manner, the process of the loop A on the control point to be processed is finished. After the process of the loop A is performed on all of the control points, the process returns to Step c1 and goes to Step c3 in FIG. 9.

At Step c3, the edge inclusion energy calculating unit 25 calculates the edge inclusion energy that indicates a larger value as the closed region gradient strength becomes larger for each of the control points (Step c3). In the first embodiment, the edge inclusion energy calculating unit 25 calculates edge inclusion energy $E_i$ by Equation (2) based on the increase rate Xi calculated at Step d13 in FIG. 10 such that the edge inclusion energy $E_i$ indicates a larger value as the increase rate Xi becomes higher. It is to be noted that δ in Equation (2) represents a weighting factor for energy, and the value thereof is determined in accordance with experimental rules.

$$Ei(i)=\delta Xi \qquad (2)$$

FIG. 12 is a view for explaining the edge inclusion energy. As illustrated in (a) of FIG. 12, the case where an edge (linear edge) EL6, which is a groove position or the like, intrudes into an inclusion determination region E6 of a control point Pc61, that is, into a triangle having apexes of the control point Pc61, a control point Pc62, and a center of gravity P6 is assumed. As described above, the closed region is updated in the expanding direction by moving the control points to the outside thereof. Therefore, if the closed region is updated, the edge EL6 further intrudes into the inclusion determination region E6 of the control point Pc6 ((b) of FIG. 12), thereby increasing the closed region gradient strength obtained for the control point Pc61 after the update. Accordingly, when the increase rate of the closed region gradient strength is high, it can be assumed that an edge intrudes into the inclusion determination region of the control point. By contrast, even when the closed region gradient strength before the update is large to some extent, if the closed region gradient strength does not increase after the update, it can be assumed that the large closed region gradient strength is attributed to noise or the like. As described above, by calculating the value of the edge inclusion energy such that the edge inclusion energy indicates a larger value as the increase rate of the closed region gradient strength in the inclusion determination region becomes higher, it is possible to extract the closed region while restricting inclusion of an edge (linear edge) such as a groove position in the closed region without restricting inclusion of a relatively small edge such as noise to the closed region. It is to be noted that this can be also applied to a linear edge such as a contour portion, which is not illustrated.

Subsequently, as illustrated in FIG. 9, the energy calculating unit 24 calculates the value of the internal energy that indicates a smaller value as the boundary of the closed region is smoother for each of the control points (Step c5). For example, the energy calculating unit 24 calculates the value of the internal energy based on inner products of vectors between the control points adjacent to each other. For example, the energy calculating unit 24 calculates internal energy $E_{internal}$ based on inner products of vectors between a focused control point $(x_i, y_i)$ and two control points $(x_{i-1}, y_{i-1})$ and $(x_{i+1}, y_{i+1})$ adjacent thereto by Equation (3). The internal energy $E_{internal}$ restrains the focused control point from bending inward the closed region by a predetermined curvature or larger with respect to the positions of the control points adjacent thereto.

$$E_{internal}(i) = \frac{(x_{i-1} - x_i) \times (x_{i+1} - x_i) + (y_{i-1} - y_i) \times (y_{i+1} - y_i)}{\sqrt{(x_{i-1} - x_i) \times (x_{i+1} - x_i) + (y_{i-1} - y_i)(y_{i-1} - y_i)} \times \sqrt{(x_{i+1} - x_i) \times (x_{i+1} - x_i) + (y_{i+1} - y_i)(y_{i+1} - y_i)}} \quad (3)$$

The energy calculating unit 24 then calculates the value of the image energy that indicates a smaller value as the gradient strength in the boundary of the closed region becomes larger for each of the control points (Step c7). For example, image energy $E_{image}$ is expressed by Equation (4), and calculated as an inverse of the gradient strength of the pixel in the position of the focused control point.

$$E_{image}(i) = \beta \frac{1}{\nabla s_{(i)}} \quad (4)$$

where $\nabla s_{(i)}$ represents a value of the gradient strength of a control point (i) on the coordinate.

The energy calculating unit 24 then calculates the value of the external energy that indicates a smaller value as the size of the closed region becomes larger for each of the control points (Step c9). External energy $E_{external}$ is energy received by the focused control point in the expanding direction of the closed region. For example, the external energy $E_{external}$ is expressed by Equation (5), and calculated as an inverse of the distance between the center of gravity of the closed region and the focused control point.

$$E_{external}(i) = \gamma \frac{1}{l_i} \quad (5)$$

$$l_i = \sqrt{(x_i - x_c)^2 + (y_i - y_c)^2}$$

where, $$(x_c, y_c) = \left( \frac{\sum_{i=1}^{N} x_i}{N}, \frac{\sum_{i=1}^{N} y_i}{N} \right).$$

It is to be noted that α in Equation (3), β in Equation (4), and γ in Equation (5) represent weighting factors for corresponding energy, and the values are determined in accordance with experimental rules. The values of α, β, and γ may be fixed values, or may be set variably in accordance with an operational input by a user, for example.

In this manner, after the values of the four types of energy of the edge inclusion energy, the internal energy, the image energy, and the external energy are calculated, the process returns to Step b15 and goes to Step b17 in FIG. 8.

At Step d17, the energy-weighted sum calculating unit 27 calculates the weighted sum (weighted sum of the edge inclusion energy, the internal energy, the image energy, and the external energy) of the four types of energy of the edge inclusion energy, the internal energy, the image energy, and the external energy calculated at Step b15 for the closed region updated at Step b13. The process is performed in the same manner as of Step b3, and the sum of the weighted sum of the four types of energy for each of the control points is calculated.

The closed region updating unit 28 then compares the weighted sum of the four types of energy of the closed region prior to being updated at Step b13 (hereinafter, also referred to as the "pre-update energy-weighted sum"), and the weighted sum calculated at Step b15 of the four types of energy for the closed region updated at Step b13 (hereinafter, also referred to as the "post-update energy-weighted sum"), and modifies the shape of the closed region (Step b19). Specifically, if the pre-update energy-weighted sum is smaller than the post-update energy-weighted sum, the closed region updating unit 28 modifies the shape of the closed region to the shape prior to being updated. When the process at Step b19 is performed for the first time, the weighted sum of the four types of energy calculated for the initial closed region at Step b3 is considered to be the pre-update energy-weighted sum. In this case, if the pre-update energy-weighted sum is smaller than the post-update energy-weighted sum, the closed region updating unit 28 modifies the shape of the closed region to the initial shape.

Subsequently, the closed region updating unit 28 determines whether to finish the repetition. The closed region updating unit 28 determines not to finish the repetition while the post-update energy-weighted sum is equal to or smaller than the pre-update energy-weighted sum, or the state in which the post-update energy-weighted sum does not change even if the shape of the closed region is updated is not yet repeated for a predetermined number of times specified in advance (NO at step b21). In this case, the process of Step b5 to Step b19 is performed on the shape of the closed region updated at this time to update the shape of the closed region. By contrast, if the post-update energy-weighted sum is larger than the pre-update energy-weighted sum, and the state in which the post-update energy-weighted sum does not change is repeated for the predetermined number of times, the closed region updating unit 28 determines to finish the repetition (YES at Step b21), and completes the closed region extracting process. Subsequently, the process returns to Step a7 and goes to Step a9 in FIG. 7.

At Step a9, the closed region extracting unit 22 determines whether a region that is not extracted as a closed region is present. If a region that is not extracted as a closed region is present (YES at Step a9), the closed region extracting unit 22 sets an initial closed region in the region that is not extracted as a closed region such that the initial closed region does not overlap with the extracted closed region (Step a11). Subsequently, the process returns to Step a7, and the closed region extracting process is repeated until there is no region that is not extracted as a closed region. By contrast, if the closed region extracting unit 22 determines that there is no region that is not extracted as a closed region at Step a9 (No at Step a9), the process goes to Step a13.

Figure 13:
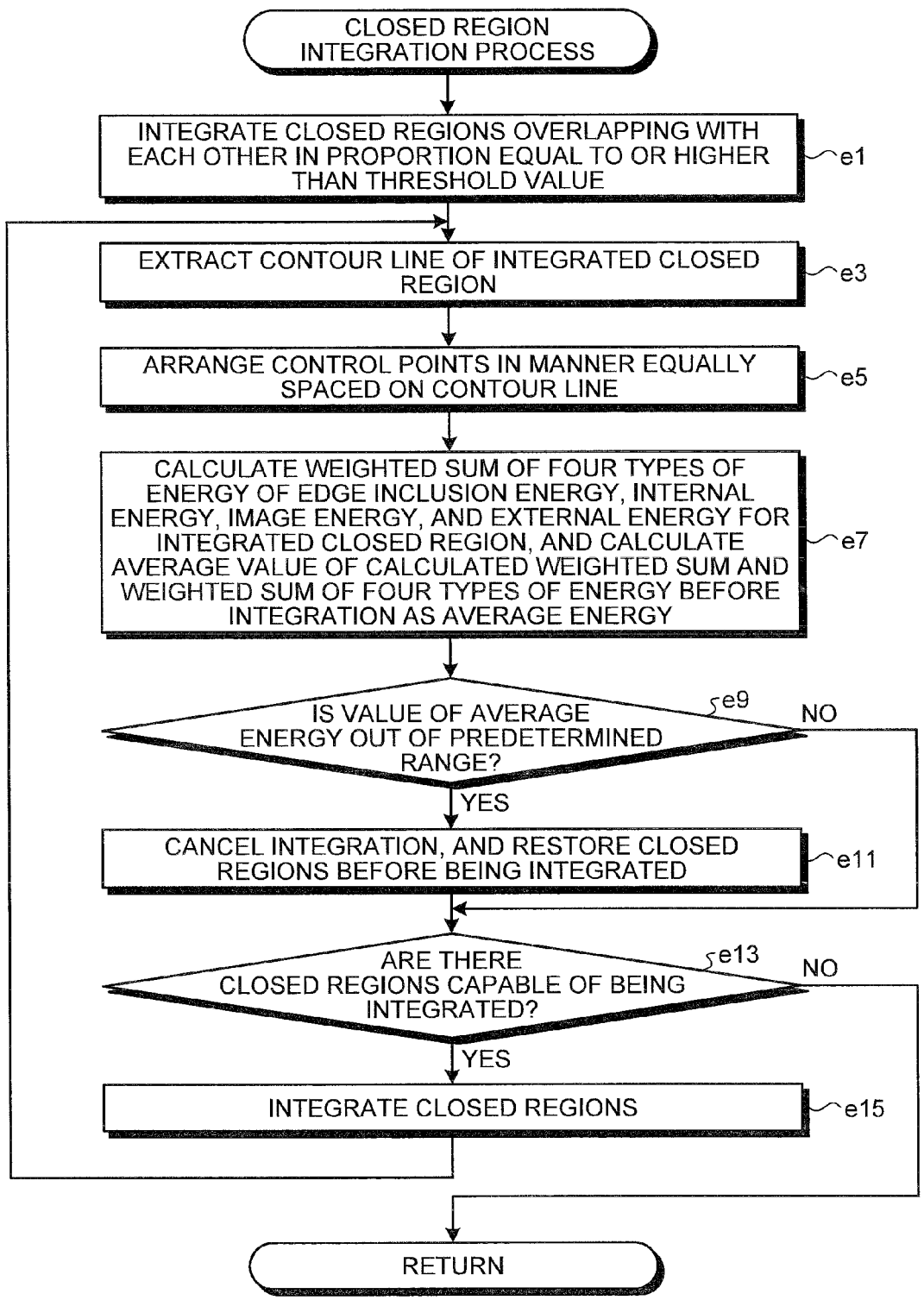
FIG. 13 is a flowchart indicating a detailed processing of closed region integration process.

At Step a13, the region integrating unit 32 performs a closed region integration process. FIG. 13 is a flowchart indicating a detailed processing of the closed region integration process. As illustrated in FIG. 13, in the closed region integration process, the integrating unit 321 integrates the closed regions overlapping with each other in a proportion equal to or higher than a threshold value specified in advance (Step e1).

The post-integration energy calculating unit 322 then extracts a contour line of the integrated closed region (Step e3). This process can be realized, for example, by using a well-known contour tracing method (refer to "Digital Image Processing", CG-ARTS Society, P 178 to P 179, *Contour Tracking*).

The post-integration energy calculating unit 322 then arranges a plurality of control points in the pixels on the boundary of the integrated closed region in a manner equally spaced (Step e5). The post-integration energy calculating unit 322 then calculates the values of the four types of energy of the edge inclusion energy, the internal energy, the image energy, and the external energy for each of the control points arranged at Step e5 to calculate the weighted sum thereof, and calculates the average value of the weighted sum thus calculated and the weighed sum of the four types of energy of each of the closed regions before being integrated as average energy (Step e7). The values of the four types of energy for each of the control points thus arranged are calculated by the same process as that in the energy calculating process in FIG. 9, and the weighed sum thereof is calculated by the same process as that of Step b3 in FIG. 8.

The region integrating unit 32 determines whether the value of the average energy is out of a predetermined range specified in advance to determine whether to permit the integration (whether to integrate the closed regions). If the value of the average energy is out of the predetermined range (YES at Step e9), the region integrating unit 32 cancels the integration, and restores the closed regions before being integrated (Step e11). If the value of the average energy falls within the predetermined range (No at Step e9), the region integrating unit 32 goes to Step e13 without performing the process at Step e11, thereby permitting the integration. In this manner, the closed regions thus integrated become one closed region.

The region integrating unit 32 then determines whether closed regions capable of being integrated, that is, closed regions overlapping with each other in the proportion equal to or higher than the threshold value are present. If such closed regions are present (YES at Step e13), the region integrating unit 32 integrates corresponding closed regions (Step e15), and then returns to Step e3 to repeat the process. At this time, the region integrating unit 32 excludes the closed regions in which the region integrating unit 32 has already canceled the integration at Step e11, and determines whether closed regions capable of being integrated are present. By contrast, if the region integrating unit 32 determines that there is no closed region capable of being integrated (NO at Step e13), the process returns to Step a13 and goes to Step a15 in FIG. 7. By performing the closed region integration process described above, it is possible to integrate closed regions having small changes in the weighted sum of the four types of energy before and after the integration into one closed region. Therefore, process load in abnormal portion detecting process performed at Step a15 in a latter stage can be reduced.

At Step a15, the abnormal portion detecting unit 33 performs the abnormal portion detecting process. In the first embodiment, for example, the well-known opening process is performed on an closing image on which the well-known closing process is performed, and threshold process is performed on the difference between the pixel value (reference value) thus obtained and the original pixel value to detect an abnormal portion.

Figure 14:
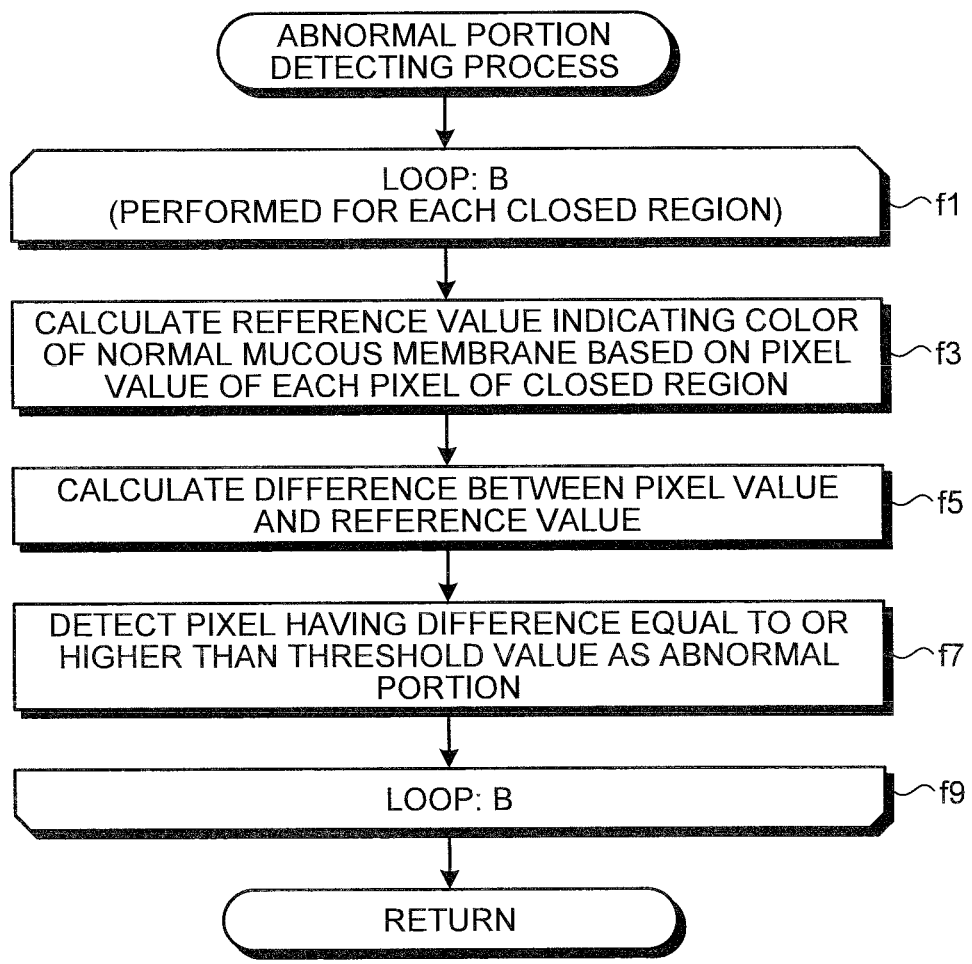
FIG. 14 is a flowchart indicating a detailed processing of abnormal portion detecting process.

FIG. 14 is a flowchart indicating a detailed processing of the abnormal portion detecting process. As illustrated in FIG. 14, in the abnormal portion detecting process, the abnormal portion detecting unit 33 performs process of a loop B on each closed region (Step f1 to Step f9). In the loop B, the abnormal portion detecting unit 33 calculates the reference value for each pixel of the closed region to be processed (Step f3). The abnormal portion detecting unit 33 then calculates the difference between the pixel value and the reference value calculated at Step f3 for each pixel of the closed region to be processed (Step f5). The abnormal portion detecting unit 33 then performs thresholding process on the difference to detect a pixel having a difference equal to or higher than a threshold value specified in advance as an abnormal portion (Step f7). After the process of the loop B is performed on all of the closed regions, the process returns to Step a15 in FIG. 7, then the process is finished. The result of the abnormal portion detecting process in FIG. 14 (detection result of the abnormal portion at Step f7) is output to the display unit 13. For example, the abnormal portion in the intraluminal image is displayed in a discriminable manner from other areas, thereby showing the result to a user such as a doctor.

As described above, in the first embodiment, the closed region gradient strength is calculated for each of the control points by using the gradient strengths of the pixels included in the corresponding inclusion determination region, and the value of the edge inclusion energy is calculated such that the edge inclusion energy indicates a larger value as the increase rate of the closed region gradient strengths before and after update of the closed region becomes higher. The shape is updated such that the weighted sum of the plurality of types of energy including the edge inclusion energy is made the minimum, thereby extracting the closed region. At this time, the update range of the control points is determined such that control points that are present within the predetermined range from a control point that has a value of the edge inclusion energy equal to or higher than the threshold value specified in advance, and in which the corresponding inclusion determination region is assumed to be intruded by a linear edge, such as a groove position and a contour portion, are not to be moved when the shape of the closed region is updated next time. This makes it possible to extract such a closed region that satisfies the conditions that no pixel having the gradient strength equal to or higher than the predetermined value is included in the region, and that the boundary of the region does not bend with a predetermined curvature or higher toward the inner side of the region, while restraining a linear edge, such as a groove position and a contour portion, from intruding into the closed region in the process of updating the closed region. Therefore, it is possible to properly extract such a closed region that includes no groove position shown in an intraluminal image inside thereof, and no contour portion on the boundary thereof. By performing the morphological process on each of the extracted closed regions, an abnormal portion in the closed region can be detected. This allows the abnormal portion in an intraluminal image to be detected accurately without misdetecting the groove position and the contour portion as the abnormal portion.

Second Embodiment

Figure 15:
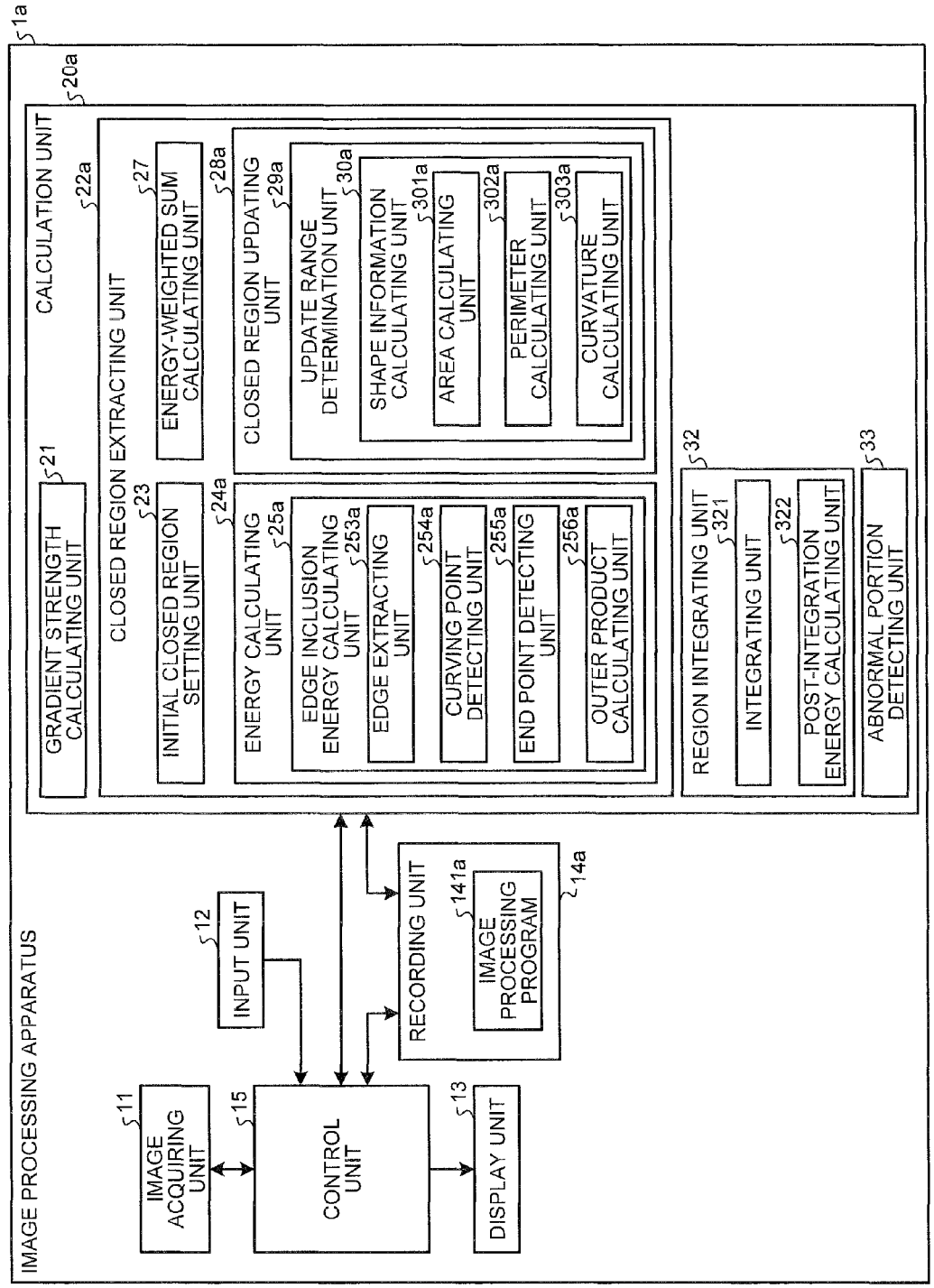
FIG. 15 is a block diagram for explaining a functional configuration of an image processing apparatus according to a second embodiment.

A configuration of an image processing apparatus according to a second embodiment will now be described. FIG. 15 is a block diagram for explaining a functional configuration of an image processing apparatus 1a according to the second embodiment. It is to be noted that the same numerals are assigned to the same components as those explained in the first embodiment. As illustrated in FIG. 15, the image processing apparatus 1a according to the second embodiment includes the image acquiring unit 11, the input unit 12, the display unit 13, a recording unit 14a, a calculation unit 20a, and the control unit 15 that controls operations of the entire image processing apparatus 1a.

The recording unit 14a records therein an image processing program 141a for realizing processes of the second embodiment and detecting an abnormal portion in an intraluminal image.

The calculation unit 20a includes the gradient strength calculating unit 21, a closed region extracting unit 22a, the region integrating unit 32, and the abnormal portion detecting unit 33. In the second embodiment, the closed region extracting unit 22a includes the initial closed region setting unit 23, an energy calculating unit 24a, the energy-weighted sum calculating unit 27, and a closed region updating unit 28a.

The energy calculating unit 24a includes an edge inclusion energy calculating unit 25a. The edge inclusion energy calculating unit 25a includes an edge extracting unit 253a serving as an edge extracting unit, a bending point detecting unit 254a serving as a bending point detecting unit, an end point detecting unit 255a serving as an end point detecting unit, and an outer product calculating unit 256a serving as an outer product calculating unit. The edge extracting unit 253a extracts a pixel having a gradient strength equal to or higher than a predetermined value (e.g., the same value as a predetermined value that is a condition for extracting the closed region) as an edge based on the gradient strength of each pixel in the intraluminal image. The bending point detecting unit 254a detects a bending point of the edge. The end point detecting unit 255a detects an end point of the edge. The outer product calculating unit 256a calculates outer products of a vector drawn from a control point to a center of gravity in the closed region, and vectors drawn from the control point to the bending point and the end point of the edge.

The closed region updating unit 28a includes an update range determining unit 29a. The update range determining unit 29a includes a shape information calculating unit 30a serving as a shape information calculating unit that calculates shape information of the closed region. The shape information calculating unit 30a includes an area calculating unit 301a serving for an area calculating unit, a perimeter calculating unit 302a serving as a perimeter calculating unit, and a curvature calculating unit 303a serving as a curvature calculating unit. The area calculating unit 301a calculates the area of the closed region. The perimeter calculating unit 302a calculates the perimeter of the closed region. The curvature calculating unit 303a calculates the curvature of the closed region.

Figure 16:
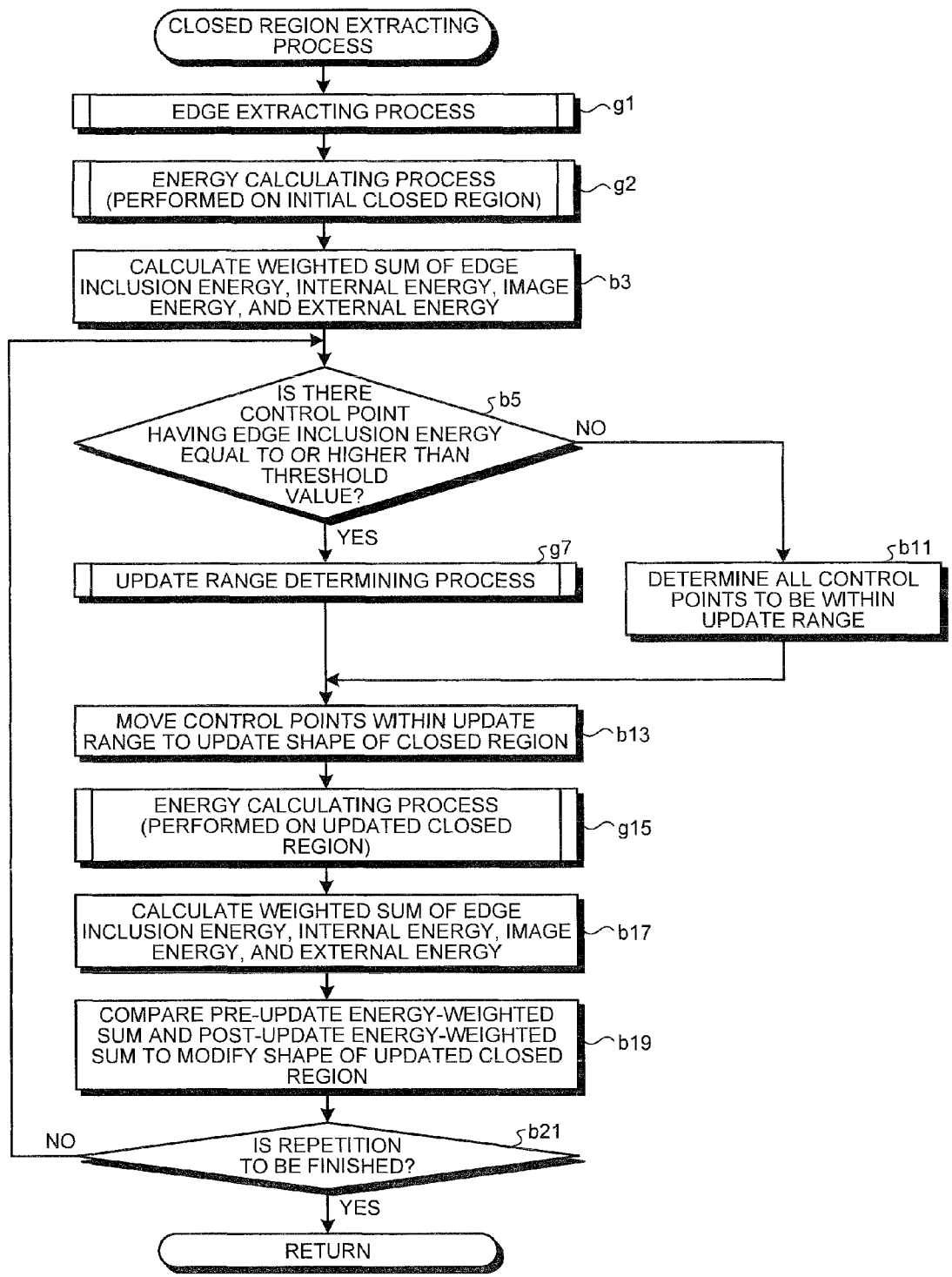
FIG. 16 is a flowchart indicating a detailed processing of closed region extracting process according to the second embodiment.

A description will be made of a specific processing performed by the image processing apparatus 1a according to the second embodiment. The processing described herein is realized by the calculation unit 20a executing the image processing program 141a recorded in the recording unit 14a. In the second embodiment, the closed region extracting process performed at Step a7 in the entire flowchart of FIG. 7 is different from that in the first embodiment. FIG. 16 is a flowchart indicating a detailed processing of the closed region extracting process according to the second embodiment. In FIG. 16, the same reference numerals are assigned to the same processes as those in the first embodiment.

Figure 17:
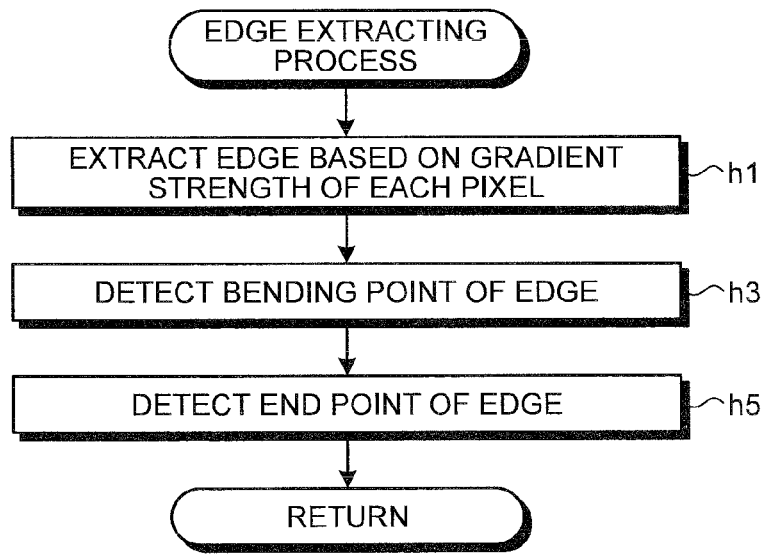
FIG. 17 is a flowchart indicating a detailed processing of edge extracting process.

As illustrated in FIG. 16, in the closed region extracting process according to the second embodiment, edge extracting process is performed (Step g1). FIG. 17 is a flowchart indicating a detailed processing of the edge extracting process.

As illustrated in FIG. 17, in the edge extracting process, the edge extracting unit 253a of the edge inclusion energy calculating unit 25a extracts a pixel having a gradient strength equal to or higher than a predetermined value as an edge from the intraluminal image to be processed based on the gradient strength calculated for each pixel in the former process (refer to Step a3 in FIG. 7) described in the first embodiment (Step h1). This can be realized by applying a well-known edge extraction technology, such as Canny and Harris.

The bending point detecting unit 254a then detects a bending point of the edge extracted in step h1 (Step h3). The end point detecting unit 255a then detects an end point of the edge extracted in step h1 (Step h5). The bending point herein means a point where the edge bends by a curvature equal to or higher than a predetermined value specified in advance. The detection of the bending point of the edge can be realized by calculating the curvature between edges adjacent to each other, for example, by well-known secondary differentiation or inner products. The detection of the end point of the edge can be realized, for example, by applying a well-known characteristic point extraction technology (refer to "Digital Image Processing", CG-ARTS Society, P 188, *Extraction of Feature Point of Fine Line*). Subsequently, the process returns to Step g1 and goes to Step g2 in FIG. 16.

Figure 18:
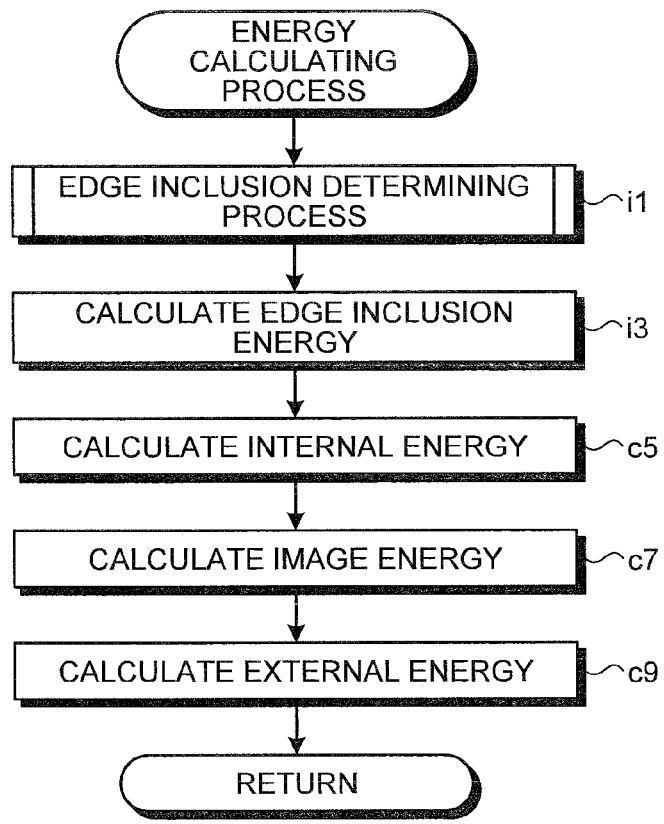
FIG. 18 is a flowchart indicating a detailed processing of energy calculating process according to the second embodiment.

At Step g2, the energy calculating unit 24a performs energy calculating process. The energy calculating process is performed on an initial closed region, and the values of the four types of energy of the edge inclusion energy, the internal energy, the image energy, and the external energy are calculated for each of the control points. FIG. 18 is a flowchart indicating a detailed processing of the energy calculating process according to the second embodiment. In FIG. 18, the same reference numerals are assigned to the same processes in the first embodiment.

Figure 19:
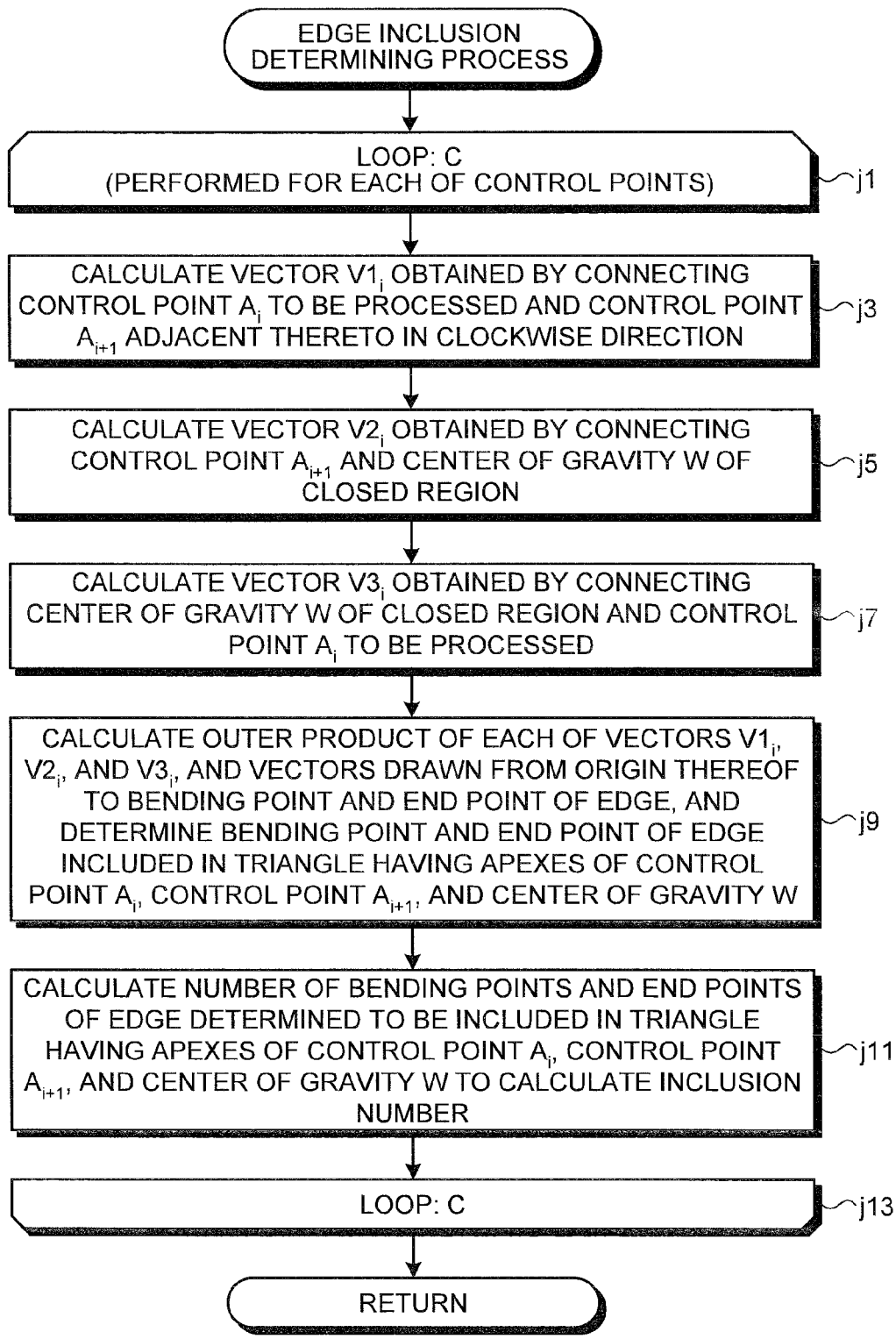
FIG. 19 is a flowchart indicating a detailed processing of edge inclusion determining process according to the second embodiment.

As illustrated in FIG. 18, in the energy calculating process according to the second embodiment, the edge inclusion energy calculating unit 25a performs edge inclusion determining process (Step i1). FIG. 19 is a flowchart indicating a detailed processing of the edge inclusion determining process according to the second embodiment.

As illustrated in FIG. 19, in the edge inclusion determining process according to the second embodiment, process of a loop C is performed on each of the control points (Step j1 to Step j13). In the process of the loop C, the edge inclusion energy calculating unit 25a performs process of Step j3 to Step j7 in the same manner as in the embodiment. In other words, the edge inclusion energy calculating unit 25a calculates the vector $V1_i$ obtained by connecting the control point $A_i$ (i=0, 1, 2, ..., n: n represents the number of the control points) serving as the control point to be processed, and the control point $A_{i+1}$ adjacent to the control point $A_i$ in the clockwise direction (Step j3). The edge inclusion energy calculating unit 25a then calculates the vector $V2_i$ obtained by connecting the control point $A_{i+1}$ adjacent to the control point $A_i$ in the clockwise direction and the center of gravity W of the closed region (Step j5). The edge inclusion energy calculating unit 25a then calculates the vector $V3_i$ obtained by connecting the center of gravity W of the closed region and the control point $A_i$ (Step j7).

The outer product calculating unit 256a then focuses on the bending point of the edge detected at Step h3 and the end point of the edge detected at Step h5 in FIG. 17 sequentially, and calculates the outer products of each of the calculated three vectors $V1_i$, $V2_i$, and $V3_i$, and a vector drawn from the origin thereof to the focused bending point, and a vector drawn from the origin thereof to the focused end point. Thus, the outer product calculating unit 256a determines the bending point and the end point of the edge included in the inclusion determination region of the control point to be processed, that is, the bending point and the end point of the edge included in the triangle having the apexes of the control point $A_i$, the control point $A_{i+1}$, and the center of gravity W (Step j9). If all the signs of the outer products thus calculated are the same, the outer product calculating unit 256a determines the focused pixel to be a pixel in the inclusion determination region. If all the signs are not the same, the outer product calculating unit 256a determines the focused pixel to be a pixel outside of the inclusion determination region.

The edge inclusion energy calculating unit 25a then calculates the number of bending points and end points of the edge determined to be included in the inclusion determination region to calculate an inclusion number Xi (i=0, 1, 2, ..., n: n represents the number of the control points), which is an example of the inclusion state (Step j11).

When the inclusion number Xi is calculated in this manner, the process of the loop C for the control point to be processed is finished. After the process of the loop C is performed on all of the control points, the process returns to Step i1 and goes to Step i3 in FIG. 18.

At Step i3, the edge inclusion energy calculating unit 25a calculates edge inclusion energy ($E_i$) that indicates a larger value as more pixels having gradient strengths equal to or higher than a predetermined value are present in the closed region (practically, in the corresponding inclusion determination region) for each of the control points. In the second embodiment, the edge inclusion energy calculating unit 25a calculates the edge inclusion energy $E_i$ by Equation (6) based on the inclusion number Xi calculated at Step j11 in FIG. 19 such that the edge inclusion energy $E_i$ indicates a larger value as the inclusion number Xi becomes larger (as more bending points and end points of the edge are included in the corresponding inclusion determination region).

$$E_i = Xi\ (i=0,1,2,\ldots,n\colon n\ \text{represents the number of control points}) \quad (6)$$

As described above, by calculating the value of the edge inclusion energy such that the edge inclusion energy indicates a larger value as more bending points and end points of the edge are included in the inclusion determination region, it is possible to extract such a closed region that restrains an edge (linear edge), such as a groove position and a contour portion, from being included therein. The energy calculating unit 24a then performs the process subsequent to Step c5 in the same manner as in the first embodiment. When the energy calculating unit 24a calculates the values of the four types of energy of the edge inclusion energy, the internal energy, the image energy, and the external energy, the process returns to Step g2 and goes to Step b3 in FIG. 16.

At Step b3, the energy-weighted sum calculating unit 27 calculates the weighted sum of the four types of energy in the same manner as in the first embodiment based on the values of the edge inclusion energy, the internal energy, the image energy, and the external energy calculated at Step g2 for the initial closed region.

Subsequently, the update range determining unit 29a determines whether a control point having a value of the edge inclusion energy equal to or higher than a threshold value specified in advance is present. If a control point having a value of the edge inclusion energy equal to or higher than the predetermined threshold value is present (YES at Step b5), the update range determining unit 29a performs update range determining process (Step g7). If there is no control point having a value of the edge inclusion energy equal to or higher than the predetermined threshold value (NO at Step b5), the update range determining unit 29a determines all of the control points to be within the update range as explained in the first embodiment (Step b11).

Figure 20:
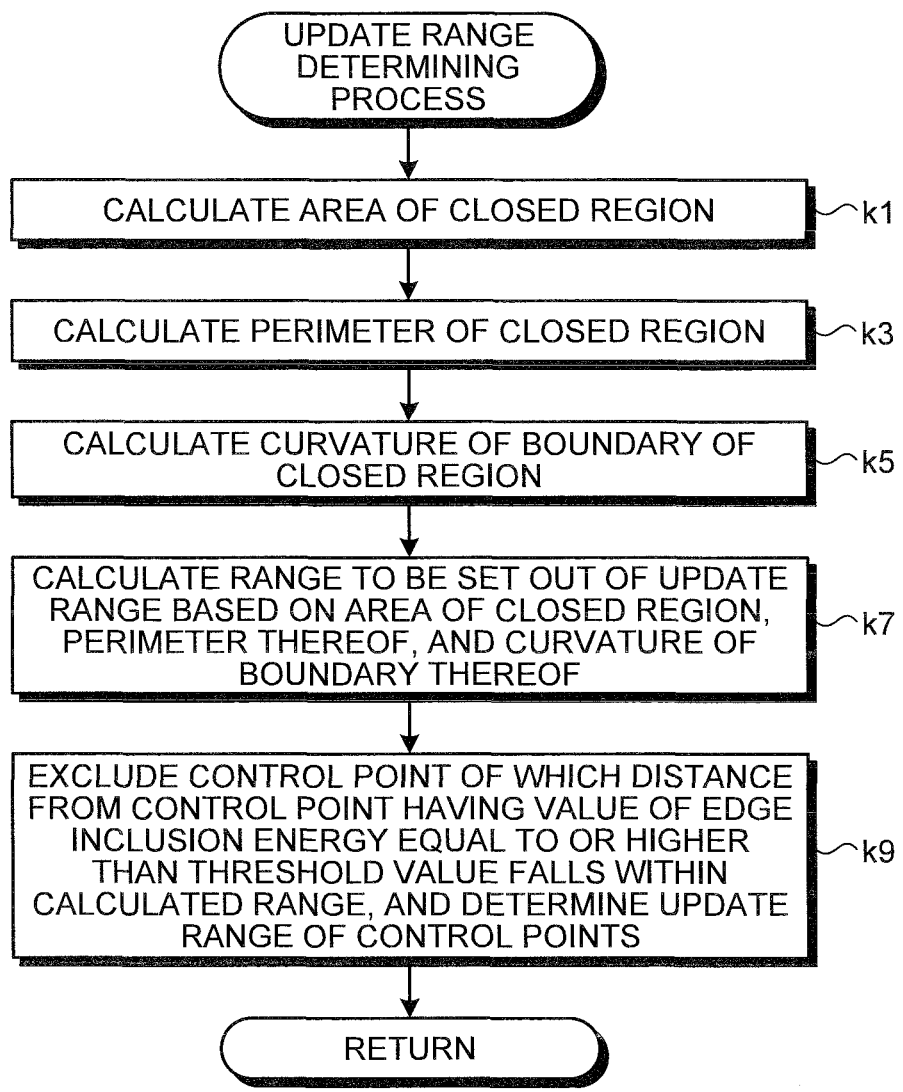
FIG. 20 is a flowchart indicating a detailed processing of update range determining process according to the second embodiment.

FIG. 20 is a flowchart indicating a detailed processing of the update range determining process performed at Step g7. As illustrated in FIG. 20, in the update range determining process, the area calculating unit 301a of the shape information calculating unit 30a calculates the area of the closed region (Step k1). The perimeter calculating unit 302a then calculates the perimeter of the closed region (Step k3).

The curvature calculating unit 303a then calculates the curvature of the boundary of the closed region in each control point position (Step k5). Specifically, for example, the curvature calculating unit 303a calculates the outer product of vectors drawn from the control point to two control points adjacent thereto on both sides for each of the control points as the curvature of the boundary of the closed region in the corresponding control point position.

The update range determining unit 29a calculates the range to be set out of the update range based on the area of the closed region, the perimeter thereof, and the curvature of the boundary thereof thus calculated (Step k7). If the value of the curvature of the boundary of the closed region calculated at Step k5 is large, it is assumed that the boundary of the closed region bends significantly in the candidate point position. If the control point on the position where the boundary bends significantly is moved, the boundary may bend more significantly in the closed region thus updated. Therefore, at Step k7, the update range determining unit 29a calculates the range to be set out of the update range based on shape information of the closed region including the curvature of the boundary. For example, the update range determining unit 29a calculates the range to be set out of the update range such that the range becomes larger as the area, the perimeter, and the curvature of the boundary of the closed region becomes larger. In the example, the range to be set out of the update range may be calculated by using one or more factors of the area, the perimeter, and the curvature of the boundary of the closed region.

The update range determining unit 29a then excludes a control point of which the distance from the control point having the value of the edge inclusion energy equal to or higher than the predetermined threshold value falls within the range calculated at Step k7, and thus determines the update range of the control points (Step k9). Subsequently, the process returns to Step g7 and goes to Step b13 in FIG. 16.

At Step b13, the closed region updating unit 28a moves the control points within the update range in accordance with the update range determined at Step g7 or Step b11 in the same manner as in the first embodiment to update the shape of the closed region (Step g13). The energy calculating unit 24a then performs energy calculating process (Step b15). At Step g15, the energy calculating process explained in FIG. 18 is performed on the closed region updated at Step b13. Subsequently, the process goes to Step b17.

As described above, in the second embodiment, the value of the edge inclusion energy is calculated such that the edge inclusion energy indicates a larger value as more bending points and end points of the edge are included in the corresponding inclusion determination region. At this time, the update range of the control points is determined so as not to move the control point that has a value of the edge inclusion energy equal to or higher than the threshold value specified in advance, and in which the corresponding inclusion determination region is assumed to be intruded by a linear edge, such as a groove position and a contour portion. This provides the same advantageous effects as in the first embodiment. Furthermore, in the second embodiment, the range to be set out of the update range is calculated based on the shape information of the closed region, such as the area, the perimeter, and the curvature of the boundary, and the update range of the control points are determined based on the calculated range. Therefore, it is possible to extract the closed region that includes no groove position shown in an intraluminal image inside thereof, and no contour portion on the boundary thereof more properly.

Third Embodiment

Figure 21:
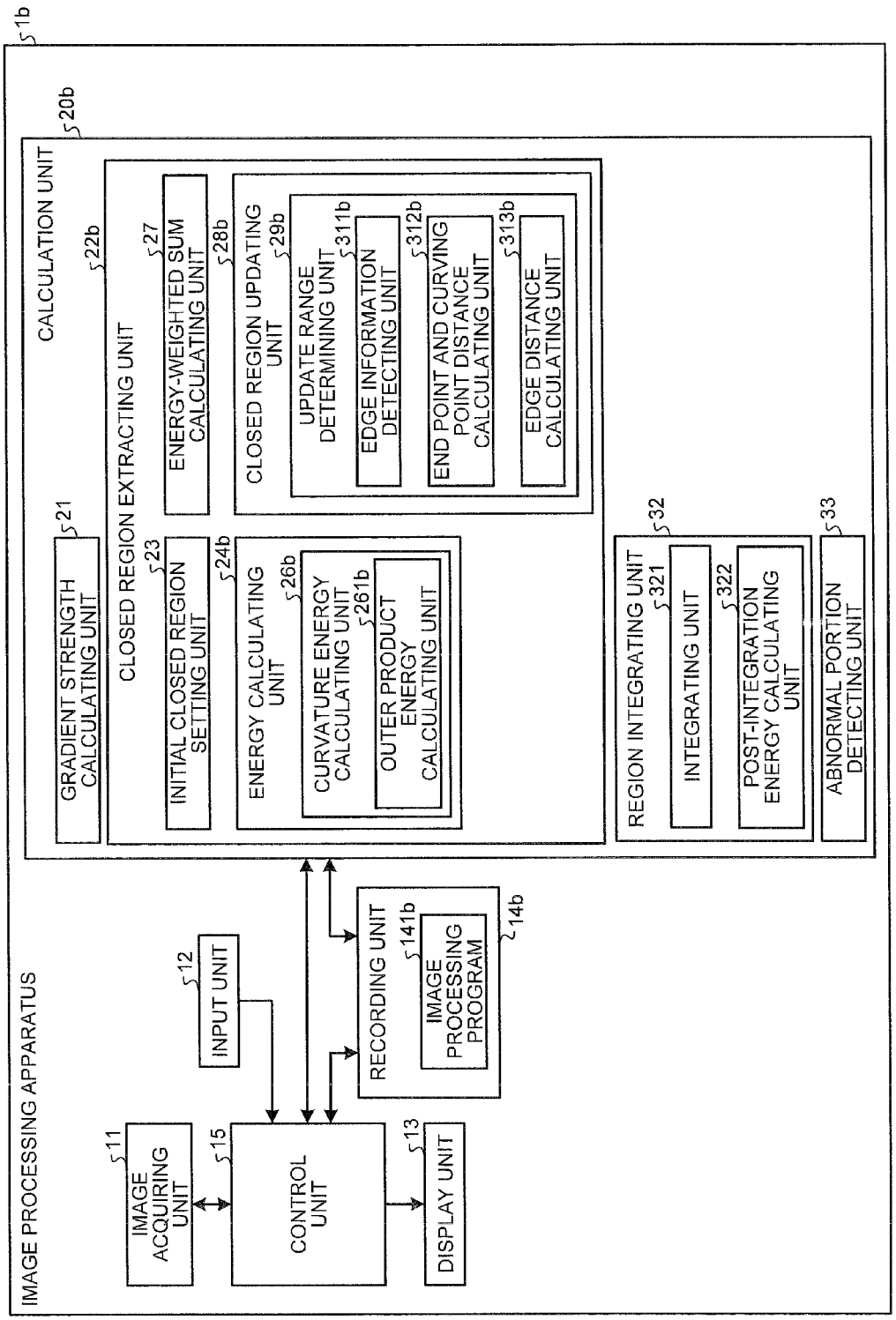
FIG. 21 is a block diagram for explaining a functional configuration of an image processing apparatus according to a third embodiment.

A configuration of an image processing apparatus according to a third embodiment will now be described. FIG. 21 is a block diagram for explaining a functional configuration of an image processing apparatus 1b according to the third embodiment. It is to be noted that the same numerals are assigned to the same components as those explained in the first embodiment. As illustrated in FIG. 21, the image processing apparatus 1b according to the third embodiment includes the image acquiring unit 11, the input unit 12, the display unit 13, a recording unit 14b, a calculation unit 20b, and the control unit 15 that controls operations of the entire image processing apparatus 1b.

The recording unit 14b records therein an image processing program 141b for realizing processing of the third embodiment and detecting an abnormal portion in an intraluminal image.

The calculation unit 20b includes the gradient strength calculating unit 21, a closed region extracting unit 22b, the region integrating unit 32, and the abnormal portion detecting unit 33. In the third embodiment, the closed region extracting unit 22b includes the initial closed region setting unit 23, an energy calculating unit 24b, the energy-weighted sum calculating unit 27, and a closed region updating unit 28b.

The energy calculating unit 24b includes a curvature energy calculating unit 26b serving as a curvature energy calculating unit. The curvature energy calculating unit 26b calculates the value of the curvature energy corresponding to the energy determined by the outer shape of the closed region. The curvature energy, which is an example of the internal energy, is energy that indicates a larger value as the boundary of the closed region bends more inwardly. The curvature energy calculating unit 26b includes an outer product energy calculating unit 261b serving as an outer product energy calculating unit. In the third embodiment, the outer product energy calculating unit 261b calculates the value of the outer product energy based on the outer product of vectors drawn from each of the control points to control points adjacent thereto, and determines the value of the outer product energy to be the value of the curvature energy.

The closed region updating unit 28b includes an update range determining unit 29b. The update range determining unit 29b includes an edge information detecting unit 311b serving as an edge information detecting unit, an end point and bending point distance calculating unit 312b serving as an end point and bending point distance calculating unit, and an edge distance calculating unit 313b serving as an edge distance calculating unit. The edge information detecting unit 311b extracts a pixel having a gradient strength equal to or higher than a predetermined value (e.g., the same value as a predetermined value that is a condition for extracting the closed region) as an edge based on the gradient strength of each pixel in the intraluminal image, and detects the end point and the bending point of the extracted edge as edge information. The end point and bending point distance calculating unit 312b calculates the distance (end point and bending point distance) between the end point or the bending point of the edge and a control point having a value of the curvature energy equal to or higher than a threshold value specified in advance. The edge distance calculating unit 313b calculates the distance (edge distance) between the edge and a control point having a value of the curvature energy equal to or higher than a threshold value specified in advance.

Figure 22:
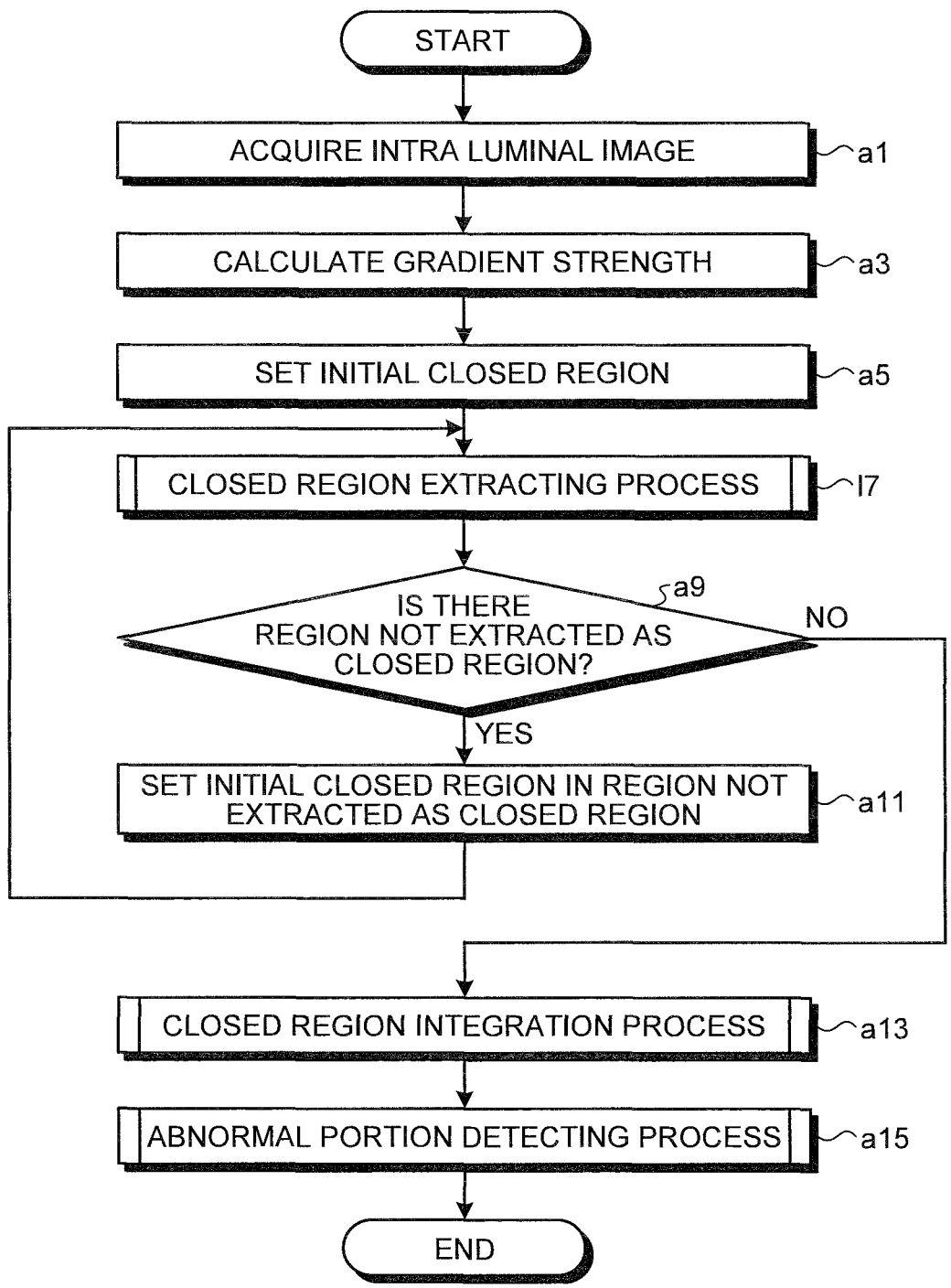
FIG. 22 is an entire flowchart indicating processes performed by the image processing apparatus according to the third embodiment.

A description will be made of a specific processing performed by the image processing apparatus 1b according to the third embodiment. FIG. 22 is an entire flowchart indicating processing performed by the image processing apparatus 1b according to the third embodiment. The processing described herein is realized by the calculation unit 20b executing the image processing program 141b recorded in the recording unit 14b. In FIG. 22, the same reference numerals are assigned to the same processes as those in the first embodiment.

Figure 23:
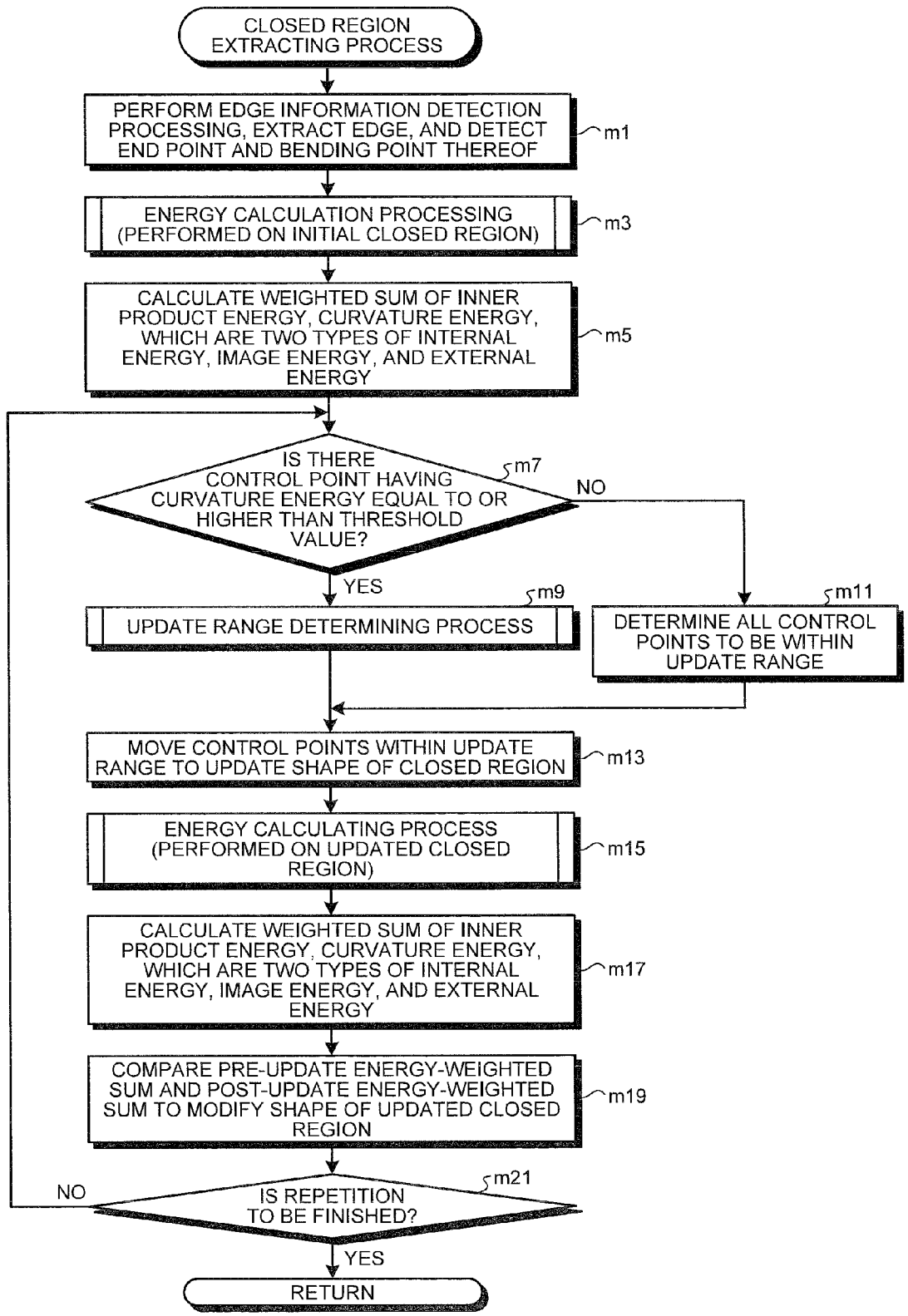
FIG. 23 is a flowchart indicating a detailed processing of closed region extracting process according to the third embodiment.

As illustrated in FIG. 22, in the third embodiment, after the initial closed region setting unit 23 sets an initial closed region at Step a5, the closed region extracting unit 22b performs closed region extracting process (Step 17). FIG. 23 is a flowchart indicating a detailed processing of the closed region extracting process according to the third embodiment.

As illustrated in FIG. 23, in the closed region extracting process according to the third embodiment, the edge information detecting unit 311b of the update range determining unit 29b perform edge information detection process (Step m1). The edge information detection process is performed in the same process as in the edge extracting process explained with reference to FIG. 17 in the second embodiment. Specifically, the edge information detecting unit 311b extracts a pixel having a gradient strength equal to or higher than a predetermined value as an edge from the intraluminal image to be processed by applying an edge extraction technology, such as Canny and Harris based on the gradient strength calculated for each pixel at Step a3 in FIG. 22 (in the same manner as in the process at Step h1 in FIG. 17). The edge information detecting unit 311b then detects the end point of the edge thus extracted (in the same manner as in the process at Step h5), and detects the bending point of the edge thus extracted (in the same manner as in the process at Step h3).

Figure 24:
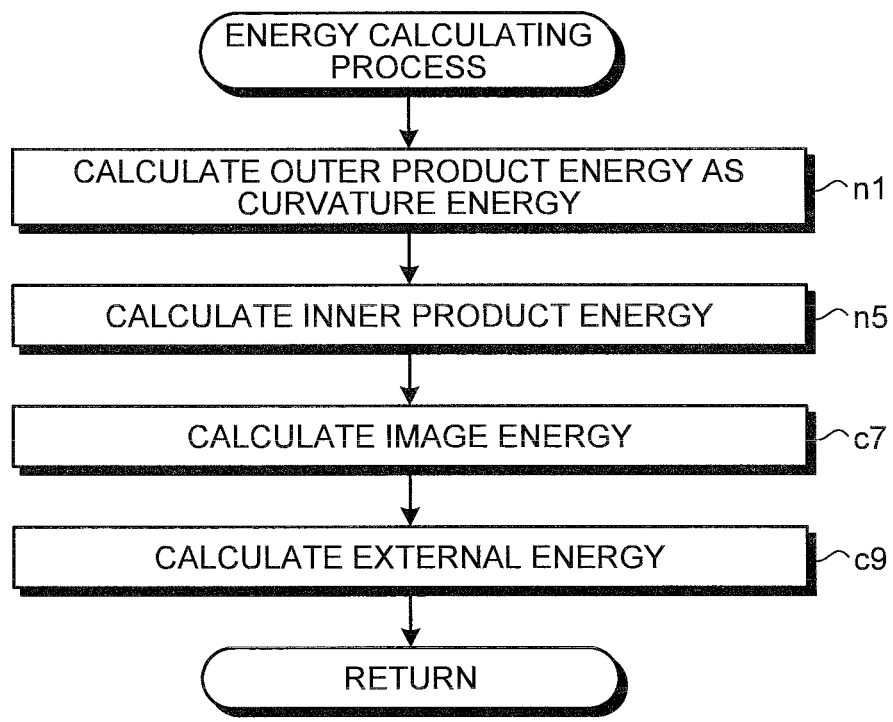
FIG. 24 is a flowchart indicating a detailed processing of energy calculating process according to the third embodiment.

Subsequently, the energy calculating unit 24b performs energy calculating process (Step m3). The energy calculating process is performed on the initial closed region, and the values of four types of energy of inner product energy and the curvature energy, which are two types of the internal energy, the image energy, and the external energy are calculated for each of the control points. The inner product energy corresponds to the internal energy explained in the first embodiment or the like. FIG. 24 is a flowchart indicating a detailed processing of the energy calculating process according to the third embodiment. In FIG. 24, the same reference numerals are assigned to the same processes as those in the first embodiment.

Figure 25:
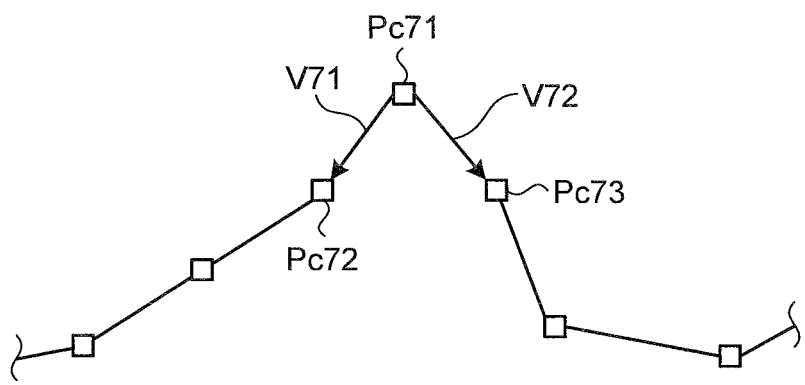
FIG. 25 is a view for explaining outer product energy.

As illustrated in FIG. 24, in the energy calculating process according to the third embodiment, the outer product energy calculating unit 261b of the curvature energy calculating unit 26b calculates the value of the outer product energy for each of the control points as the value of the curvature energy for each of the control points (Step n1). FIG. 25 is a view for explaining the outer product energy, and illustrates a part of the boundary of the closed region. For example, focusing on a control point Pc71 illustrated in FIG. 25, the outer product energy calculating unit 261b calculates the value of the outer product energy for the control point Pc71 based on the outer product of vectors V71 and V72 drawn from the control point Pc71 to control points Pc72 and Pc73 adjacent thereto on both sides, respectively. The outer product energy restrains the focused control point Pc71 from bending with a predetermined curvature or higher toward the inner side of the closed region with respect to the positions of the control points Pc72 and Pc73 adjacent thereto. In the practical process, for example, the outer product energy calculating unit 261b calculates outer product energy $E_c$ by Equations (7) and (8) based on the outer product of vectors $x_a$ and $x_b$ between three control points of a focused control point $v_2$ and control points $v_1$ and $v_3$ adjacent thereto. It is to be noted that $\epsilon$ in equation (8) represents a weighting factor for the outer product energy $E_c$, and the value is determined in accordance with experimental rules. The value of ϵ may be a fixed value, or may be set variably in accordance with an operational input by a user, for example.

If $(x_a y_b - x_b y_a) > 0$, then $E_c(i) = 0$ (7)

Otherwise, $\epsilon_c(i) = \epsilon |x_a y_b - x_b y_a|$ (8)

where $(x_a, y_a) = (x_2 - x_1, y_2 - y_1)$ $(x_b, y_b) = (x_3 - x_2, y_3 - y_2)$ $v_1 = (x_1, x_1)$ $v_2 = (x_2, x_2)$ $v_3 = (x_3, x_3)$ The energy calculating unit 24b performs the same process as that of Step c5 in FIG. 9 to calculate the internal energy explained in the first embodiment as the inner product energy (Step n5). The energy calculating unit 24b then performs the process subsequent to Step c7 in the same manner as in the first embodiment to calculate the values of the image energy and the external energy. When the values of the four types of energy are calculated, the process returns to step m3 and goes to Step m5 in FIG. 23.

At Step m5, the energy-weighted sum calculating unit 27 calculates the weighted sum of the four types of energy based on the values of the inner product energy and the curvature energy, which are two types of the internal energy, the image energy, and the external energy calculated at Step m3 for the initial closed region. Specifically, the weighted sum of the four types of energy is calculated as the sum of the weighted sum (weighted sum of the inner product energy, the curvature energy, the image energy, and the external energy) of the four types of energy of the inner product energy and the curvature energy, which are two types of the internal energy, the image energy, and the external energy calculated for each of the control points at Step m3.

Subsequently, the update range determining unit 29b determines whether a control point having a value of the curvature energy equal to or higher than a threshold value specified in advance is present. If a control point having a value of the curvature energy equal to or higher than the predetermined threshold value is present (YES at Step m7), the update range determining unit 29b performs update range determining process (Step m9). By contrast, if there is no control point having a value of the curvature energy equal to or higher than the predetermined threshold value (NO at Step m7), the update range determining unit 29b determines all of the control points to be within the update range (Step m11).

Figure 26:
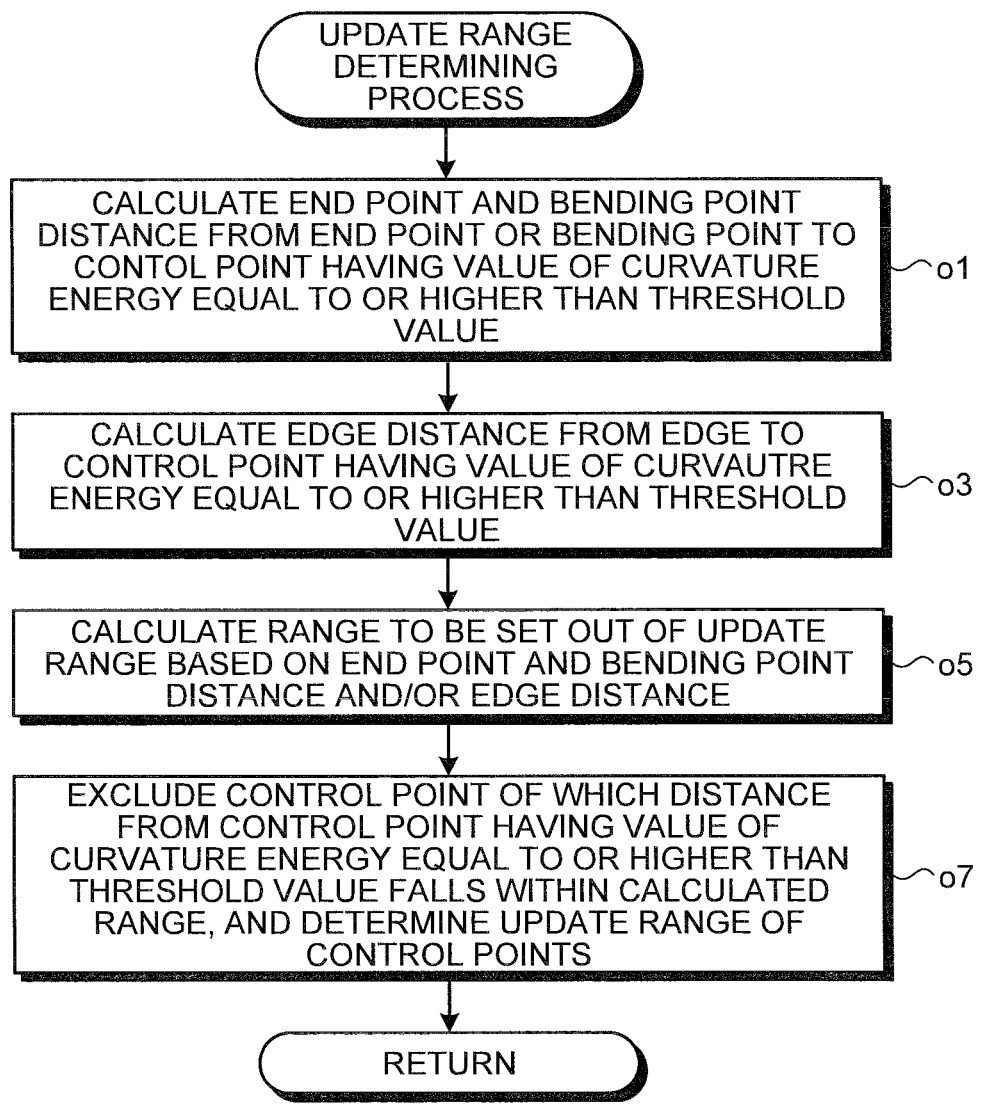
FIG. 26 is a flowchart indicating a detailed processing of update range determining process according to the third embodiment.

FIG. 26 is a flowchart indicating a detailed processing of the update range determining process performed at Step m9. As illustrated in FIG. 26, in the update range determining process, the end point and bending point distance calculating unit 312b of the update range determining unit 29b calculates the end point and bending point distance from the end point or the bending point of the edge detected at Step m1 in FIG. 23 to the control point having a value of the curvature energy equal to or higher than the predetermined threshold value (Step o1). If there are a plurality of end points or bending points of the edge, the end point and bending point distance calculating unit 312b calculates the distance between the control point and the end point or the bending point of the edge closest thereto as the end point and bending point distance.

Subsequently, as illustrated in FIG. 26, the edge distance calculating unit 313b calculates the edge distance from the edge extracted at Step m1 in FIG. 23 to the control point having a value of the curvature energy equal to or higher than the predetermined threshold value (Step o3). Specifically, the edge distance calculating unit 313b calculates the distance between the control point having a value of the curvature energy equal to or higher than the predetermined threshold value and a position on the edge closest thereto as the edge distance.

The update range determining unit 29b then calculates the range to be set out of the update range based on the end point and bending point distance and/or the edge distance thus calculated (Step o5). At this time, if an edge, an end point thereof, or an edge (bending point of the edge) curving significantly inward is present outside of the closed region, the edge intrudes into the closed region, or the boundary of the closed region expands along the edge while the closed region is being transformed. As a result, a closed region of which the boundary includes an edge curving significantly inward may be extracted. Therefore, at Step o5, the update range determining unit 29b calculates the range to be set out of the update range based on the end point and bending point distance from the position of the control point having a value of the curvature energy equal to or higher than the predetermined threshold value and curving to some extent to the end point or the bending point of the edge. Specifically, the update range determining unit 29b calculates the range to be set out of the update range such that the range becomes broader as the end point and bending point distance is smaller, the distance from the control point position to the end point or the bending point of the edge is smaller, and they are positioned closer to each other. Furthermore, the update range determining unit 29b calculates the range to be set out of the update range based on the edge distance from the control point position curving to some extent to the edge as described above. Specifically, the update range determining unit 29b calculates the range to be set out of the update range such that the range becomes broader as the edge distance is smaller, the distance from the control point position to the edge is smaller, and they are positioned closer to each other. This makes it possible to extract such a closed region that satisfies the conditions that no pixel having a gradient strength equal to or higher than the predetermined value is included in the region, and that the boundary of the region does not bend with the predetermined curvature or higher toward the inner sided of the region.

If the range to be set out of the update range is calculated by using the end point and bending point distance alone, the process of Step o1 may not be performed, whereas if the range to be set out of the update range is calculated by using the edge distance alone, the process of Step o3 may not be performed.

The update range determining unit 29b then excludes a control point of which the distance from the control point having the value of the curvature energy equal to or higher than the predetermined threshold value falls within the range calculated at Step o5, and thus determines the update range of the control points (Step o7). Subsequently, the process returns to Step m9 then goes to Step m13 in FIG. 23.

At Step m13, the closed region updating unit 28b moves the control points within the update range in accordance with the update range determined at Step m9 or Step m11 to update the shape of the closed region. The process is performed in the same manner as in the first embodiment (refer to Step b13 in FIG. 8). Subsequently, the energy calculating unit 24b performs energy calculating process (Step m15). At Step m15, the energy calculating unit 24b performs the energy calculating process on the closed region updated at Step m13 in the same process as that of Step m3 (refer to FIG. 24). Subsequently, the process goes to Step m17.

At Step m17, the energy-weighted sum calculating unit 27 calculates the weighted sum of the four types of energy of the inner product energy and the curvature energy, which are two types of the internal energy, the image energy, and the external energy calculated at Step m17 for the closed region updated at Step m13. The process is performed in the same manner as that of Step m5.

The closed region updating unit 28b then compares the pre-update energy-weighted sum before the update at Step m13 with the post-update energy-weighted sum after the update at Step m13, and modifies the shape of the closed region (Step m19). The process is performed in the same manner as in the first embodiment (refer to Step b19 in FIG. 8).

Subsequently, the closed region updating unit 28b determines whether to finish the repetition. If the closed region updating unit 28b determines not to finish the repetition (NO at Step m21), the process of Step m7 to Step m19 is performed on the shape of the closed region thus updated this time, thereby updating the shape of the closed region. By contrast, if the closed region updating unit 28b determines to finish the repetition (YES at Step m21), the closed region extracting process is finished. Subsequently, the process returns to Step 17 and goes to Step a9 in FIG. 22.

As described above, in the third embodiment, the value of the outer product energy is calculated for each of the control points based on the outer product of vectors drawn from each of the control points to control points adjacent thereto, and the value of the curvature energy that indicates a larger value as the boundary of the closed region bends more inwardly is calculated. The shape is updated such that the weighted sum of the plurality of types of energy including the curvature energy is made the minimum, thereby extracting the closed region. At this time, if the value of the curvature energy is equal to or higher than the threshold value specified in advance, and the corresponding control point position bends to some extent, the end point and bending point distance and the edge distance from the control point position are calculated to determine the update range based on the end point and bending point distance and/or the edge distance. Specifically, by causing a broader range with respect to the corresponding control point position to be set out of the update range as the end point and bending point distance and/or the edge distance is smaller, the update range of the control points is determined. Therefore, it is possible to properly extract the closed region that includes no groove position shown in an intraluminal image inside thereof, and no contour portion on the boundary thereof. Furthermore, by performing the morphological process on each of the extracted closed regions, an abnormal portion in the closed region can be detected. This allows the abnormal portion in the intraluminal image to be detected accurately without misdetecting the groove position and the contour portion as an abnormal portion.

Fourth Embodiment

Figure 27:
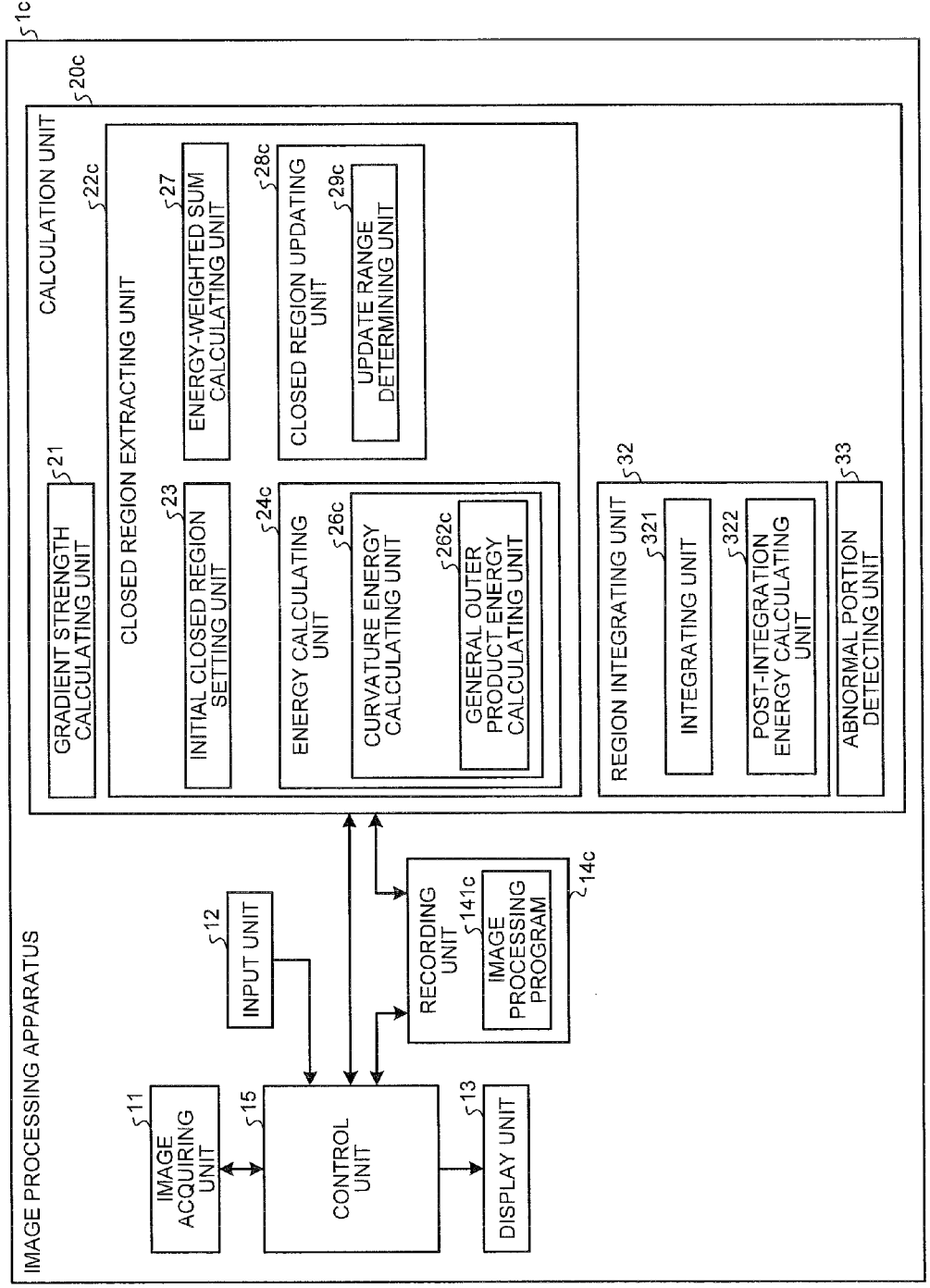
FIG. 27 is a block diagram for explaining a functional configuration of an image processing apparatus according to a fourth embodiment.

A configuration of an image processing apparatus according to a fourth embodiment will now be described. FIG. 27 is a block diagram for explaining a functional configuration of an image processing apparatus 1c according to the fourth embodiment. It is to be noted that the same numerals are assigned to the same components as those explained in the third embodiment. As illustrated in FIG. 27, the image processing apparatus 1c according to the fourth embodiment includes the image acquiring unit 11, the input unit 12, the display unit 13, a recording unit 14c, a calculation unit 20c, and the control unit 15 that controls operations of the entire image processing apparatus 1c.

The recording unit 14c records therein an image processing program 141c for realizing processing of the fourth embodiment and detecting an abnormal portion in an intraluminal image.

The calculation unit 20c includes the gradient strength calculating unit 21, a closed region extracting unit 22c, the region integrating unit 32, and the abnormal portion detecting unit 33. In the fourth embodiment, the closed region extracting unit 22c includes the initial closed region setting unit 23, an energy calculating unit 24c, the energy-weighted sum calculating unit 27, and a closed region updating unit 28c.

The energy calculating unit 24c includes a curvature energy calculating unit 26c. The curvature energy calculating unit 26c includes a general outer product energy calculating unit 262c serving as a general outer product energy calculating unit. In the fourth embodiment, the general outer product energy calculating unit 262c calculates the value of the general outer product energy based on the outer product of vectors drawn from each of the control points to control points apart therefrom by a distance specified in advance or larger, and determines the value of the general outer product energy to be the value of the curvature energy. The closed region updating unit 28c includes an update range determining unit 29c that determines the update range of the control points.

Figure 28:
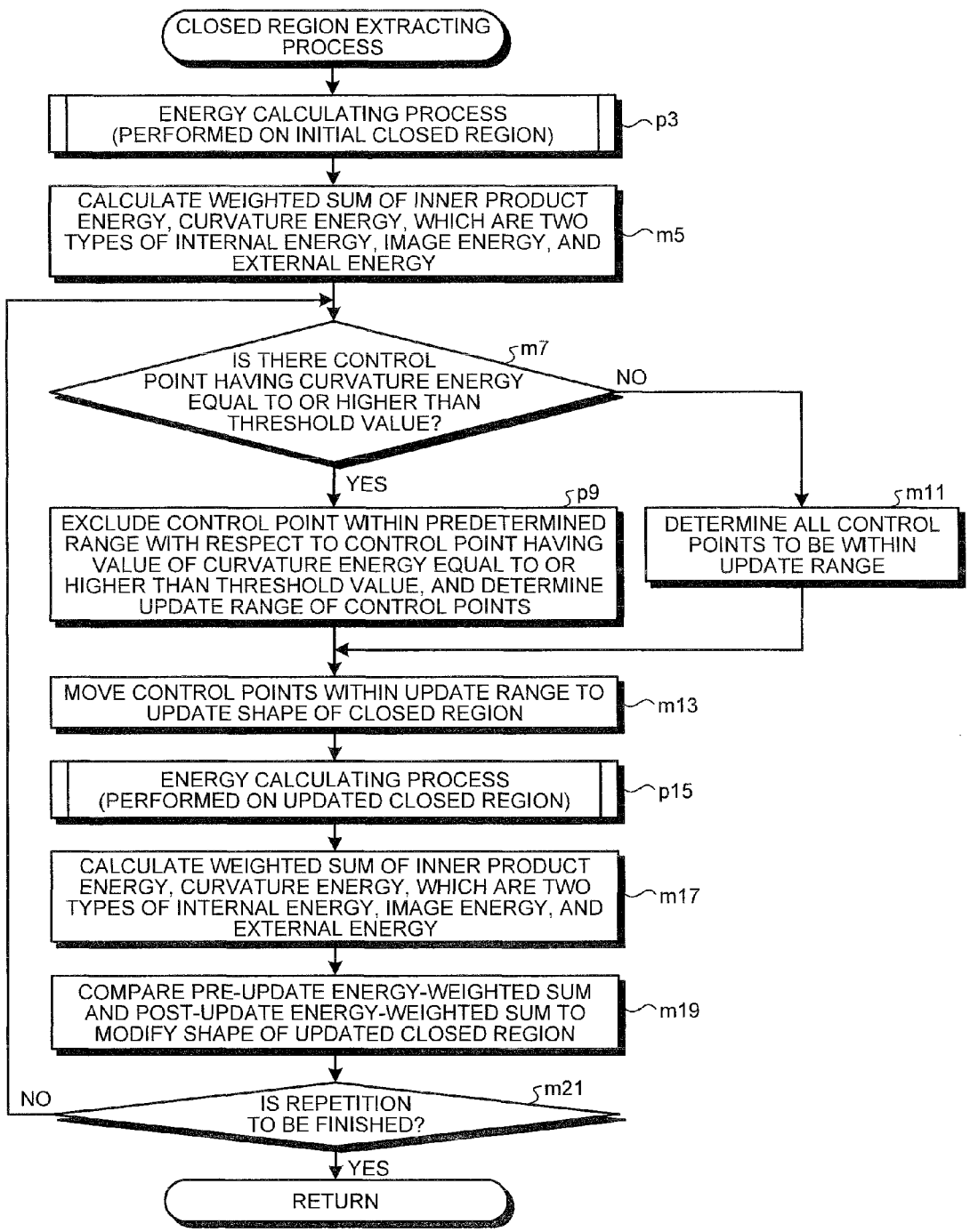
FIG. 28 is a flowchart indicating a detailed processing of closed region extracting process according to the fourth embodiment.

A description will be made of a specific processing performed by the image processing apparatus 1c according to the fourth embodiment. The processing described herein is realized by the calculation unit 20c executing the image processing program 141c recorded in the recording unit 14c. In the fourth embodiment, the closed region extracting process performed at Step 17 in the entire flowchart of FIG. 22 is different from that in the third embodiment. FIG. 28 is a flowchart indicating a detailed processing of the closed region extracting process according to the fourth embodiment. In FIG. 28, the same reference numerals are assigned to the same processes as those in the third embodiment.

Figure 29:
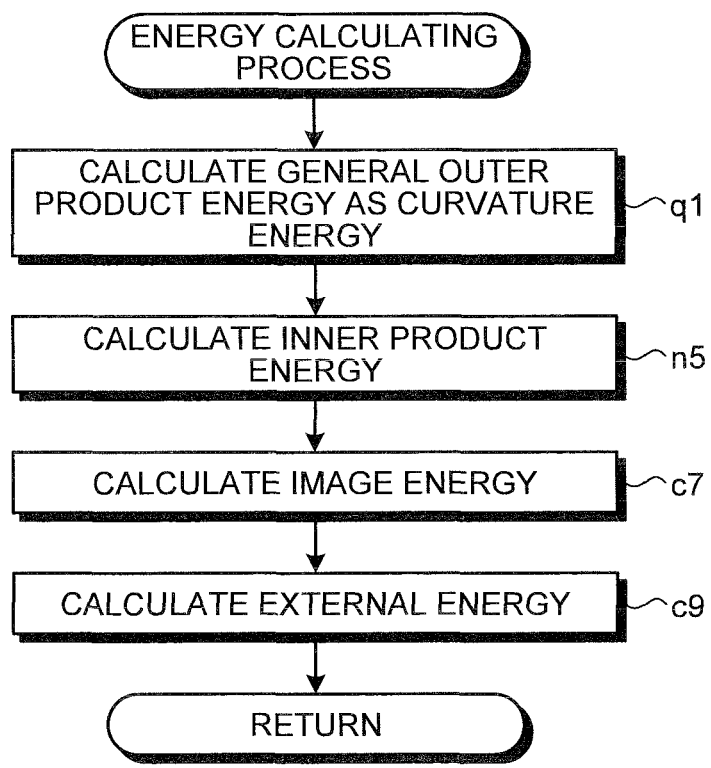
FIG. 29 is a flowchart indicating a detailed processing of energy calculating process according to the fourth embodiment.

As illustrated in FIG. 28, in the closed region extracting process according to the fourth embodiment, the energy calculating unit 24c performs energy calculating process (Step p3). The energy calculating process is performed on an initial closed region, and the values of the four types of energy of the inner product energy and the curvature energy, which are two types of the internal energy, the image energy, and the external energy are calculated for each of the control points. FIG. 29 is a flowchart indicating a detailed processing of the energy calculating process according to the fourth embodiment. In FIG. 29, the same reference numerals are assigned to the same processes as those in the third embodiment.

As illustrated in FIG. 29, in the energy calculating process according to the fourth embodiment, the general outer product energy calculating unit 262c of the curvature energy calculating unit 26c calculates the value of the general outer product energy for each of the control points as the value of the curvature energy for each of the control points (Step q1). At Step q1, the general outer product energy calculating unit 262c calculates the general outer product energy for each of the control points based on the outer product of the vectors drawn from each of the control points to the control points arranged on both sides apart therefrom by a distance specified in advance or larger. The general outer product energy can be calculated in the same manner as that for the outer product energy in the third embodiment. In other words, the general outer product energy can be calculated by substituting the control points arranged on both sides of the focused control point apart therefrom by the predetermined distance or larger into the control points $v_1$ and $v_3$ adjacent thereto in Equation (7) and (8).

Subsequently, the energy calculating unit 24c performs the process subsequent to Step n5 in the same manner as in the third embodiment to calculate the values of the inner product energy, the image energy, and the external energy. When the values of the four types of energy are calculated in this manner, the process returns to step p3 and goes to Step m5 in FIG. 28.

In the fourth embodiment, at Step m7, if it is determined that a control point having a value of the curvature energy equal to or higher than the predetermined threshold value is present (YES at Step m7), the update range determining unit 29c excludes the control point of which the distance from the control point having the value of the curvature energy equal to or higher than the predetermined threshold value falls within the range specified in advance, and thus determines the update range of the control points (Step p9). The range to be excluded from the update range is not limited to the predetermined range specified in advance. Alternatively, the update range may be determined by performing the update range determining process (refer to FIG. 20) explained in the third embodiment. This makes it possible to restrain the boundary of the closed region from being updated so as to bend inward by a predetermined curvature or larger.

Subsequently, the closed region updating unit 28c moves the control points within the update range in accordance with the update range determined at Step p9 or Step m11 to update the shape of the closed region (Step m13). The energy calculating unit 24b then performs energy calculating process (Step p15). At step p15, the energy calculating unit 24c performs the energy calculating process on the closed region updated at Step m13 in the same process as that of Step p3 (refer to FIG. 29). Subsequently, the system control goes to Step m17.

As described above, in the fourth embodiment, the value of the general outer product energy is calculated for each of the control points based on the outer product of vectors drawn from each of the control points to control points apart therefrom by the predetermined distance or larger, and the value of the curvature energy that indicates a larger value as the boundary of the closed region bends more inwardly is calculated. The shape is updated such that the weighted sum of the plurality of types of energy including the curvature energy is made the minimum, thereby extracting the closed region. At this time, if the value of the curvature energy is equal to or higher than the threshold value specified in advance, and the corresponding control point position bends to some extent, the update range of the control points can be determined so as not to move the control points arranged within the predetermined range from the control point position when the shape of the closed region is updated next time. Therefore, it is possible to properly extract such a closed region that includes no groove position shown in an intraluminal image inside thereof, and no contour portion on the boundary thereof. Furthermore, by performing the morphological process on each of the extracted closed regions, an abnormal portion in the closed region can be detected. This allows the abnormal portion in the intraluminal image to be detected accurately without misdetecting the groove position and the contour portion as the abnormal portion.

Fifth Embodiment

Figure 30:
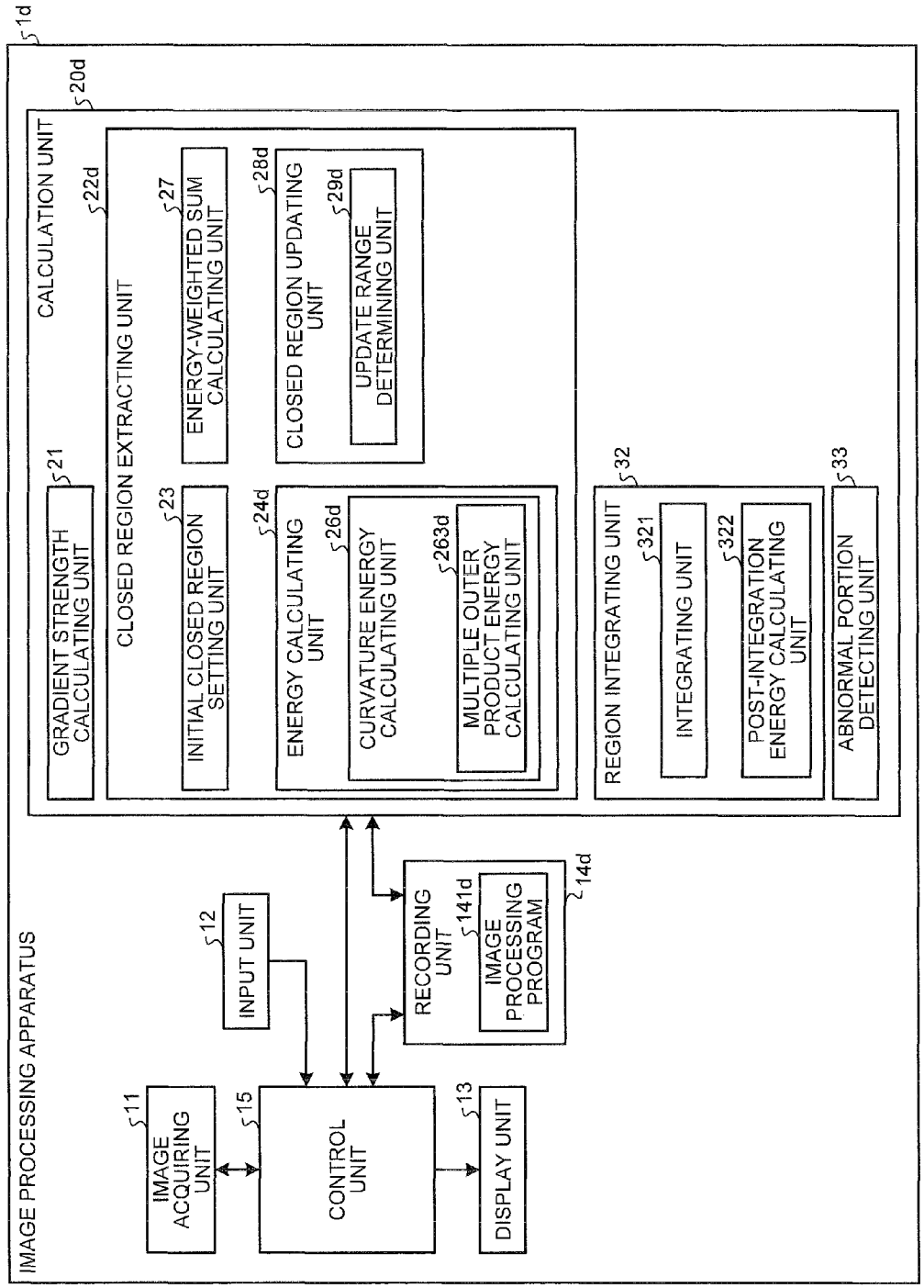
FIG. 30 is a block diagram for explaining a functional configuration of an image processing apparatus according to a fifth embodiment.

A configuration of an image processing apparatus according to a fifth embodiment will now be described. FIG. 30 is a block diagram for explaining a functional configuration of an image processing apparatus 1d according to the fifth embodiment. It is to be noted that the same numerals are assigned to the same components as those explained in the third embodiment. As illustrated in FIG. 30, the image processing apparatus 1d according to the fifth embodiment includes the image acquiring unit 11, the input unit 12, the display unit 13, a recording unit 14d, a calculation unit 20d, and the control unit 15 that controls operations of the entire image processing apparatus 1d.

The recording unit 14d records therein an image processing program 141d for realizing processing of the fifth embodiment and detecting an abnormal portion in an intraluminal image.

The calculation unit 20d includes the gradient strength calculating unit 21, a closed region extracting unit 22d, the region integrating unit 32, and the abnormal portion detecting unit 33. In the fifth embodiment, the closed region extracting unit 22d includes the initial closed region setting unit 23, an energy calculating unit 24d, the energy-weighted sum calculating unit 27, and a closed region updating unit 28d.

The energy calculating unit 24d includes a curvature energy calculating unit 26d. The curvature energy calculating unit 26d includes a multiple outer product energy calculating unit 263d. The closed region updating unit 28d includes an update range determining unit 29d that determines the update range of the control points.

Figure 31:
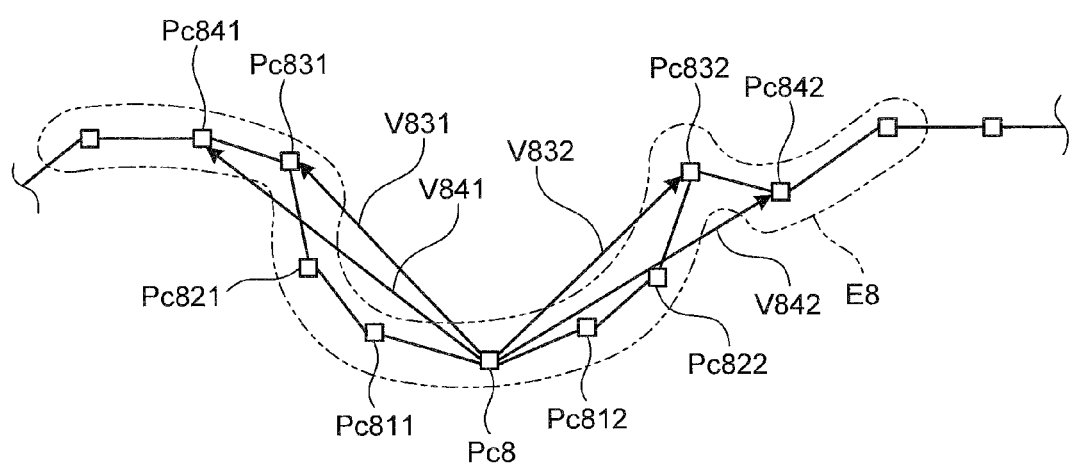
FIG. 31 is a view for explaining curvature energy.

A principle of calculation of the curvature energy in the fifth embodiment will now be described with reference to FIG. 31. FIG. 31 is a view for explaining the curvature energy, and illustrates a part of the boundary of the closed region. If a control point Pc8 illustrated in FIG. 31 is focused, for example, in order to calculate the curvature energy, a pair of control points with which the outer product is to be calculated, such as two control points Pc841 and Pc842 arranged on both sides of the control point Pc8 apart therefrom by four control points, is selected among control points arranged on both sides of the control point Pc8 apart therefrom by a predetermined number of control points specified in advance. Based on the outer product of vectors V841 and V842 drawn from the control point Pc8 to the control points Pc841 and Pc842, respectively, the general outer product energy, which is an example of the outer product energy, for the control point Pc8 is calculated in the same manner as in the fourth embodiment. Subsequently, it is determined whether the value of the general outer product energy thus obtained is equal to or higher than a predetermined threshold value. If the value is equal to or higher than the predetermined threshold value, the value is determined to be the value of the curvature energy for the control point Pc8. By contrast, if the value is smaller than the threshold value, control points Pc831 and Pc832 arranged closer to the control point Pc8 than the pair of control points Pc841 and Pc842 with which the outer product is to be calculated this time by one control point are selected as a pair of control points with which the outer product is to be newly calculated. The general outer product energy is calculated in the same manner, and if the value is equal to or higher than the predetermined threshold value, the value is determined to be the value of the curvature energy for the control point Pc8. By contrast, if the value is smaller than the threshold value, control points Pc821 and Pc822 arranged still closer to the control point Pc8 are selected as a pair of control points with which the outer product is to be calculated, and the same process is performed. Eventually, if control points Pc811 and Pc812 adjacent to the control point Pc8 are selected as a pair of control points with which the outer product is to be calculated, the value of the outer product energy is calculated in the same manner as in the third embodiment, and determined to be the value of the curvature energy for the control point Pc8.

For example, in FIG. 31, assuming that the value of the general outer product energy calculated based on the outer product of vectors V831 and V832 obtained by selecting the control points Pc831 and Pc832 as a pair of control points with which the outer product is to be calculated is equal to or higher than the threshold value, the value of the general outer product is determined to be the value of the curvature energy for the control point Pc8. This makes it possible to specify the range in which the boundary of the closed region bends, that is, the range between the control points Pc831 and Pc832. In the fifth embodiment, based on the range between the control points Pc831 and Pc832 thus specified, the update range of the control points when the shape of the closed region is to be updated next time is determined.

Figure 32:
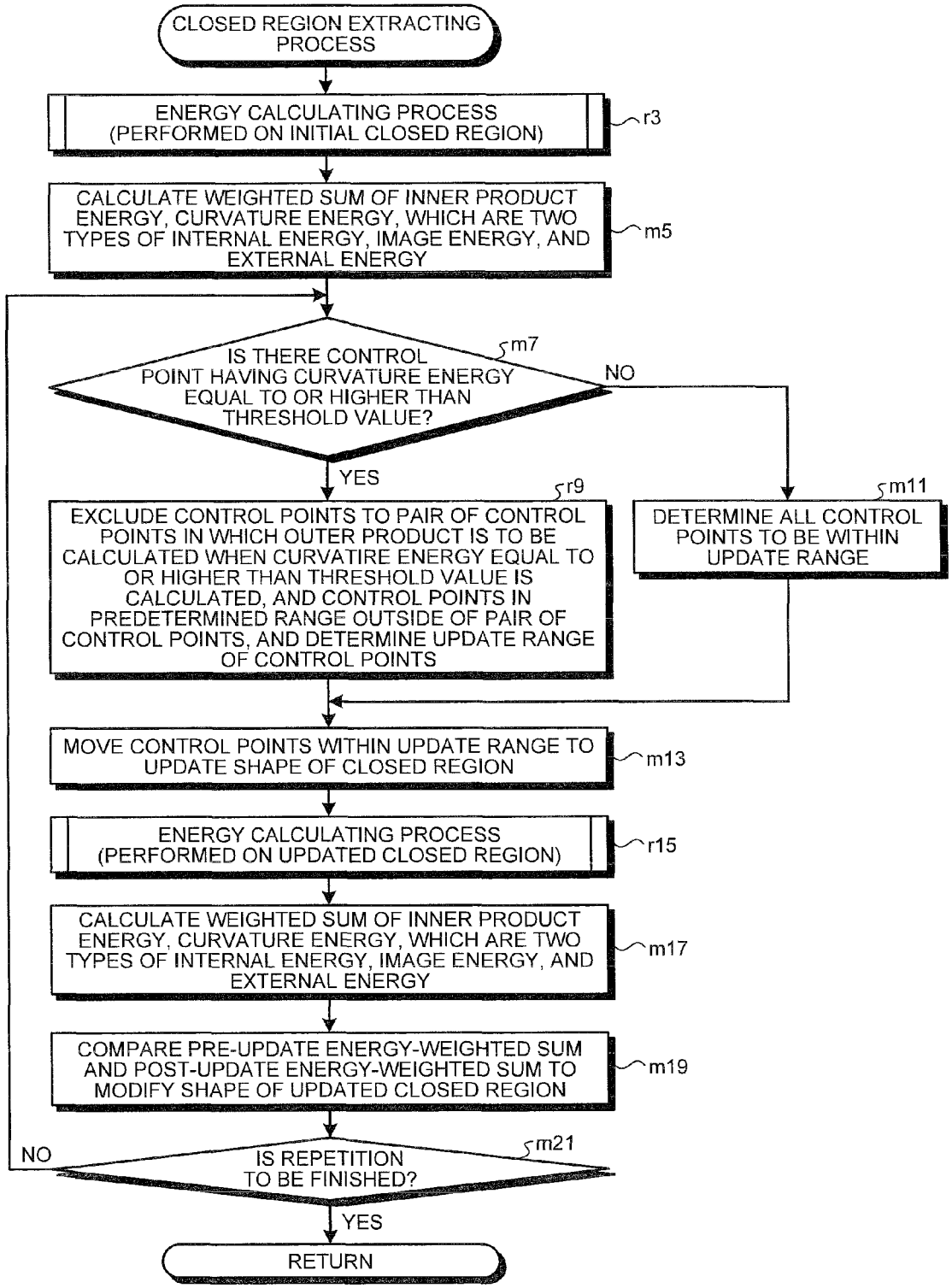
FIG. 32 is a flowchart indicating a detailed processing of closed region extracting process according to the fifth embodiment.

A description will be made of a specific processing performed by the image processing apparatus 1d according to the fifth embodiment. The processing described herein is realized by the calculation unit 20d executing the image processing program 141d recorded in the recording unit 14d. In the fifth embodiment, the closed region extracting process performed at Step 17 in the entire flowchart of FIG. 22 is different from that in the third embodiment. FIG. 32 is a flowchart indicating a detailed processing of the closed region extracting process according to the fifth embodiment. In FIG. 32, the same reference numerals are assigned to the same processes as those in the third embodiment.

Figure 33:
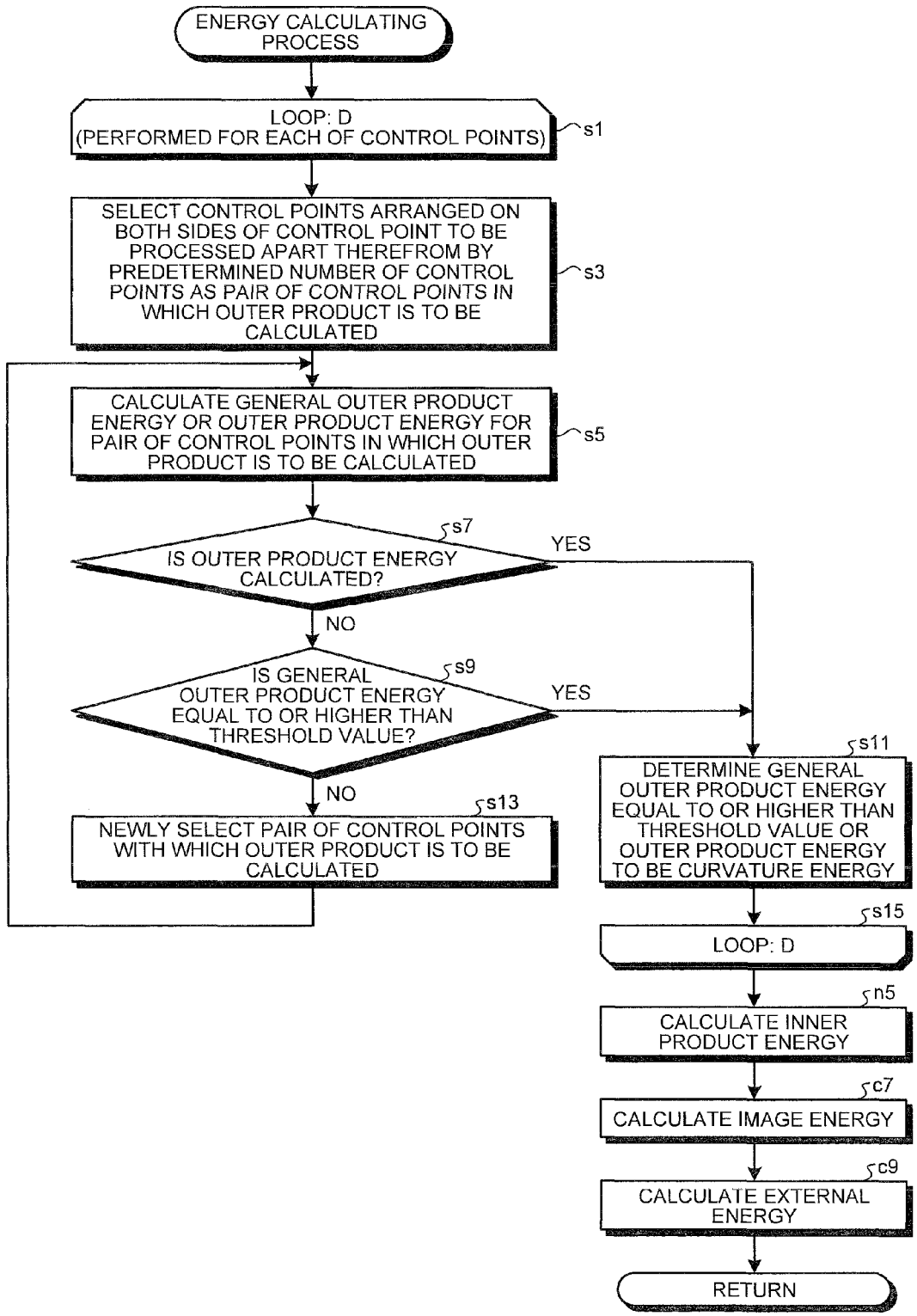
FIG. 33 is a flowchart indicating a detailed processing of energy calculating process according to the fifth embodiment.

As illustrated in FIG. 32, in the closed region extracting process according to the fifth embodiment, the energy calculating unit 24d performs energy calculating process (Step r3). The energy calculating process is performed on an initial closed region, and the values of the four types of energy of the inner product energy and the curvature energy, which are two types of the internal energy, the image energy, and the external energy are calculated for each of the control points. FIG. 33 is a flowchart indicating a detailed processing of the energy calculating process according to the fifth embodiment. In FIG. 33, the same reference numerals are assigned to the same processes as those in the third embodiment.

As illustrated in FIG. 33, the energy calculating process in the fifth embodiment, process of a loop D is performed for each of the control points (Step s1 to Step s15). In the loop D, the curvature energy calculating unit 26d selects two control points arranged on both sides of the control point to be processed apart therefrom by a predetermined number of control points specified in advance as a pair of control points with which the outer product is to be calculated (Step s3).

Subsequently, the multiple outer product energy calculating unit 263d calculates the general outer product energy or the outer product energy based on the outer product of vectors drawn from the control point to be processed to the selected pair of control points with which the outer product is to be calculated (Step s5). In other words, at Step s5, if other control points are present between the control point to be processed and the control points with which the outer product is to be calculated, the multiple outer product energy calculating unit 263d calculates the general outer product energy in the same manner as in the fourth embodiment (refer to Step q1 in FIG. 29). By contrast, if the control point to be processed and the control points with which the outer product is to be calculated are arranged adjacent to each other, the multiple outer product energy calculating unit 263d calculates the outer product energy in the same manner as in the third embodiment (refer to Step n1 in FIG. 24).

If the value of the outer energy is calculated at Step s5 (YES at Step s7), or if the value of the general outer product calculated at Step s5 is equal to or higher than the threshold value specified in advance (YES at Step s9), the multiple outer product energy calculating unit 263d determines the value to be the value of the curvature energy (Step s11). If the value of the outer energy is not calculated at Step s5 (NO at Step s7) and if the value of the general outer product calculated at Step s5 is smaller than the predetermined threshold value (NO at Step s9), a pair of control points arranged closer to the control point to be processed than the pair of control points with which the outer product is to be calculated this time by one control point are selected as a pair of control points with which the outer product is to be newly calculated (Step s13). Subsequently, the process returns to Step s5, and the process described above is performed.

When the value of the curvature energy is obtained in this manner, the process of the loop D on the control point to be processed is finished. After the process of the loop D is performed on all of the control points, the energy calculating unit 24d performs the process subsequent to Step n5 in the same manner as in the third embodiment to calculate the values of the inner product energy, the image energy, and the external energy. After the values of the four types of energy are calculated, the process returns to Step r3 in FIG. 32, and goes to Step m5.

In the fifth embodiment, at Step m7, if it is determined that a control point having a value of the curvature energy equal to or higher than the predetermined threshold value is present (YES at Step m7), the update range determining unit 29d excludes control points from the control points to be processed to the pair of control points with which the outer product is to be calculated when the curvature energy is calculated, and control points arranged in a predetermined range outside of each of the pair of control points, and thus determines the update range of the control points (Step r9). For example, as explained with reference to FIG. 31, if the value of the general outer product energy calculated based on the outer product of the vectors V831 and V832 drawn from the control point Pc8 to the control points Pc831 and Pc832, respectively, is determined to be the curvature energy, the update range determining unit 29d excludes control points in a range E8 indicated by a dashed-two dotted line in FIG. 31 including control points in the predetermined range outside of the control points Pc831 and Pc832, and thus determines the update range of the control points. In this manner, when the shape of the closed region is updated next time at Step m13 in a latter stage, the control points outside of the range E8 is to be moved.

Subsequently, the closed region updating unit 28d moves the control points in the update range in accordance with the update range determined at Step r9 or Step m11, thereby updating the shape of the closed region (Step m13). The energy calculating unit 24d then performs energy calculating process (Step r15). At Step r15, the energy calculating unit 24d performs the energy calculating process on the closed region updated at Step m13 in the same process as that of Step r3 (refer to FIG. 33). Subsequently, the process goes to Step m17.

As described above, in the fifth embodiment, the general outer product energy is calculated for each of the control points from control points apart from the control point to be processed by a certain distance in order. By calculating the outer product energy eventually, the range in which the boundary bends can be specified. The specified range and the predetermined range outside thereof are excluded to determine the update range of the closed region. Therefore, it is possible to extract the closed region that includes no groove position shown in an intraluminal image inside thereof, and no contour portion on the boundary thereof more properly. Furthermore, by performing the morphological process on each of the extracted closed regions, an abnormal portion in the closed region can be detected. This allows the abnormal portion in the intraluminal image to be detected accurately without misdetecting the groove position and the contour portion as the abnormal portion.

Sixth Embodiment

Figure 34:
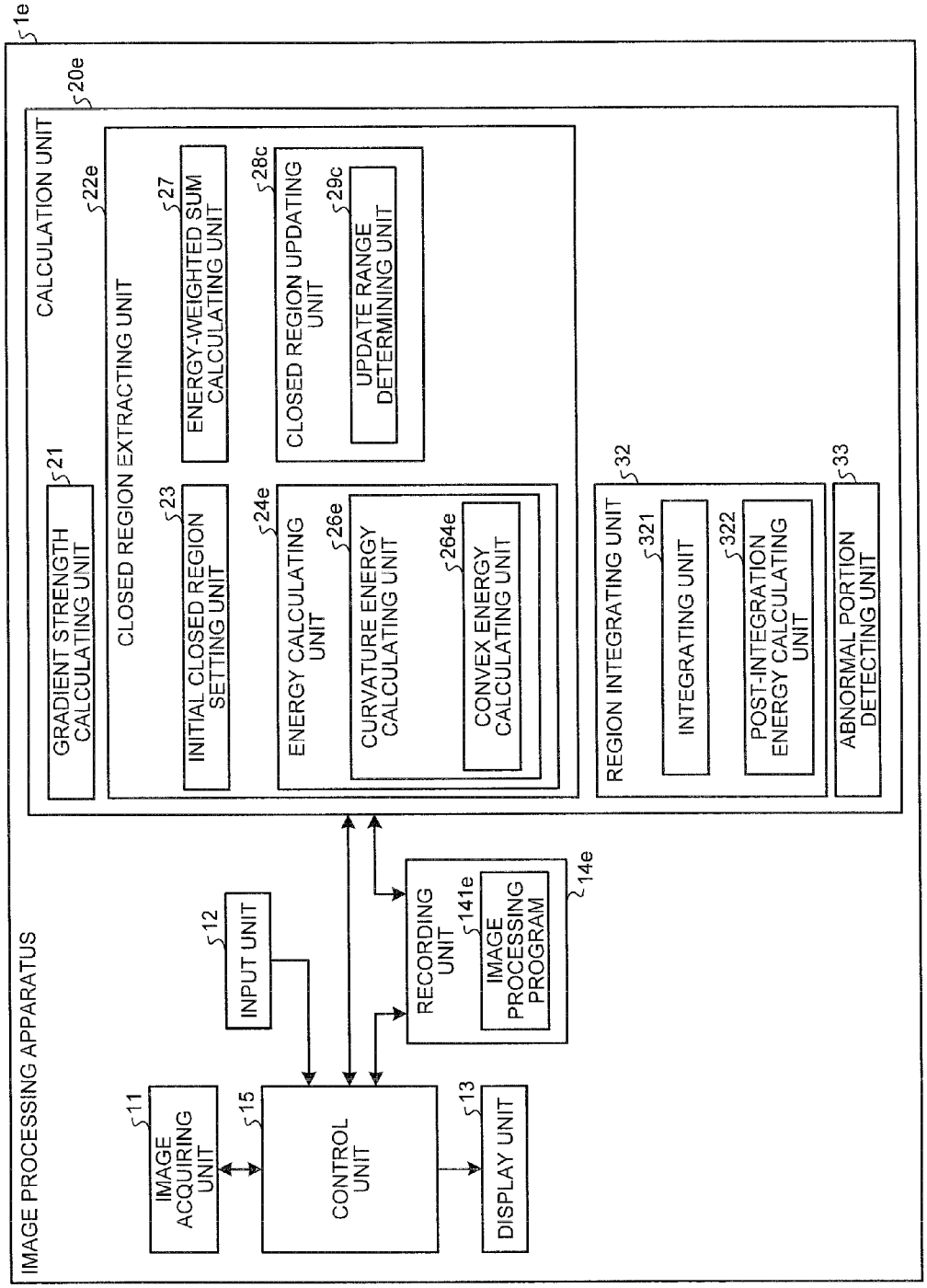
FIG. 34 is a block diagram for explaining a functional configuration of an image processing apparatus according to a sixth embodiment.

A configuration of an image processing apparatus according to a sixth embodiment will now be described. FIG. 34 is a block diagram for explaining a functional configuration of an image processing apparatus 1e according to the sixth embodiment. It is to be noted that the same numerals are assigned to the same components as those explained in the fourth embodiment. As illustrated in FIG. 34, the image processing apparatus 1e according to the sixth embodiment includes the image acquiring unit 11, the input unit 12, the display unit 13, a recording unit 14e, a calculation unit 20e, and the control unit 15 that controls operations of the entire image processing apparatus 1e.

The recording unit 14e records therein an image processing program 141e for realizing processing of the sixth embodiment and detecting an abnormal portion in an intraluminal image.

The calculation unit 20e includes the gradient strength calculating unit 21, a closed region extracting unit 22e, the region integrating unit 32, and the abnormal portion detecting unit 33. In the sixth embodiment, the closed region extracting unit 22e includes the initial closed region setting unit 23, an energy calculating unit 24e, the energy-weighted sum calculating unit 27, and the closed region updating unit 28c.

The energy calculating unit 24e includes a curvature energy calculating unit 26e. The curvature energy calculating unit 26e includes a convex energy calculating unit 264e. In the sixth embodiment, the convex energy calculating unit 264e calculates the value of the convex energy based on the inclusion state of vectors drawn from each of the control points to other control points in the closed region, and determines the value of the convex energy to be the curvature energy. The convex energy is energy that indicates a larger value as more straight lines connecting control points are included in the closed region.

Figure 35:
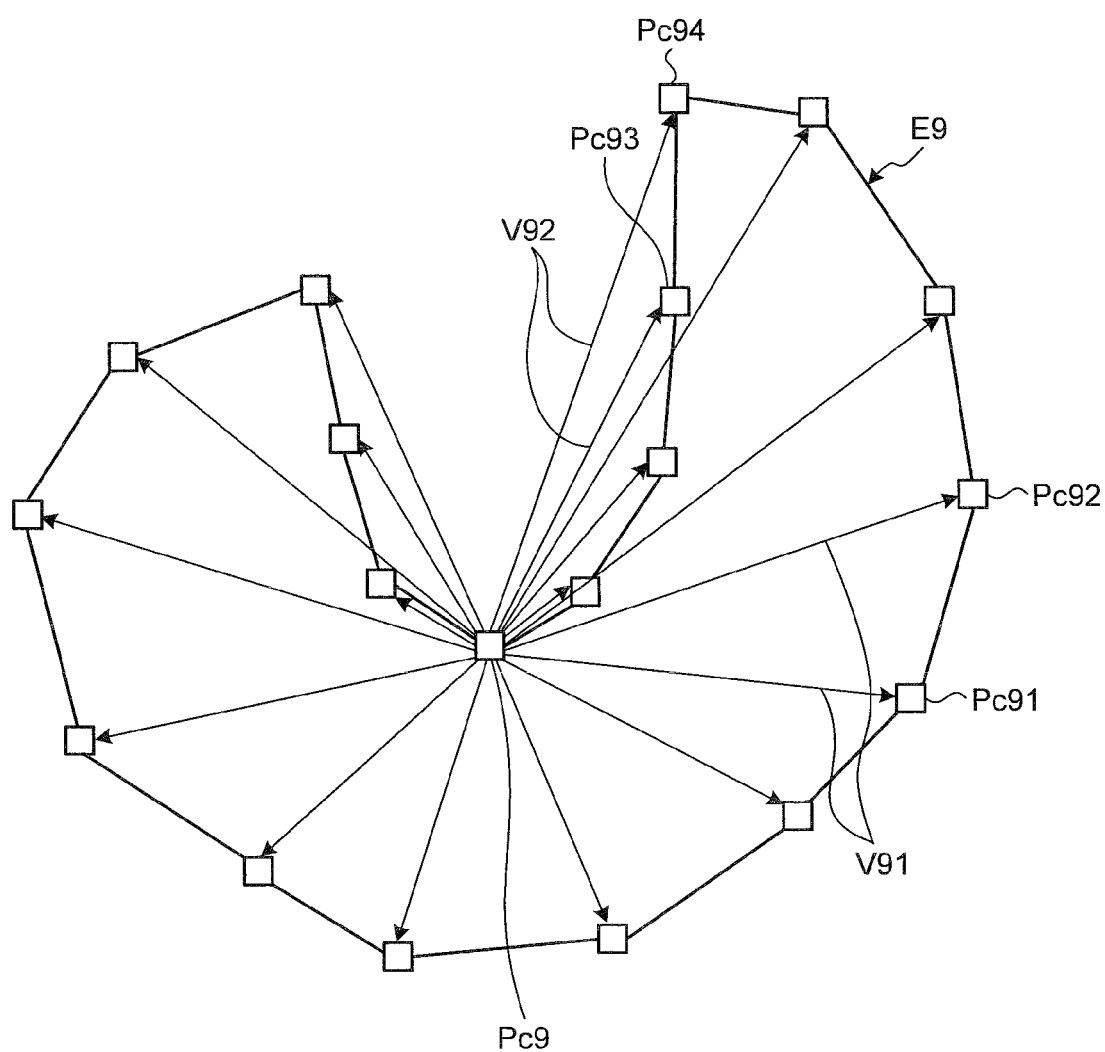
FIG. 35 is a view for explaining convex energy.

A principle of calculation of the convex energy in the sixth embodiment will now be described with reference to FIG. 35. FIG. 35 is a view for explaining the convex energy, and illustrates a closed region E9 in which a part of the boundary bends. If a control point Pc9 illustrated in FIG. 35 is focused, for example, in order to calculate the convex energy, vectors drawn from the control point Pc9 to all of the control points are calculated. Based on the number of vectors not included in the closed region E9 among the vectors thus calculated, the value of the convex energy is calculated. In FIG. 35, for example, among vectors from the control point Pc9 to the other control points, vectors V91 drawn therefrom to a control point Pc91 and a control point Pc92 are included in the closed region E9. By contrast, vectors V92 drawn therefrom to control points (e.g., a control point Pc93 and a control point Pc94) arranged in positions where the boundary bends are not included in the closed region E9. In the sixth embodiment, based on the number of vectors not included in the closed region E9, such as the vectors V92, the value of the convex energy for each of the control points is calculated, and the value of the convex energy thus calculated is determined to be the value of the curvature energy.

Figure 36:
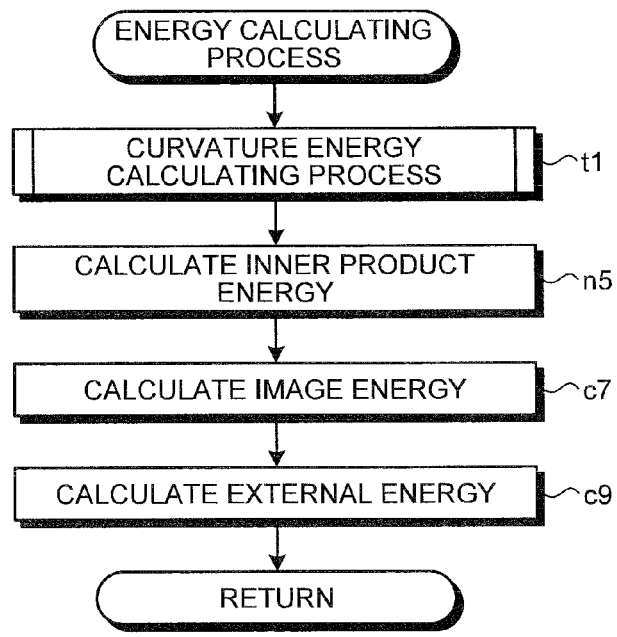
FIG. 36 is a flowchart indicating a detailed processing of energy calculation according to the sixth embodiment.

A description will be made of a specific processing performed by the image process apparatus 1e according to the sixth embodiment. The processing described herein is realized by the calculation unit 20e executing the image processing program 141e recorded in the recording unit 14e. In the sixth embodiment, the value of the curvature energy is calculated in the same manner as in the fourth embodiment. However, the calculation method thereof is different from that in the fourth embodiment, and the process of the energy calculating process performed at Step p3 and Step p15 in the closed region calculating process of FIG. 28 is different from that in the fourth embodiment. FIG. 36 is a flowchart indicating a detailed processing of the energy calculation according to the sixth embodiment. In FIG. 36, the same reference numerals are assigned to the same processes as those in the third embodiment.

Figure 37:
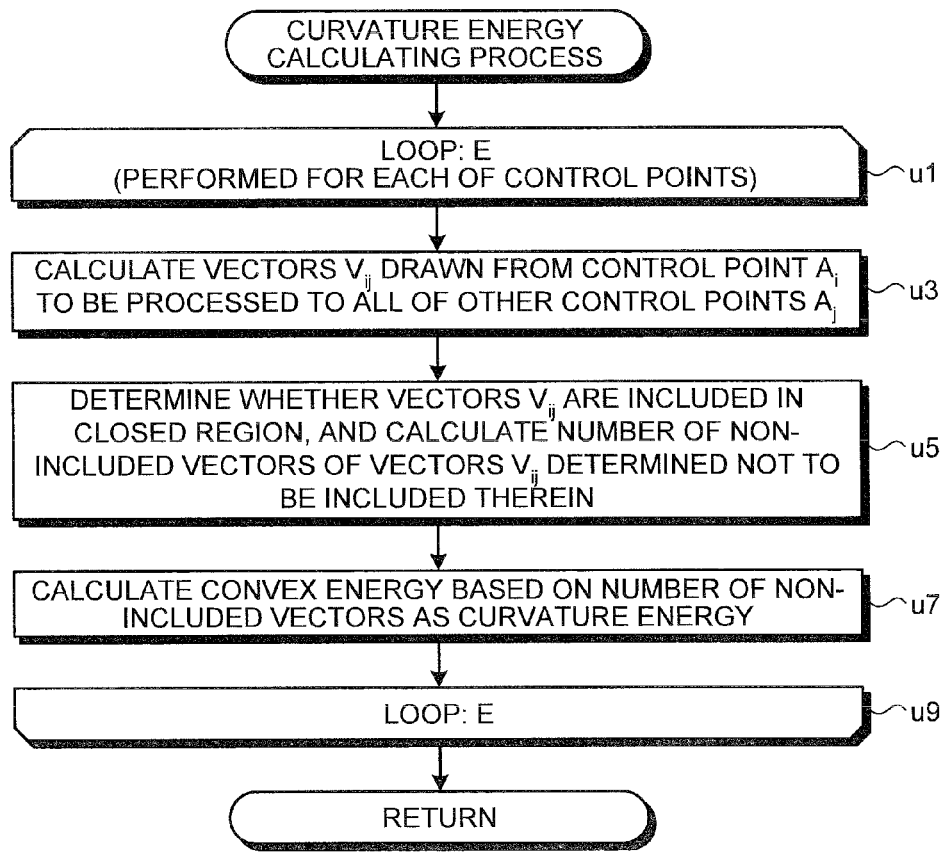
FIG. 37 is a flowchart indicating a detailed processing of curvature energy calculating process according to the sixth embodiment.

As illustrated in FIG. 36, in the energy calculating process according to the sixth embodiment, the convex energy calculating unit 264e performs convex energy calculating process (Step t1). FIG. 37 is a flowchart indicating a detailed processing of the convex energy calculating process according to the sixth embodiment. In FIG. 37, the same reference numerals are assigned to the same processes in the third embodiment.

As illustrated in FIG. 37, the convex energy calculating process in the sixth embodiment, process of a loop E is performed on each control point $A_i$ (i=0, 1, 2, . . . , n: n represents the number of the control points) (Step u1 to Step u9). In the loop E, the convex energy calculating unit 264e calculates vectors $V_{ij}$ drawn from the control point $A_i$ to be processed to all of the other control points $A_j$ (j=0, 1, 2, . . . , m: m represents the number of the other control points) (Step u3). Subsequently, the convex energy calculating unit 264e determines whether the vectors $V_{ij}$ calculated at Step u3 are included in the closed region. The convex energy calculating unit 264e then counts the number of the vectors $V_{ij}$ determined not to be included therein to calculate the number of non-included vectors, which is an example of the inclusion state (Step u5). Based on the number of the non-included vectors calculated at Step u5, the convex energy calculating unit 264e calculates convex energy $E_c$ that indicates a larger value as the number of the non-included vectors increases by Equation (9) as the value of the curvature energy (Step u7).

Convex Energy $E_c$=Number of Non-included Vectors/ (Number of All Control Points−1)     (9)

When the value of the curvature energy is obtained in this manner, the process of the loop E on the control point to be processed is finished. After the process of the loop E is performed on all of the control points, the process returns to Step t1 in FIG. 36. Calculating the value of the convex energy as the curvature energy makes it possible to realize the extraction of such a closed region that satisfies the condition that the boundary of the region does not bend with a predetermined curvature or higher.

Subsequently, the energy calculating unit 24e performs the process subsequent to Step n5 in the same manner as in the first embodiment to calculate the values of the inner product energy, the image energy, and the external energy.

As described above, in the sixth embodiment, the vectors drawn from each of the control points to the other control points are calculated, and it is determined whether the vectors thus calculated are included in the closed region. Thus, the value of the convex energy is calculated, thereby calculating the value of the curvature energy that indicates a larger value as the boundary of the closed region bends more inwardly. The shape is updated such that the weighted sum of the plurality of energy including the curvature energy is made the minimum, thereby extracting the closed region. Therefore, it is possible to properly extract such a closed region that includes no groove position shown in an intraluminal image inside thereof, and no contour portion on the boundary thereof. Furthermore, by performing the morphological process on each of the extracted closed regions, an abnormal portion in the closed region can be detected. This allows the abnormal portion in the intraluminal image to be detected accurately without misdetecting the groove position and the contour portion as an abnormal portion.

The image processing apparatus 1 of the first embodiment, the image processing apparatus 1*a* of the second embodiment, the image processing apparatus 1*b* of the third embodiment, the image processing apparatus 1*c* of the fourth embodiment, the image processing apparatus 1*d* of the fifth embodiment, and the image processing apparatus 1*e* of the sixth embodiment can be realized by executing a computer program prepared in advance in a computer system, such as a personal computer and a work station. A computer system that has the same functions as those of the image processing apparatuses 1, 1*a*, 1*b*, 1*c*, 1*d*, and 1*e* explained in the first to sixth embodiments, and that executes the image processing programs 141, 141*a*, 141*b*, 141*c*, 141*d*, and 141*e* will be described below.

Figure 38:
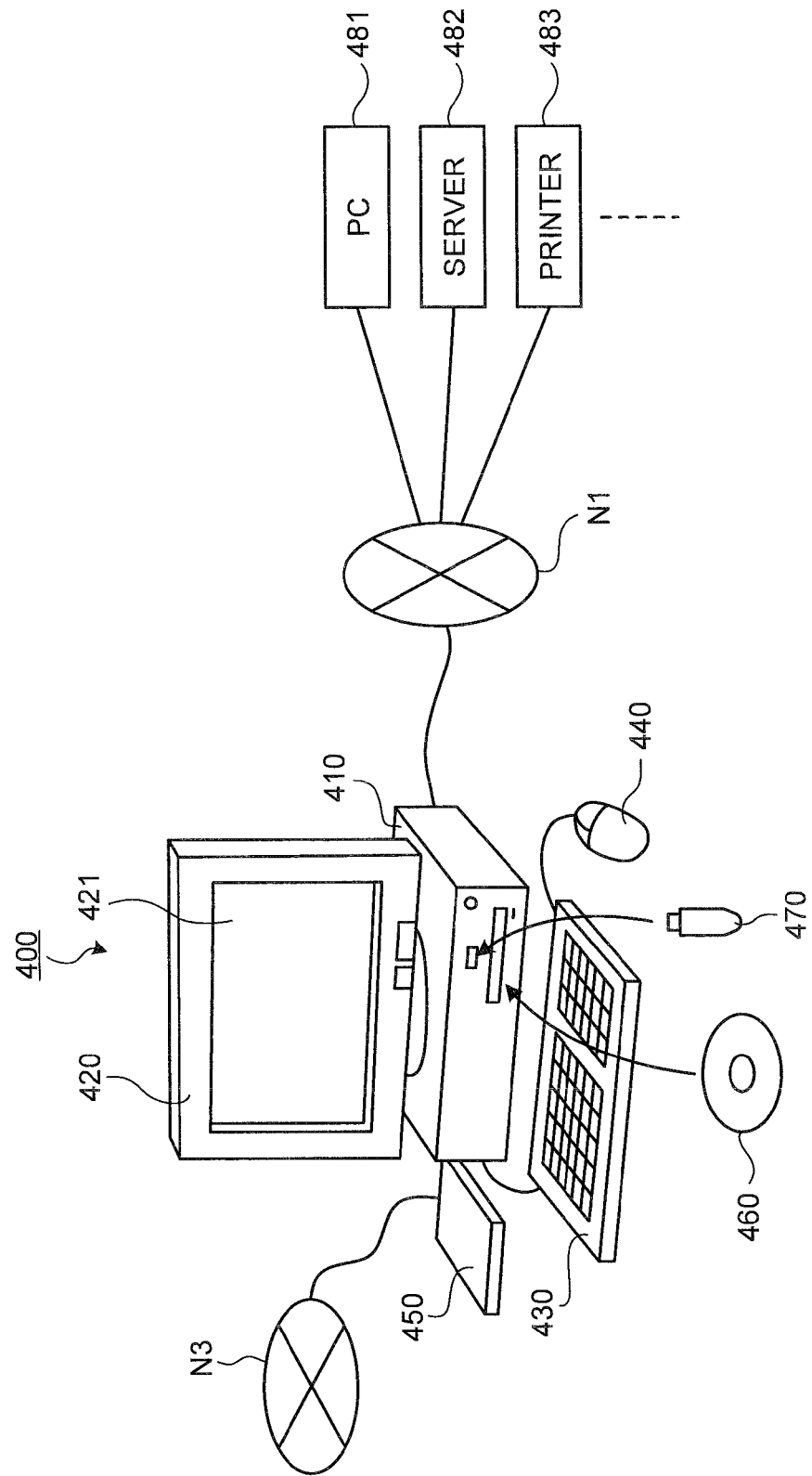
FIG. 38 is a system configuration view illustrating a configuration of a computer system to which the present invention is applied.
Figure 39:
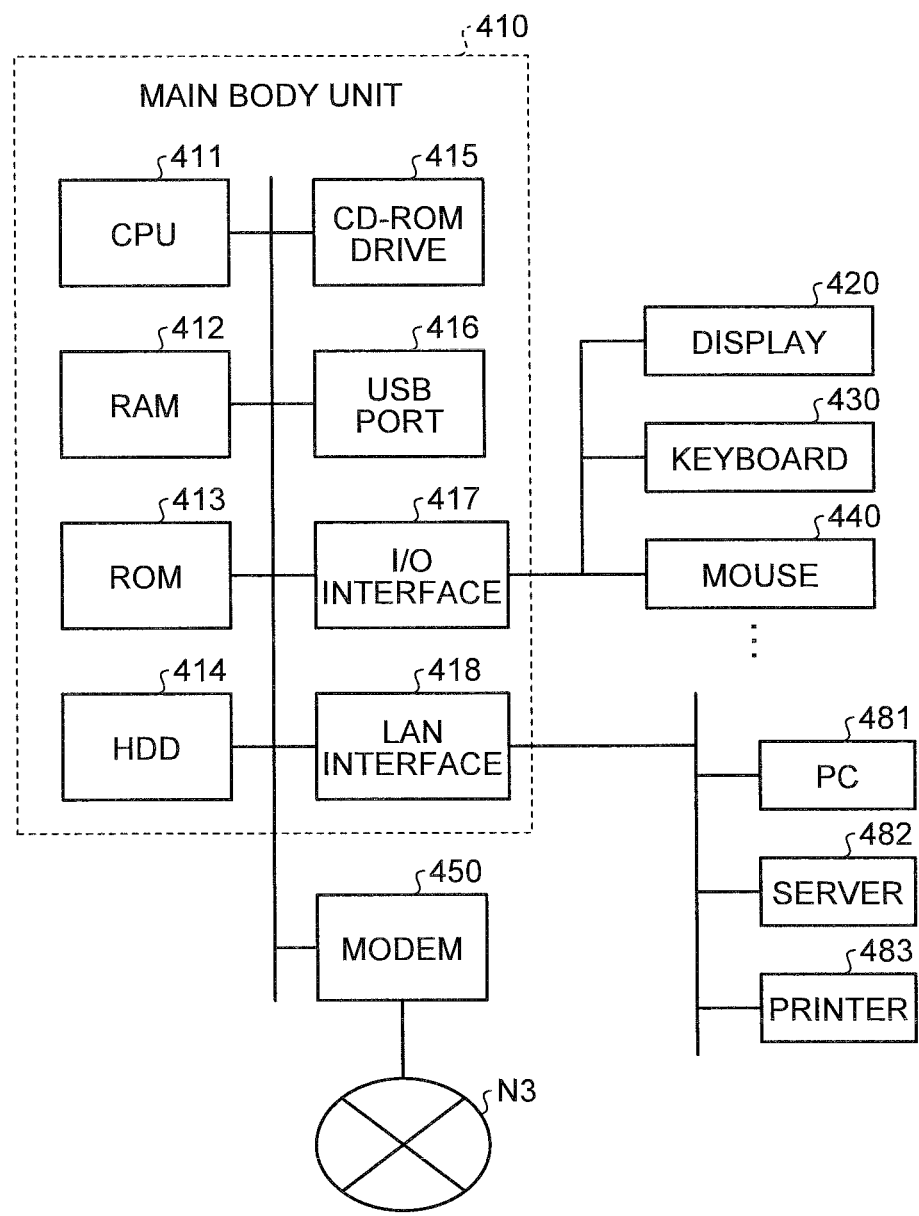
FIG. 39 is a block diagram illustrating a configuration of a main body unit that constitutes the computer system in FIG. 38.

FIG. 38 is a system configuration view illustrating a configuration of a computer system 400 according to a modification. FIG. 39 is a block diagram illustrating a configuration of a main body unit 410 that constitutes the computer system 400. As illustrated in FIG. 38, the computer system 400 includes the main body unit 410, a display 420 for displaying information such as an image on a display screen 421 in response to an instruction received from the main body unit 410, a keyboard 430 for inputting various types of pieces of information to the computer system 400, and a mouse 440 for specifying an arbitrary position on the display screen 421 of the display 420.

As illustrated in FIG. 38 and FIG. 39, the main body unit 410 in the computer system 400 includes a CPU 411, a RAM 412, a ROM 413, a hard disk drive (HDD) 414, a CD-ROM drive 415 that receives a CD-ROM 460, a universal serial bus (USB) port 416 to which a USB memory 470 is connected in a detachable manner, an input-output (I/O) interface 417 to which the display 420, the keyboard 430 and the mouse 440 are connected, and a local area network (LAN) interface 418 for connecting the computer system 400 to a local area network or a wide area network (LAN/WAN) N1.

Furthermore, to the computer system 400, a modem 450 for connecting the computer system 400 to a public line N3 such as the Internet is connected, and a personal computer (PC) 481, a server 482, a printer 483, and the like, which constitute another computer system, are connected via the LAN interface 418 and the LAN/WAN network N1.

The computer system 400 reads and executes an image processing program recorded in a recording medium (e.g., the image processing program 141 of the first embodiment, the image processing program 141*a* of the second embodiment, the image processing program 141*b* of the third embodiment, the image processing program 141*c* of the fourth embodiment, the image processing program 141*d* of the fifth embodiment, and the image processing program 141*e* of the sixth embodiment), thereby realizing an image processing apparatus (e.g., the image processing apparatus 1 of the first embodiment, the image processing apparatus 1*a* of the second embodiment, the image processing apparatus 1*b* of the third embodiment, the image processing apparatus 1*c* of the fourth embodiment, the image processing apparatus 1*d* of the fifth embodiment, and the image processing apparatus 1*e* of the sixth embodiment). The recording medium includes, in addition to the CD-ROM 460 and the USB memory 470, every kind of recording medium in which the image processing program readable by the computer system 400 is recorded, such as a "portable physical medium" including a magneto-optical (MO) disk, a digital versatile disk (DVD), a flexible disk (FD), and an IC card, a "fixed physical medium" including the HDD 414, the RAM 412, and the ROM 413 provided inside and outside of the computer system 400, and a "communication medium" that stores therein a computer program for a short period of time during transmission of the computer program, such as the public line N3 to which the computer system 400 is connected via the modem 450, and the LAN/WAN N1 to which the PC 481 and the server 482 serving as another computer system are connected.

In other words, the image processing program is recorded in the recording medium, such as the "portable physical medium", the "fixed physical medium", and the "communication medium" in a computer-readable format. The computer system 400 reads the image processing program from such a recording medium to execute the image processing program, thereby realizing the image processing apparatus. The image processing program is not limited to being executed by the computer system 400. The present invention can be applied as well to the case where the PC 481 and the server 482 serving as another computer system execute the image processing program, or the case where both of the computer systems cooperate to execute the image processing program.

The present invention is not limited to the first to sixth embodiments and the modification thereof as they are. By combining the plurality of components disclosed in the embodiments and the modification arbitrarily, various types of inventions can be formed. For example, the present invention may be realized by excluding some components from all of the components disclosed in each of the embodiments or the modification. Alternatively, the present invention may be realized by combining the components disclosed in different embodiments and the modification arbitrarily.

With the present invention described above, it is possible to detect an abnormal portion in an intraluminal image accurately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a gradient strength calculating unit that calculates a gradient strength of a pixel value of each pixel based on an intraluminal image that is a captured image of an intralumen;
   a closed region extracting unit that extracts a closed region from the intraluminal image, the closed region satisfying conditions that the pixel of which gradient strength is a predetermined value or more is not included in the closed region and a boundary of the closed region does not bend with a predetermined curvature or higher toward an inner side of the closed region; and
   an abnormal portion detecting unit that detects an abnormal portion inside the closed region, wherein
   the closed region extracting unit includes an initial closed region setting unit that sets an initial shape of the closed region;

an energy calculating unit that calculates values of a plurality of types of energy including at least energy determined by an outer shape of the closed region and energy determined by the gradient strength in the closed region;

an energy-weighted sum calculating unit that calculates a weighted sum of the plurality of types of energy; and a closed region updating unit that updates a shape of the closed region within an update range based on the weighted sum, and the closed region updating unit includes an update range determining unit that determines the update range in which the shape of the closed region is updated based on any one of the values of the plurality of types of energy.

2. The image processing apparatus according to claim 1, wherein the energy calculating unit includes an edge inclusion energy calculating unit that calculates a value of edge inclusion energy indicating a larger value as more pixels having the gradient strength equal to or higher than the predetermined value are present in the closed region.

3. The image processing apparatus according to claim 2, wherein the edge inclusion energy calculating unit includes a closed region gradient strength calculating unit that calculates a closed region gradient strength based on the gradient strength in the closed region, and calculates the value of the edge inclusion energy indicating a larger value as the closed region gradient strength becomes larger.

4. The image processing apparatus according to claim 2, wherein the edge inclusion energy calculating unit includes an edge extracting unit that extracts a pixel having the gradient strength equal to or higher than the predetermined value as an edge, and calculates the value of the edge inclusion energy based on the edge in the closed region.

5. The image processing apparatus according to claim 4, wherein
the edge inclusion energy calculating unit includes
a bending point detecting unit that detects a bending point of the edge; and
an end point detecting unit that detects an end point of the edge, and
the edge inclusion energy calculating unit calculates the value of the edge inclusion energy based on an inclusion state of the bending point and the end point in the closed region.

6. The image processing apparatus according to claim 5, wherein
the closed region is specified as a region obtained by connecting a plurality of control points, and the shape of the closed region is updated by moving the control points, and
the edge inclusion energy calculating unit includes an outer product calculating unit that calculates an outer product of vectors drawn from the control points to the bending point and the end point, and
the edge inclusion energy calculating unit calculates the value of the edge inclusion energy based on a value of the outer product.

7. The image processing apparatus according to claim 3, wherein the edge inclusion energy calculating unit includes an increase rate calculating unit that calculates an increase rate of the gradient strength in the closed region before and after update of the shape, and
the edge inclusion energy calculating unit calculates the value of the edge inclusion energy based on the increase rate.

8. The image processing apparatus according to claim 1, wherein the energy calculating unit includes a curvature energy calculating unit that calculates a value of curvature energy indicating a larger value as the boundary of the closed region bends more inwardly.

9. The image processing apparatus according to claim 8, wherein
the closed region is specified as a region obtained by connecting a plurality of control points, and the shape of the closed region is updated by moving the control points, and
the curvature energy calculating unit includes an outer product energy calculating unit that calculates a value of outer product energy based on an outer product of vectors drawn from each of the control points to another control point adjacent thereto, and
the curvature energy calculating unit determines the value of the outer product energy to be the value of the curvature energy.

10. The image processing apparatus according to claim 8, wherein
the closed region is specified as a region obtained by connecting a plurality of control points, and the shape of the closed region is updated by moving the control points, and
the curvature energy calculating unit includes a general outer product energy calculating unit that calculates a value of general outer product energy based on an outer product of vectors drawn from each of the control points to another control point apart therefrom by a predetermined distance or larger, and
the curvature energy calculating unit determines the value of the general outer product energy to be the value of the curvature energy.

11. The image processing apparatus according to claim 8, wherein
the closed region is specified as a region obtained by connecting a plurality of control points, and the shape of the closed region is updated by moving the control points, and
the curvature energy calculating unit includes a multiple outer product energy calculating unit that calculates a value of outer product energy based on an outer product of vectors drawn from each of the control points to be processed to another control point apart therefrom by a predetermined distance or larger, and when the value of the outer product energy is smaller than a predetermined threshold value, and repeats process for calculating the value of the outer product energy based on an outer product of vectors drawn from each of the control points to be processed to yet another control point closer thereto than the control point apart therefrom by the predetermined distance or larger, and
the curvature energy calculating unit determines the value of the outer product energy calculated by the multiple outer product energy calculating unit to be the value of the curvature energy.

12. The image processing apparatus according to claim 8, wherein
the closed region is specified as a region obtained by connecting a plurality of control points, and the shape of the closed region is updated by moving the control points, and
the curvature energy calculating unit includes a convex energy calculating unit that calculates a value of convex energy based on an inclusion state of vectors between the control points in the closed region, and determines the value of the convex energy to be the value of the curvature energy.

13. The image processing apparatus according to claim 1, wherein
the closed region is specified as a region obtained by connecting a plurality of control points, and the shape of the closed region is updated by moving the control points, and
the update range determining unit includes a control point distance determining unit that calculates a distance between each of the control points and another control point at which at least one of the values of the plurality of types of energy is equal to or higher than a predetermined threshold value, and
the update range determining unit selects a control point to be moved next time among the control points based on the distance to determine the update range.

14. The image processing apparatus according to claim 1, wherein the update range determining unit includes a shape information calculating unit that calculates shape information of the closed region, and
the update range determining unit determines the update range based on the shape information of the closed region.

15. The image processing apparatus according to claim 14, wherein the shape information calculating unit includes an area calculating unit that calculates an area of the closed region.

16. The image processing apparatus according to claim 14, wherein the shape information calculating unit includes a perimeter calculating unit that calculates a perimeter of the closed region.

17. The image processing apparatus according to claim 14, wherein the shape information calculating unit includes a curvature calculating unit that calculates a curvature of the closed region.

18. The image processing apparatus according to claim 1, wherein the update range determining unit includes an edge information detecting unit that extracts a pixel having at least the gradient strength equal to or higher than the predetermined threshold value as an edge, and
the update range determining unit determines the update range based on the edge.

19. The image processing apparatus according to claim 18, wherein the edge information detecting unit detects an end point of the edge and a bending point of the edge, includes an end point and bending point distance calculating unit that calculates a distance from the end point of the edge or the bending point of the edge, and
the update range determining unit determines the update range based on the distance from the end point of the edge or the bending point of the edge.

20. The image processing apparatus according to claim 18, wherein
the update range determining unit includes an edge distance calculating unit that calculates a distance from the edge, and
the update range determining unit determines the update range based on the distance from the edge.

21. The image processing apparatus according to claim 1, further comprising:
a region integrating unit that integrates the closed region extracted by the closed region extracting unit so as to satisfy the conditions.

22. The image processing apparatus according to claim 21, wherein the region integrating unit includes
an integrating unit that integrates closed regions partially overlapping with each other within the closed region; and
a post-integration energy calculating unit that calculates the values of the plurality of types of energy for the closed region thus integrated, and
the region integrating unit determines whether to permit integration based on the values of the plurality of types of energy calculated by the post-integration energy calculating unit.

23. An image processing method comprising:
calculating a gradient strength of a pixel value of each pixel based on an intraluminal image that is a captured image of an intralumen;
setting an initial shape of a closed region, the closed region satisfying conditions that the pixel of which gradient strength is a predetermined value or more is not included in the closed region and a boundary of the closed region does not bend with a predetermined curvature or higher toward an inner side of the closed region;
extracting the closed region from the intraluminal image; and
detecting an abnormal portion inside the closed region, wherein
the extracting includes
calculating values of a plurality of types of energy including at least energy determined by an outer shape of the closed region and energy determined by the gradient strength in the closed region;
calculating a weighted sum of the plurality of types of energy;
determining an update range in which the shape of the closed region is updated based on any one of the values of the plurality of types of energy; and
updating the shape of the closed region within the update range based on the weighted sum.

24. A non-transitory computer-readable recording medium with an executable program stored thereon, wherein the program instructs a processor to perform:
calculating a gradient strength of a pixel value of each pixel based on an intraluminal image that is a captured image of an intralumen;
setting an initial shape of a closed region, the closed region satisfying conditions that the pixel of which gradient strength is a predetermined value or more is not included in the closed region and a boundary of the closed region does not bend with a predetermined curvature or higher toward an inner side of the closed region;
extracting the closed region from the intraluminal image; and
detecting an abnormal portion inside the closed region, wherein
the extracting includes
calculating values of a plurality of types of energy including at least energy determined by an outer shape of the closed region and energy determined by the gradient strength in the closed region;
calculating a weighted sum of the plurality of types of energy;
determining an update range in which the shape of the closed region is updated based on any one of the values of the plurality of types of energy; and
updating the shape of the closed region within the update range based on the weighted sum.

* * * * *